(12) United States Patent
Mizukoshi

(10) Patent No.: US 6,567,407 B1
(45) Date of Patent: May 20, 2003

(54) ATM SWITCH CIRCUIT CAPABLE OF INCREASING USE EFFICIENCY OF ADDRESS MEMORY, AND ATM SWITCH CIRCUIT CONTROLLING METHOD

(75) Inventor: Nobuyuki Mizukoshi, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 09/253,720

(22) Filed: Feb. 22, 1999

(30) Foreign Application Priority Data

Feb. 20, 1998 (JP) .......................... 10-038229

(51) Int. Cl.[7] .......................... H04L 12/56; H04L 12/28
(52) U.S. Cl. .................... 370/395.1; 370/398; 370/399; 370/395.7; 370/395.71; 370/412; 370/422
(58) Field of Search ................................ 370/351, 389, 370/395.1, 398, 399, 395.7, 395.71, 395.72, 412, 413, 417, 422, 905

(56) References Cited

U.S. PATENT DOCUMENTS

| | | | |
|---|---|---|---|
| 4,910,731 A | * 3/1990 | Sakurai et al. | ................. 370/67 |
| 5,124,977 A | * 6/1992 | Kozaki et al. | ............. 370/58.1 |
| 5,365,519 A | 11/1994 | Kozaki et al. | |
| 5,535,197 A | 7/1996 | Cotton | |
| 5,710,770 A | 1/1998 | Kozaki et al. | ............. 370/368 |
| 5,724,358 A | * 3/1998 | Headrick et al. | ........... 370/418 |
| 5,825,767 A | * 10/1998 | Mizukoshi et al. | ......... 370/395 |
| 5,864,540 A | * 1/1999 | Bonomi et al. | ............. 370/235 |
| 6,011,775 A | * 1/2000 | Bonomi et al. | ............. 370/230 |
| 6,111,880 A | * 8/2000 | Rusu et al. | ................. 370/395 |

FOREIGN PATENT DOCUMENTS

| | | |
|---|---|---|
| JP | 1-161950 | 6/1989 |
| JP | 4-38035 | 2/1992 |
| JP | 4-276943 | 10/1992 |
| JP | 5-160852 | 6/1993 |
| JP | 6-62041 | 3/1994 |
| JP | 6-164641 | 6/1994 |
| JP | 6-224933 | 8/1994 |
| JP | 6-284453 | 10/1994 |
| JP | 9-200222 | 7/1997 |
| JP | 10-32581 | 2/1998 |
| WO | 97/31461 | 2/1997 |

OTHER PUBLICATIONS

Article—Korean Hung Leung Science Publishing House Publication, Data Structure Theory (Revised Edition) pp. 101–102, pp. 359–363 (Feb. 21, 1991).

* cited by examiner

Primary Examiner—Hassan Kizou
Assistant Examiner—Joe Logsdon
(74) Attorney, Agent, or Firm—Foley & Lardner

(57) ABSTRACT

In an ATM (Asynchronous Transfer Mode) switch circuit, use efficiencies of address storage memories are increased even when a total number of output ports is increased. The ATM switch circuit is arranged by an ATM cell buffer memory, an ATM cell managing unit, an address storage memory, an empty address managing unit, and also a buffer address managing unit. In this ATM switch circuit, the address storage memory may be commonly used with respect to the output ports. As a result, since the length of the address chain corresponding to the output ports may be adjusted in accordance with the use frequencies of the output ports, the address storage memory can be effectively used, depending upon a plurality of output ports.

9 Claims, 44 Drawing Sheets

ATM SWITCH CIRCUIT CAPABLE OF INCREASING USE EFFICIENCY OF ADDRESS MEMORY, AND ATM SWITCH CIRCUIT CONTROLLING METHOD

BACKGROUND OF THE INVENTION

1. Field of the Invention

The present invention generally relates to an ATM switch circuit for handling ATM cells and a method for controlling such an ATM switch circuit. More specifically, the present invention is directed to such an ATM switch circuit capable of increasing a use efficiency of an address memory even when a total number of output ports of this ATM switch circuit is increased, and also a control method for this ATM switch circuit.

2. Description of the Related Art

Conventionally, ATM(Asynchronous Transfer Mode) transmission apparatuses and also ATM switching apparatuses have been widely used. For instance, Japanese Patent Laid-open Application No. Hei6-62041 published in 1994 discloses the ATM transmission apparatus. That is, when the broadcast communication is carried out in the conventional ATM transmission apparatus, the entered ATM cells are temporarily stored into the memory and then the stored ATM cells are read to be outputted. The above-explained transmission apparatus and switching apparatus are equipped with an ATM switch circuit as shown in FIG. 44. That is, as represented in FIG. 44, in this conventional ATM switch circuit, the ATM cells entered via an input port $101_1$ through an input port $101_N$ are multiplexed by a multiplexing circuit 101, and then the multiplexed cell is transferred to a cell buffer memory 102. The cell buffer memory 102 stores thereinto the entered cells in accordance with an empty address given from an empty address memory 107. A write control unit 104 checks output ports $103_1$ to $103_N$ for outputting cells based upon a header portion of a multiplexed cell from the multiplexing unit 101. Thereafter, the write control unit 104 issues a request to the empty address management memory 107, by which an empty address used to store a cell is outputted. Also, the write control unit 104 instructs the relevant address memory to store thereinto the empty address supplied from the empty address management memory 107.

Address memories $106_1$ to $106_N$ correspond to FIFO (First-In-First-Out) memories. These address memories $106_1$ to $106_N$ are provided in correspondence with the above-described output ports $103_1$ to $103_N$. Then, in response to an instruction issued from the write control unit 104, these address memories $106_1$ to $106_N$ store thereinto the empty address supplied from the empty address management memory 107. The empty address management memory 107 stores thereinto the empty address of the cell buffer memory 102 and manages the stored empty addresses. It should be noted that the above-described empty address corresponds to such an address that when the read control unit 105 issues a read instruction, this address is outputted from the address memory corresponding to this read instruction.

Based upon these address memories $106_1$ to $106_N$ and the empty address management memory 107, the addresses of the cells outputted from the output ports $103_1$ to $103_N$ are stored/managed in correspondence with the output ports $103_1$ to $103_N$. Then, when the cell is outputted, the cell buffer memory 102 reads out the stored cells in response to the addresses outputted by the address memories $106_1$ to $106_N$ by receiving the instruction of the read control unit 105. Thereafter, the cells read from the cell buffer memory 102 are supplied to a separating unit 103. The separating unit 103 separates the cells supplied from the cell buffer memory 102 to supply the separated cell to the respective output ports $103_1$ to $103_N$.

However, the above-described conventional ATM switch circuit owns the following problems. That is, as indicated in FIG. 44, this conventional ATM switch circuit is equipped with the address memories $106_1$ to $106_N$ in correspondence with the output ports $103_1$ to $103_N$. As a result, when the total number of the above-described output ports is increased, there is a problem that the total quantity of the above-explained address memories would be increased. Depending upon the operation conditions of the communication system equipped with the conventional ATM switch circuit, the ATM cells are frequently transmitted. As a result, there are such output ports whose use frequencies are high, and other output ports whose use frequencies are low. In this case, when the ATM switching system is arranged by employing the address memories $106_1$ to $106_N$ in correspondence with the output ports $103_1$ to $103_N$, there is another problem that the use efficiency of the address memories corresponding to the output ports, the use frequencies of which are low would be lowered.

SUMMARY OF THE INVENTION

The present invention has-been made to solve the above-described problems of the conventional ATM switch circuit, and therefore, has an object to provide an ATM switch circuit capable of preventing an increase of address memories which is caused when a total number of output ports is increased, and capable of avoiding a decrease of a use efficiency of these address memories.

To achieve the object, an ATM switch circuit, according to a first aspect of the present invention, is featured by that in an ATM (Asynchronous Transfer Mode) switch circuit including: an ATM cell buffer memory for storing thereinto an ATM cell; and ATM cell managing means for issuing both a storage request for an inputted ATM cell and destination information indicative of an output port corresponding to a destination of the inputted ATM cell, and also for issuing both an output request and the destination information when the ATM cell is outputted, in which:

the inputted ATM cell is written into the cell buffer memory based upon a buffer address defined by the storage request; the written ATM cell is read out from the cell buffer memory based on another buffer address defined by the output request to thereby be transmitted to the ATM cell managing means; and upon receipt of the transmitted ATM cell, the ATM cell managing means transmits the received ATM cell to the output port in accordance with the destination information, the ATM switch circuit is comprised of:

empty address managing means for managing an empty address of the cell buffer memory, and for outputting the empty address as a buffer address to the cell buffer memory upon receipt of the storage request issued from the ATM cell managing means; and buffer address managing means for sequentially chaining a plurality of buffer addresses to each other when the buffer address managing means receives the storage requests issued from the ATM cell managing means and the plural buffer addresses transmitted from the empty address managing means, whereby such buffer addresses of ATM cells directed to the same output port are formed in a chain structure; and when the output request and the destination information issued from the ATM cell managing means are received, the buffer address managing means reads out the corresponding buffer address from the chain structure corresponding to the received destination information to thereby transmit the read buffer address to both the cell buffer memory and the empty address managing means.

Also, an ATM switch circuit, according to a second aspect of the present invention, is featured by that in the ATM switch circuit according to the first aspect of the present invention, the buffer address managing means includes:

a buffer address storage unit for receiving one buffer address from the empty address managing means to thereby chain the received buffer address to a succeeding buffer address, whereby the buffer addresses directed to the output port are formed in the chain structure;

a pointer storage unit for storing thereinto both a write pointer and a read pointer with respect to each of the chain structures, the write pointer pointing out a latest buffer address located at a last portion of the chain structure of the buffer address storage unit, and the read pointer pointing out a buffer address located at a head portion of the chain structure; and a control unit for controlling the pointer storage unit to read a write pointer corresponding to the destination information and also for storing the buffer address derived from the empty address managing means into a storage area subsequent to storage areas on the output port pointed by the write pointer upon receipt of the storage request and the destination information issued from the cell managing means; and for reading a read pointer from the pointer storage unit upon receipt of the output request and the destination information issued from the cell managing means, whereby a buffer address indicative of the read pointer is transmitted to the cell buffer memory and the empty address managing means.

Also, an ATM switch circuit, according to a third aspect of the present invention, is featured by that in an ATM (Asynchronous Transfer Mode) switch circuit including: an ATM cell buffer memory for storing thereinto an ATM cell; and ATM cell managing means for issuing both a storage request for an inputted ATM cell and destination information indicative of an output port corresponding to a destination of the inputted ATM cell, and also for issuing both an output request and the destination information when the ATM cell is outputted, in which:

the inputted ATM cell is written into the cell buffer memory based upon a buffer address defined by the storage request; the written ATM cell is read out from the cell buffer memory based on another buffer address defined by the output request to thereby be transmitted to the ATM cell managing means; and upon receipt of the transmitted ATM cell, the ATM cell managing means transmits the received ATM cell to the output port in accordance with the destination information, the ATM switch circuit is comprised of:

empty address managing means for managing an empty address of the cell buffer memory, and for outputting the empty address as a buffer address to the cell buffer memory upon receipt of the storage request issued from the ATM cell managing means; and buffer address managing means for managing the buffer addresses in such a manner that while "L (symbol "L" being an arbitrary natural number)" pieces of storage areas capable of storing the buffer addresses are defined as one page, a chain structure is formed by chaining a plurality of the pages to each other and is made in correspondence with each of the output ports; upon receipt of the storage request issued from the cell managing means and also the buffer addresses transmitted from the empty address managing means, the received buffer addresses are sequentially stored into the storage area of the page of the chain structure; and also when the output request and the destination information issued from the ATM cell managing means are received, the buffer address managing means sequentially reads out the corresponding buffer address from the storage area of the page of chain structure corresponding to the received destination information to thereby transmit the read buffer address to both the cell buffer memory and the empty address managing means.

Also, an ATM switch circuit, according to a fourth aspect of the present invention, is featured by that in the ATM switch circuit according to the third aspect of the present invention, the buffer address managing means includes:

a buffer address storage unit for storing thereinto the buffer address derived from the empty address managing means, while the "L" pieces of storage areas for storing the buffer addresses are defined as one page, by chaining the pages to each other to form chain structures and also by employing the chain structures corresponding to the respective output ports;

a pointer storage unit for storing thereinto both a write pointer and a read pointer with respect to each of the chain structures, the write pointer pointing out a latest buffer address contained in a page located at a last portion of the chain structure of the buffer address storage unit, and the read pointer pointing out a first buffer address contained in a page located at a head portion of the chain structure; and a control unit for controlling said pointer storage unit to read a write pointer corresponding to the destination information and also for storing the buffer address derived from the empty address managing means into a storage area subsequent to storage areas on the output port pointed by the write pointer upon receipt of the storage request and the destination information issued from the cell managing means; and for reading a read pointer from the pointer storage unit upon receipt of the output request and the destination information issued from the cell managing means, whereby a buffer address indicative of the read pointer is transmitted to the cell buffer memory and the empty address managing means.

Also, an ATM switch circuit, according to a fifth aspect of the present invention, is featured by comprising:

multiplexing means for producing a storage request of an inputted ATM cell and destination information indicative of an output port corresponding to the destination of the inputted ATM cell;

separating means for producing an output request and destination information when the ATM cell is outputted;

a cell buffer memory for storing thereinto the ATM cell derived from the multiplexing means, while "L" pieces of storage areas capable of storing the ATM cells are defined as one page, by chaining the pages to each other so as to form a chain structure and also by employing the respective chain structures corresponding to the respective output ports, and also for reading the ATM cell to send the read ATM cell to the separating means; and cell buffer memory control means for controlling such that the ATM cells derived from the multiplexing means are sequentially stored into the chain structure corresponding to the destination information, and when the storage request and the destination produced from the multiplexing means are received, the cell buffer memory is pointed out; and also for controlling such that the ATM cells are sequentially read from the chain structure corresponding to the destination information to thereby transmit the read ATM cells to the separating means, and when both the output request and the destination information derived from the separating means are received, the cell buffer memory is pointed out.

Also, an ATM switch circuit, according to a sixth aspect of the present invention, is featured by that in the ATM switch circuit according to the fifth aspect of the present invention, the cell buffer memory control means includes:

an address storage unit for storing thereinto both a writing buffer address and a reading buffer address, the writing buffer address designating a latest ATM cell contained in a page located at a last portion of the chain structure of the cell buffer memory, and the reading buffer address designating a first ATM cell contained in another page located at a head portion of the chain structure; and a control unit for controlling said cell buffer memory in such a manner that when the storage request and the destination information are received from the multiplexing means, the control unit reads the writing buffer address corresponding to the destination information from the address storage unit so as to control the cell buffer memory based upon the read writing buffer address, whereas when the output request and the destination information are received from said separating means, the control unit reads the reading buffer address from the address storage unit so as to control the cell buffer memory based upon the read reading buffer address.

Also, an ATM switch circuit controlling method, according to a seventh aspect of the present invention, is featured by that in a method for controlling an ATM (Asynchronous Transfer Mode) switch circuit by controlling: an ATM cell buffer memory for storing thereinto an ATM cell; and ATM cell managing means for issuing both a storage request for an inputted ATM cell and destination information indicative of an output port corresponding to a destination of the inputted ATM cell, and also for issuing both an output request and the destination information when the ATM cell is outputted, in which:

the inputted ATM cell is written into the cell buffer memory based upon a buffer address defined by the storage request; the written ATM cell is read out from the cell buffer memory based on another buffer address defined by the output request to thereby be transmitted to the ATM cell managing means; and upon receipt of the transmitted ATM cell, the ATM cell managing means transmits the received ATM cell to the output port in accordance with the destination information, the ATM switch circuit controlling method is comprised of:

a first step for managing an empty address of the cell buffer memory, and for outputting the empty address as a buffer address to the cell buffer memory upon receipt of the storage request issued from the ATM cell managing means;

a second step for sequentially chaining a plurality of buffer addresses to each other when receiving the storage requests issued from the ATM cell managing means and the empty address as the buffer address transmitted from the first step, whereby such plural buffer addresses of ATM cells directed to the same output port are formed in a chain structure; and a third step for reading out the corresponding buffer address from the chain structure corresponding to the received destination thereof when the output request and the destination information issued from the ATM cell managing means are received, by which the read buffer address is transmitted to the cell buffer memory, wherein:

the buffer address read at the third step is managed at the first step.

Also, an ATM switch circuit controlling method, according to an eighth aspect of the present invention, is featured by that in a method for controlling an ATM (Asynchronous Transfer Mode) switch circuit by controlling: an ATM cell buffer memory for storing thereinto an ATM cell; and ATM cell managing means for issuing both a storage request for an inputted ATM cell and destination information indicative of an output port corresponding to a destination of the inputted ATM cell, and also for issuing both an output request and the destination information when the ATM cell is outputted, in which:

the inputted ATM cell is written into the cell buffer memory based upon a buffer address defined by the storage request; the written ATM cell is read out from the cell buffer memory based on another buffer address defined by the output request to thereby be transmitted to the ATM cell managing means; and upon receipt of the transmitted ATM cell, the ATM cell managing means transmits the received ATM cell to the output port in accordance with the destination information, the ATM switch circuit controlling method is comprised of:

a first step for managing an empty address of the cell buffer memory, and for outputting the empty address as a buffer address to the cell buffer memory upon receipt of the storage request issued from the ATM cell managing means;

a second step for managing the buffer addresses in such a manner that while "L (symbol "L" being an arbitrary natural number)" pieces of storage areas capable of storing the buffer addresses are defined as one page, a chain structure is formed by chaining a plurality of the pages to each other and is made in correspondence with each of the output ports; upon receipt of the storage request issued from the cell managing means and also the buffer addresses transmitted from the first step, the received buffer addresses are sequentially stored into the storage area of the page of the chain structure; and a third step for managing the buffer addresses in such a way that when the output request and the destination information issued from the ATM cell managing means are received, the buffer address managing means sequentially reads out the corresponding buffer address from the storage area of the page of chain structure corresponding to the received destination information to thereby transmit the read buffer address to both the cell buffer memory and the empty address managing means; wherein:

the buffer address read at the third step is managed at the first step.

Furthermore, an ATM switch circuit controlling method, according to a ninth aspect of the present invention, is featured by such a method for controlling an ATM (Asynchronous Transfer Mode) switch circuit, comprising:

a first step for producing a storage request of an inputted ATM cell and destination information indicative of an output port corresponding to the destination of the inputted ATM cell;

a second step for producing an output request and destination information when the ATM cell is outputted;

a third step for storing thereinto the ATM cell processed at the first step, while "L" pieces of storage areas capable of storing the ATM cells are defined as one page, by chaining the pages to each other so as to form a chain structure and also by employing the respective chain structures corresponding to the respective output ports, and also for reading the ATM cell to send the read ATM cell to the second step; and a fourth step for controlling such that the ATM cells processed at the first step are sequentially stored into the chain structure corresponding to the destination information, when the storage request and the destination issued from the first step are received; wherein:

when both the output request and the destination information issued from the second step are received, the ATM cells are sequentially read from the chain structure corresponding to the destination information to execute the process operation defined at the second step with respect to said read ATM cells.

BRIEF DESCRIPTION OF THE DRAWINGS

The above and other objects, novel advantages and features of the present invention will be more apparent from the following description taken in conjunction with the accompanying drawings in which.

DETAILED DESCRIPTION OF THE PREFERRED EMBODIMENTS

Referring to drawings, ATM switch circuits according to various preferred embodiments of the present invention will be described.

Overview of First ATM Switch Circuit

Figure 1:
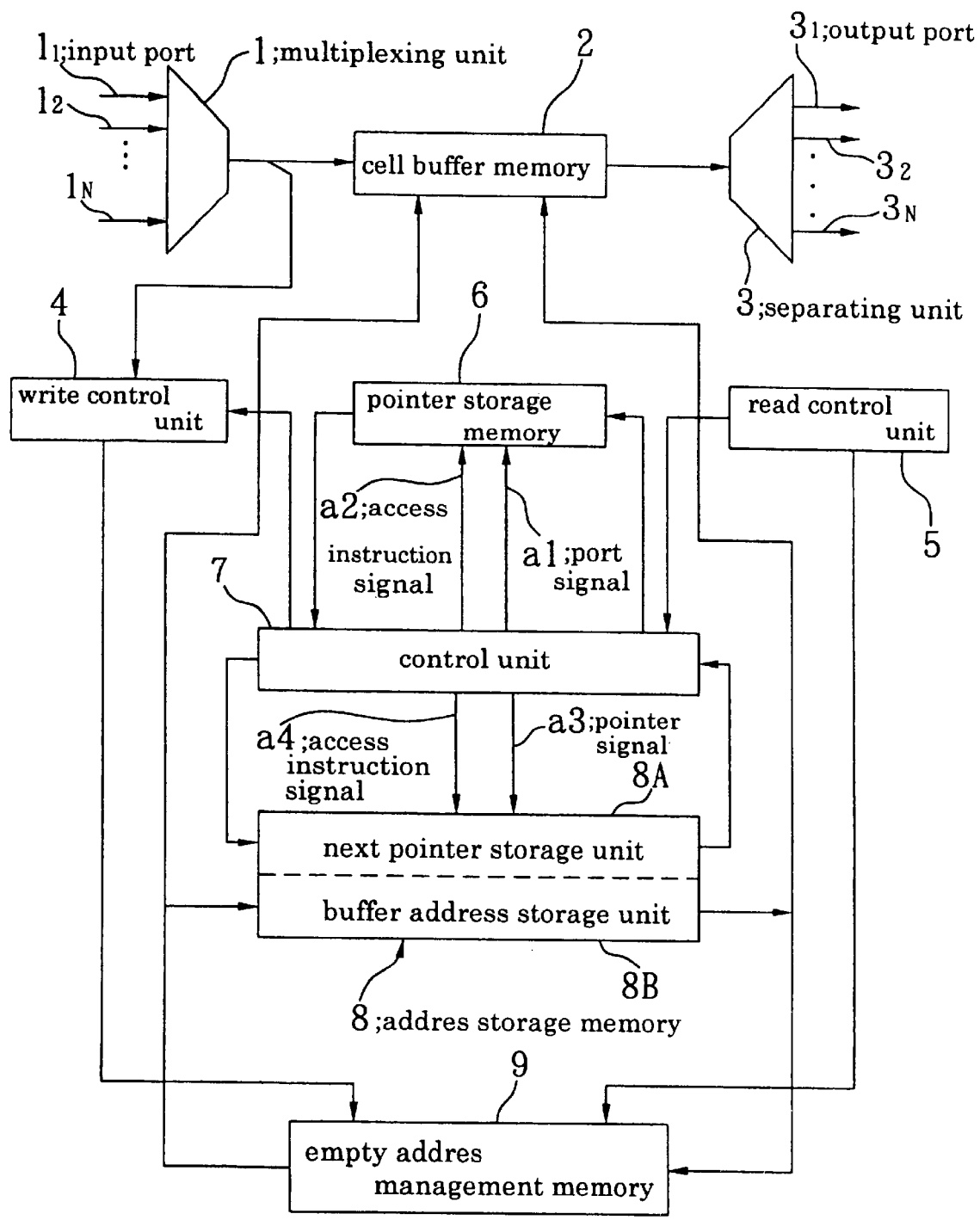
FIG. 1 is a schematic block diagram for indicating an arrangement of an ATM switch circuit according to a first embodiment of the present invention.
Figure 2:
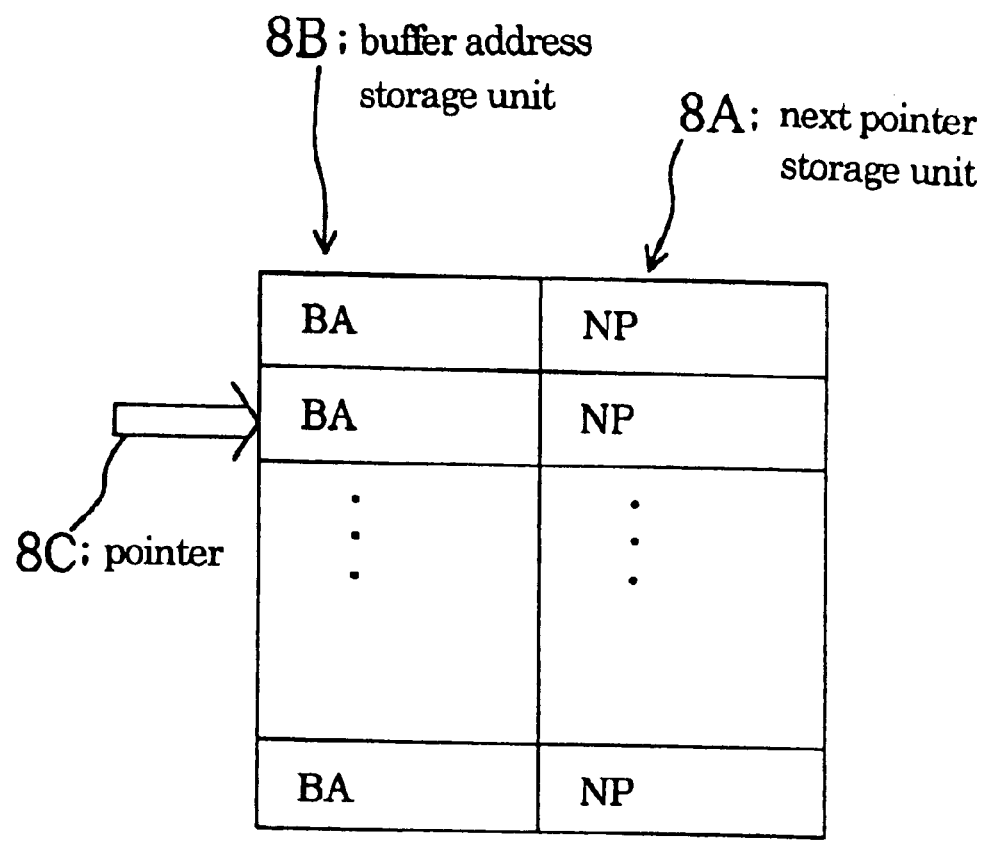
FIG. 2 is a structural diagram for showing a structure of an address storage memory employed in the first ATM switch circuit of FIG. 1.
Figure 3:
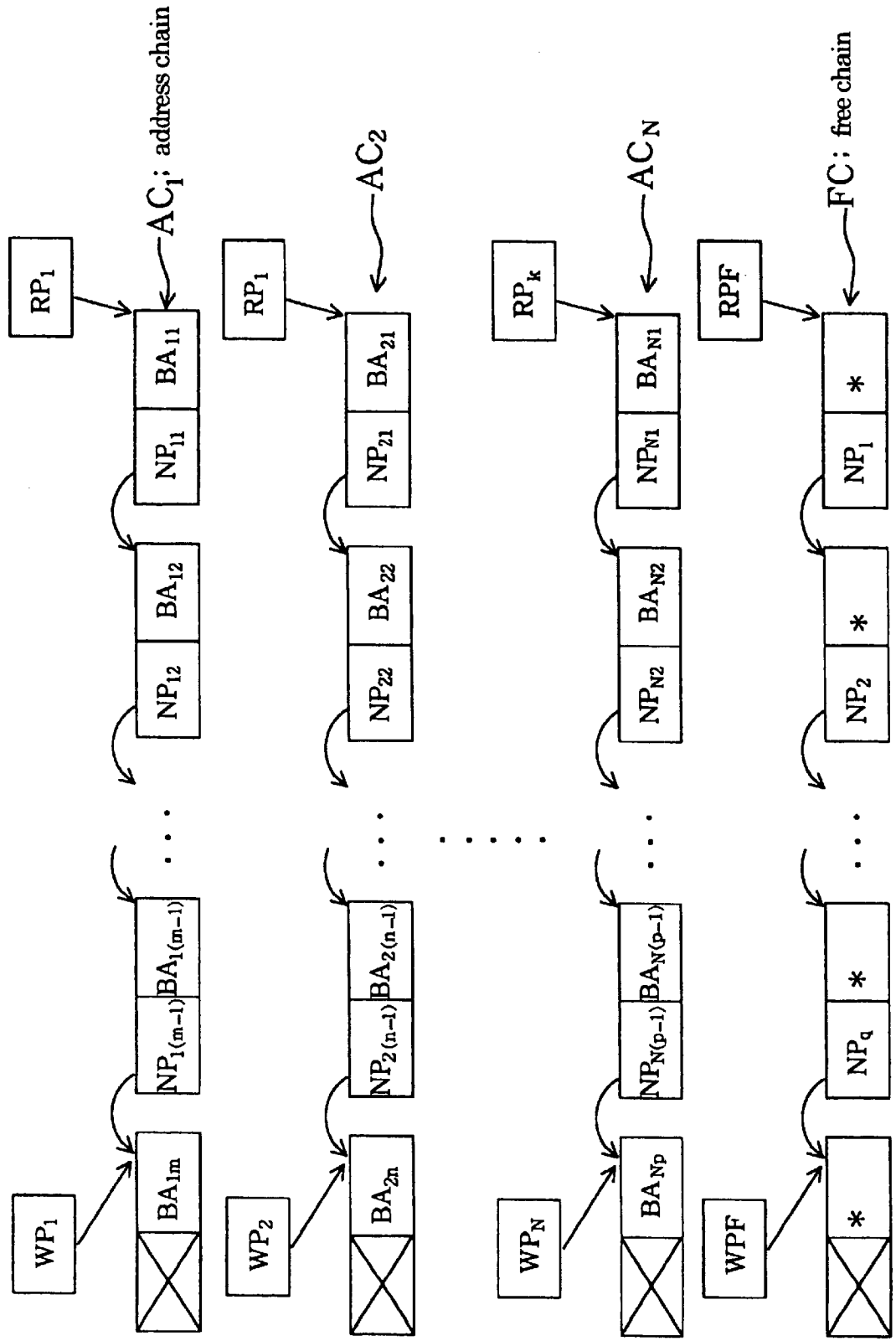
FIG. 3 is an explanatory diagram for explaining a chain structure of the first ATM switch circuit shown in FIG. 1.
Figure 4:
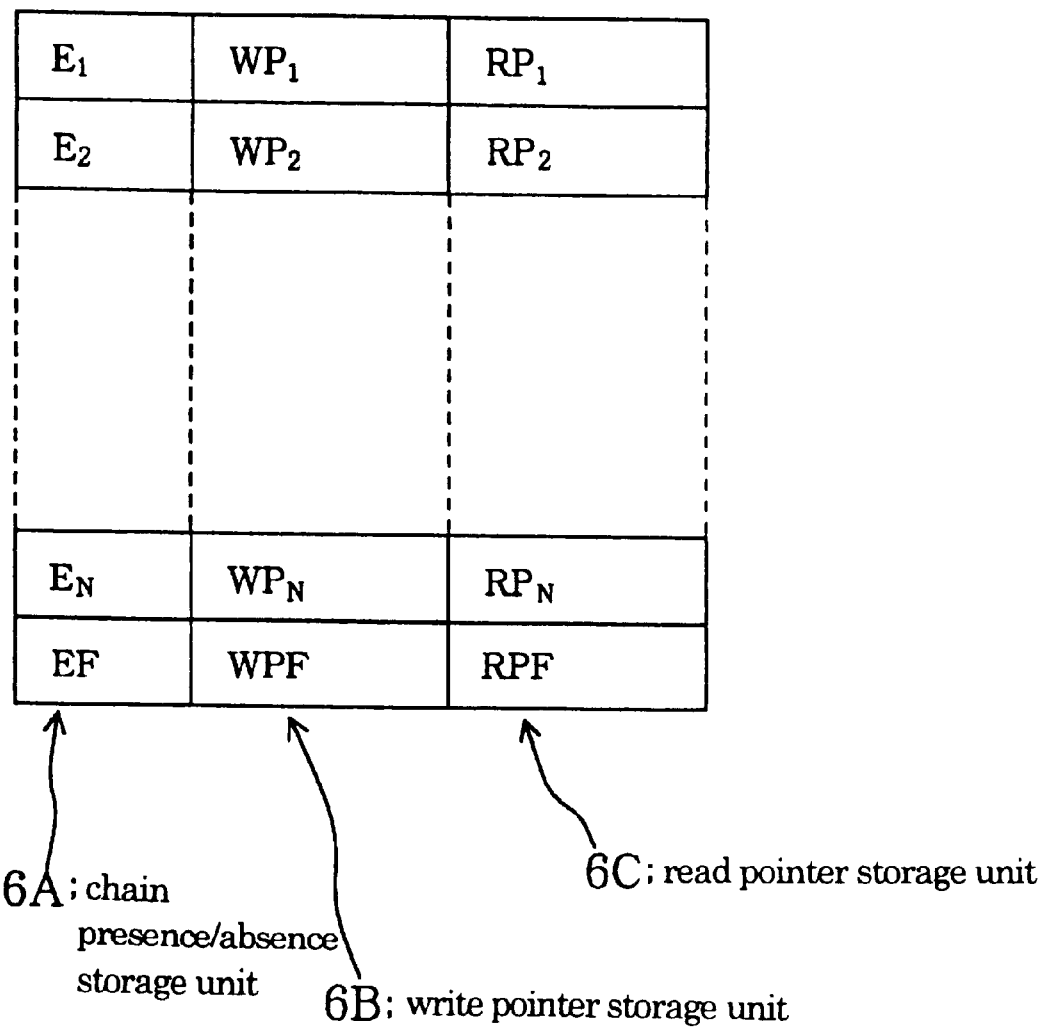
FIG. 4 is a structural diagram for representing a structure of a pointer storage memory employed in the first ATM switch circuit of FIG. 1.
Figure 5:
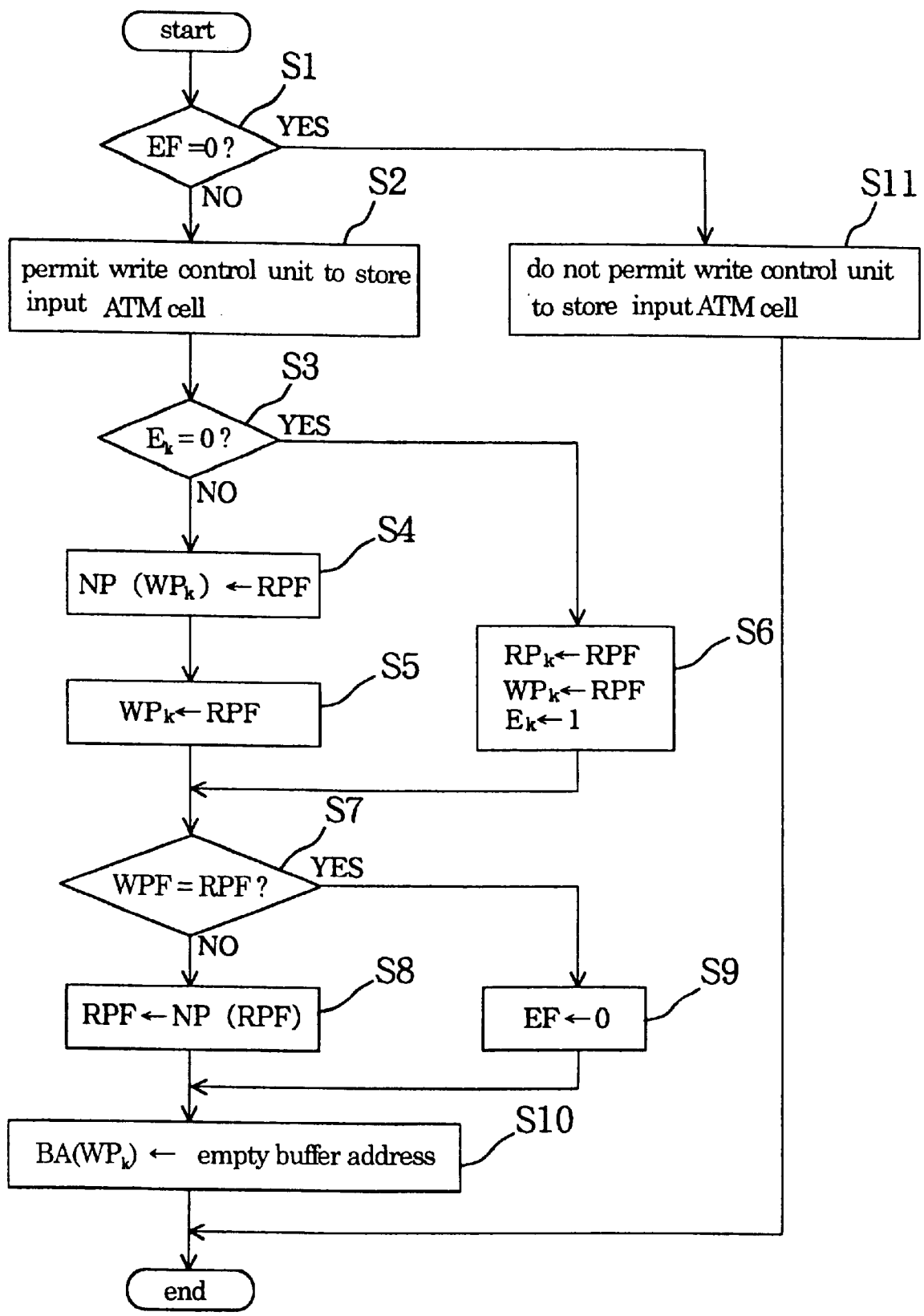
FIG. 5 is a flow chart for describing a process operation of an ATM cell storing operation by a control unit employed in the first ATM switch circuit of FIG. 1.
Figure 6:
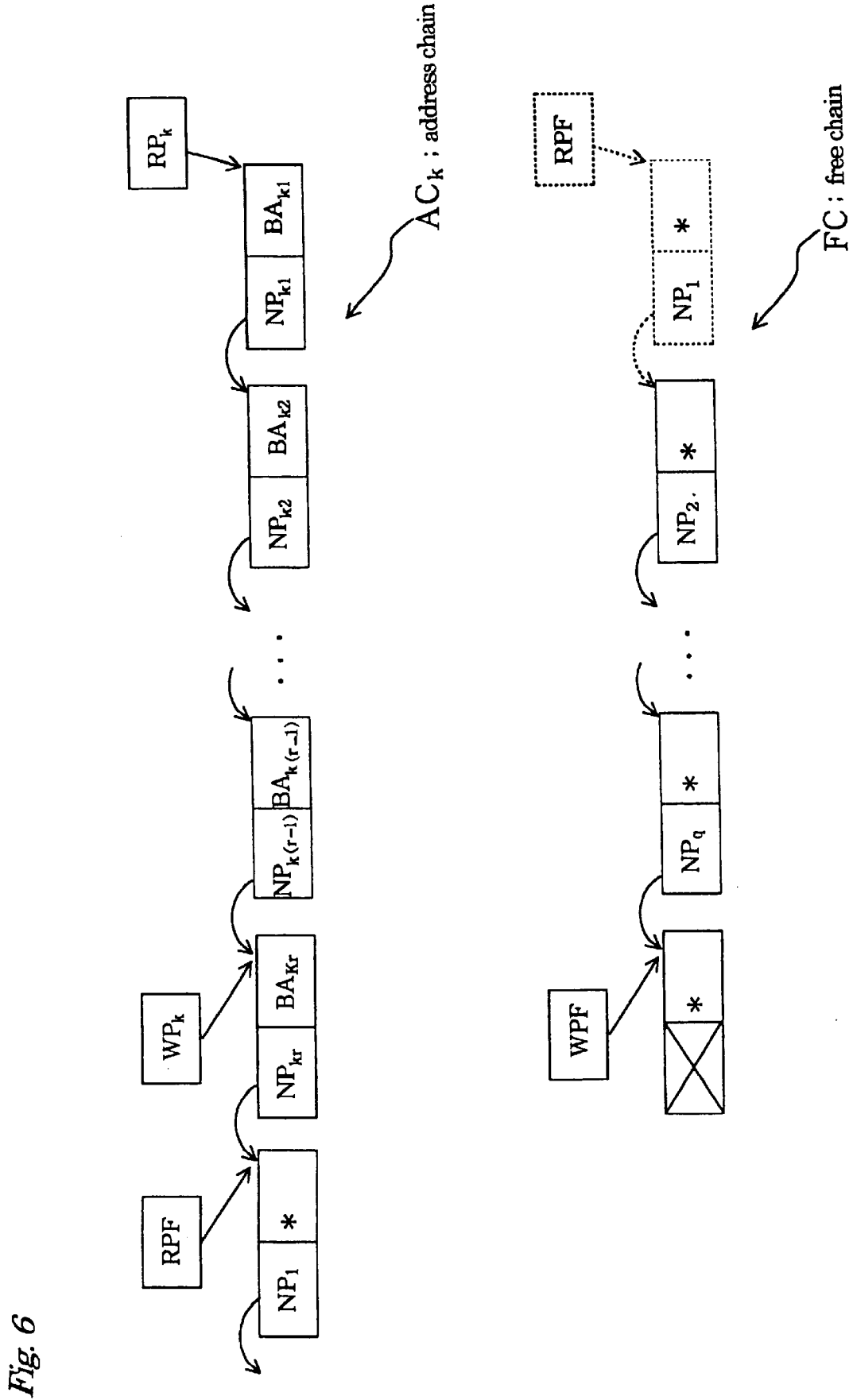
FIG. 6 is an explanatory diagram for explaining a move of a pointer by a processing operation of the control unit employed in the first ATM switch circuit of FIG. 1.
Figure 7:
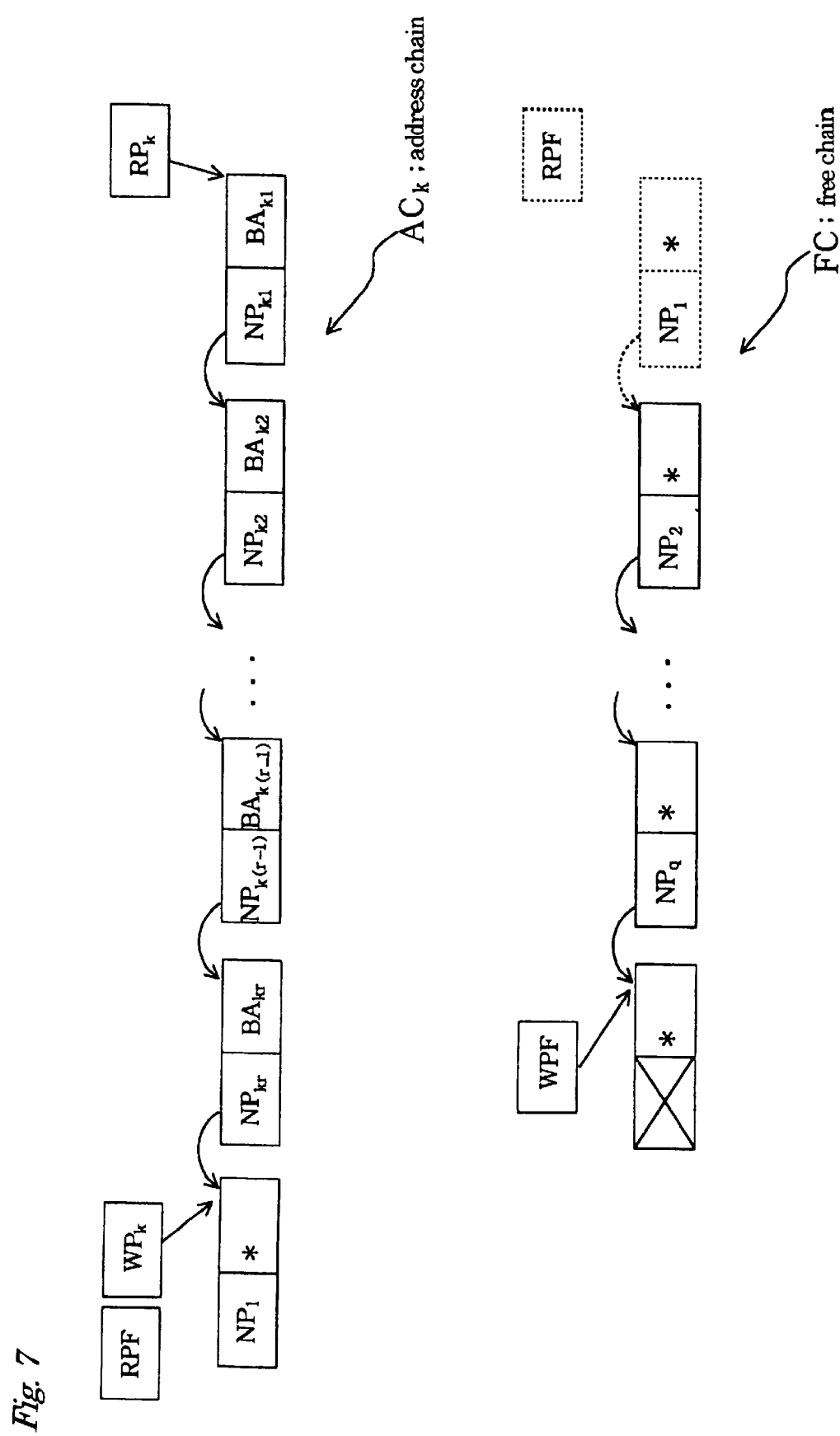
FIG. 7 is an explanatory diagram for explaining a move of a pointer by a processing operation of the control unit employed in the first ATM switch circuit of FIG. 1.
Figure 8:
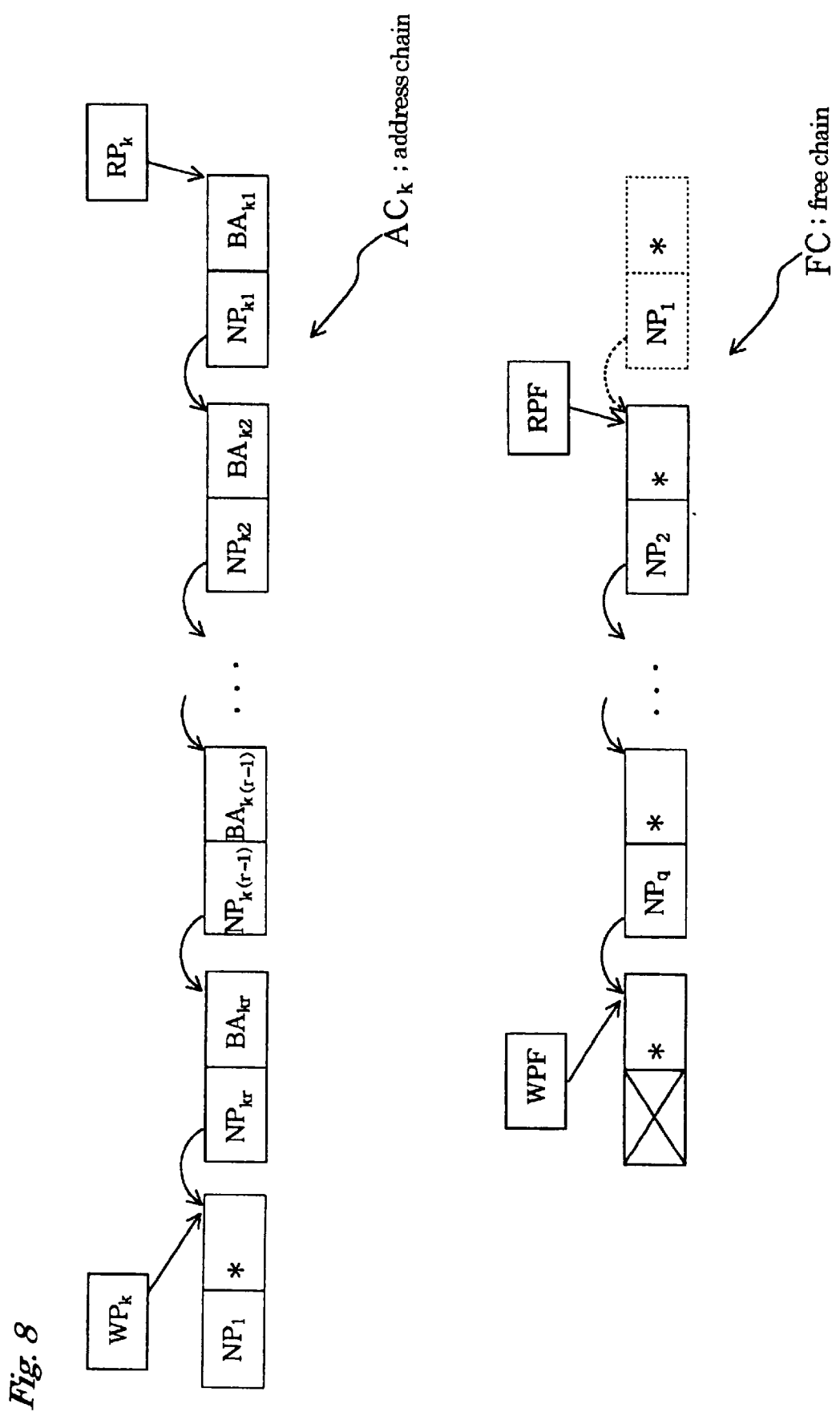
FIG. 8 is an explanatory diagram for explaining a move of a pointer by a processing operation of the control unit employed in the first ATM switch circuit of FIG. 1.
Figure 9:
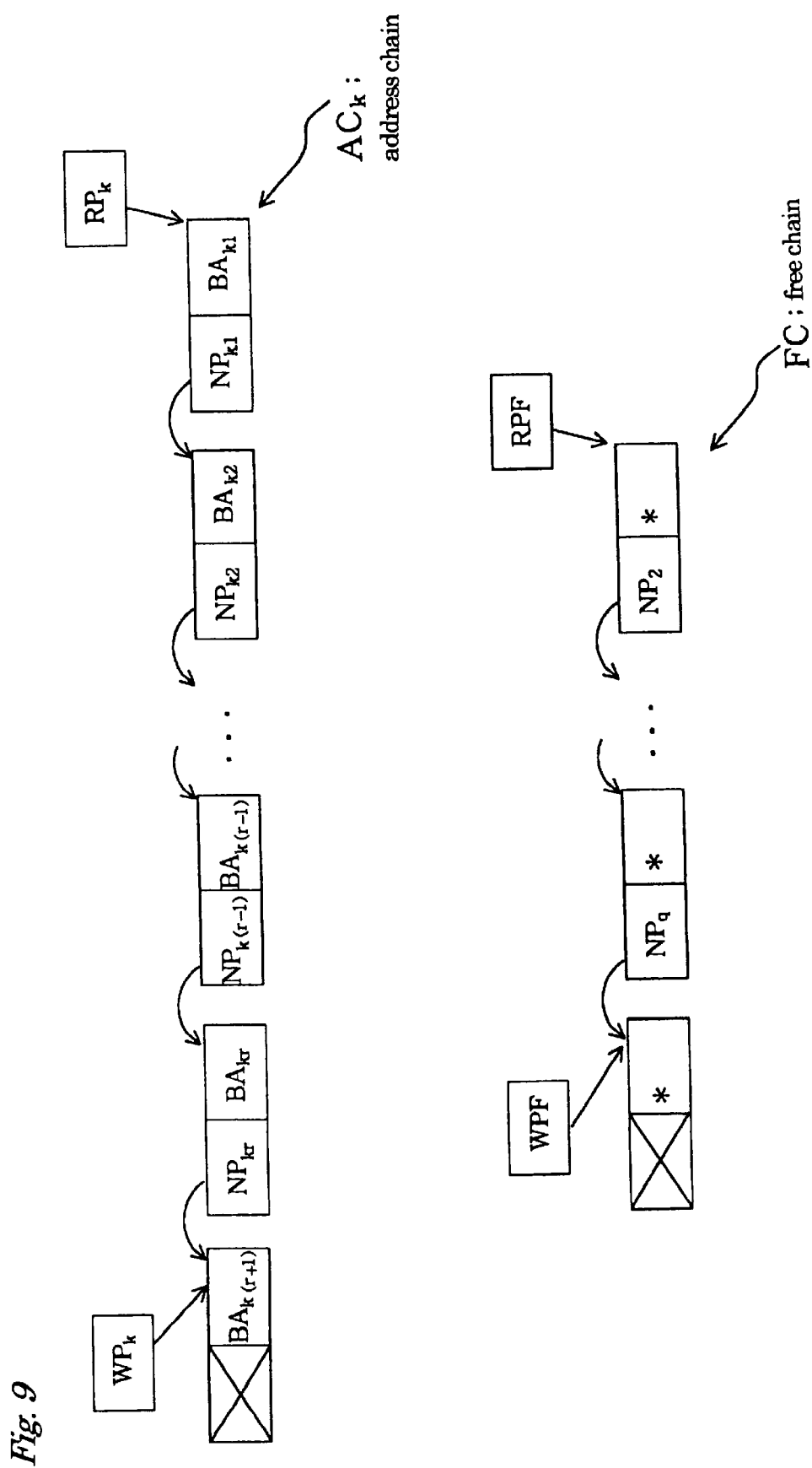
FIG. 9 is an explanatory diagram for explaining a move of a pointer by a processing operation of the control unit employed in the first ATM switch circuit of FIG. 1.
Figure 10:
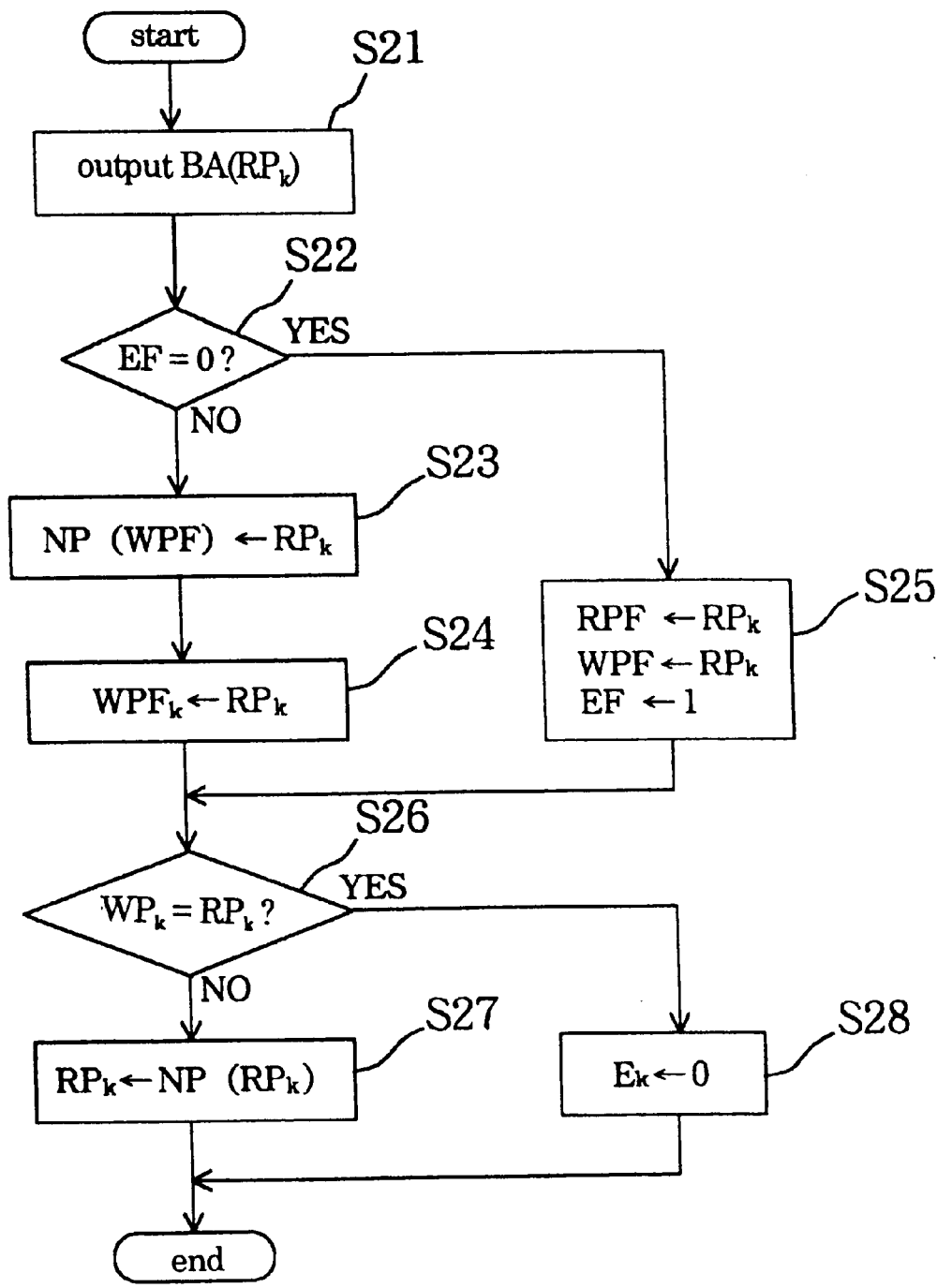
FIG. 10 is a flow chart for explaining a cell output processing operation by the control unit employed in the first ATM switch circuit of FIG. 1.
Figure 11:
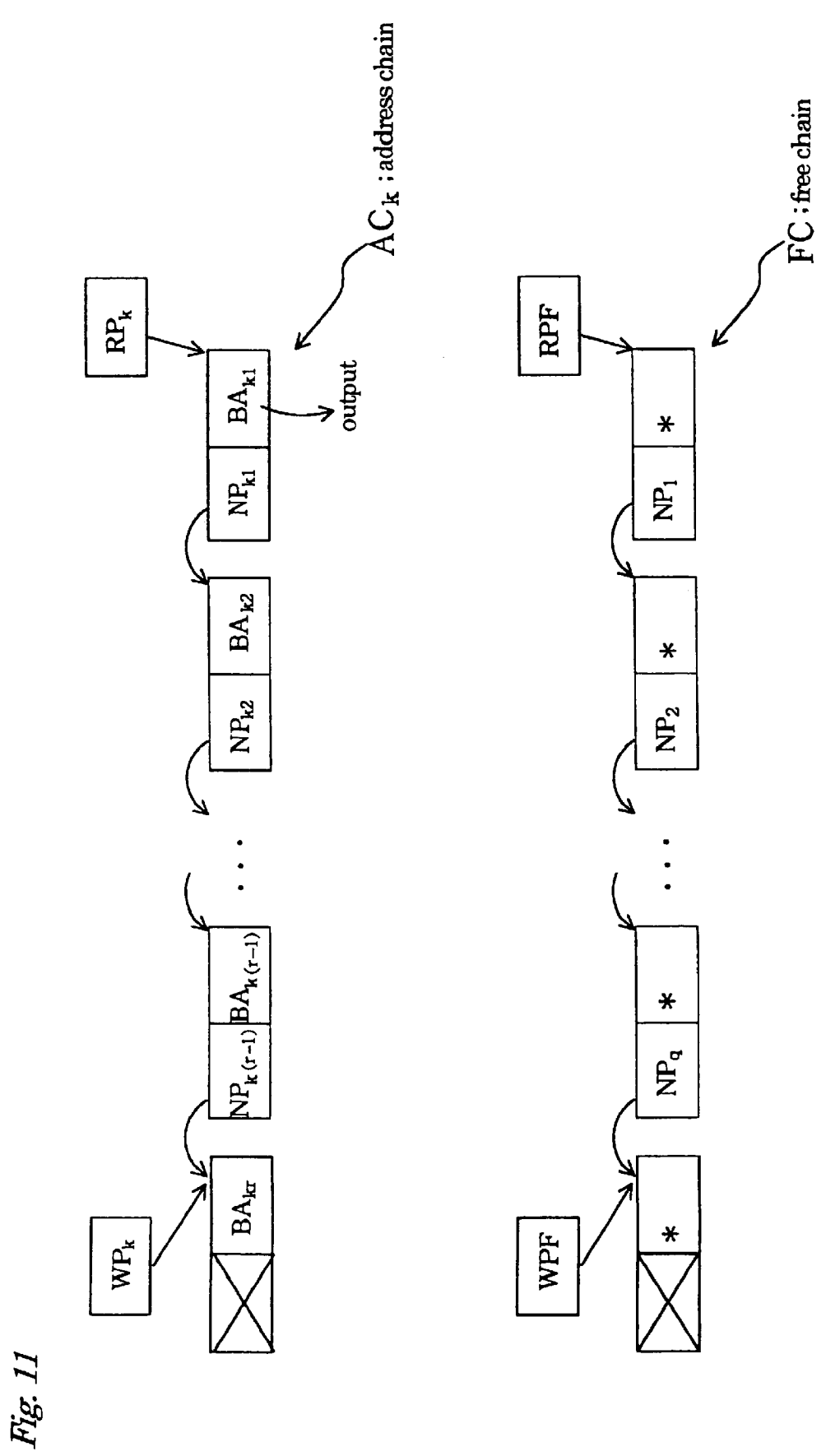
FIG. 11 is an explanatory diagram for describing a move of the pointer by a processing operation of the control unit employed in the first ATM switch circuit of FIG. 1.
Figure 12:
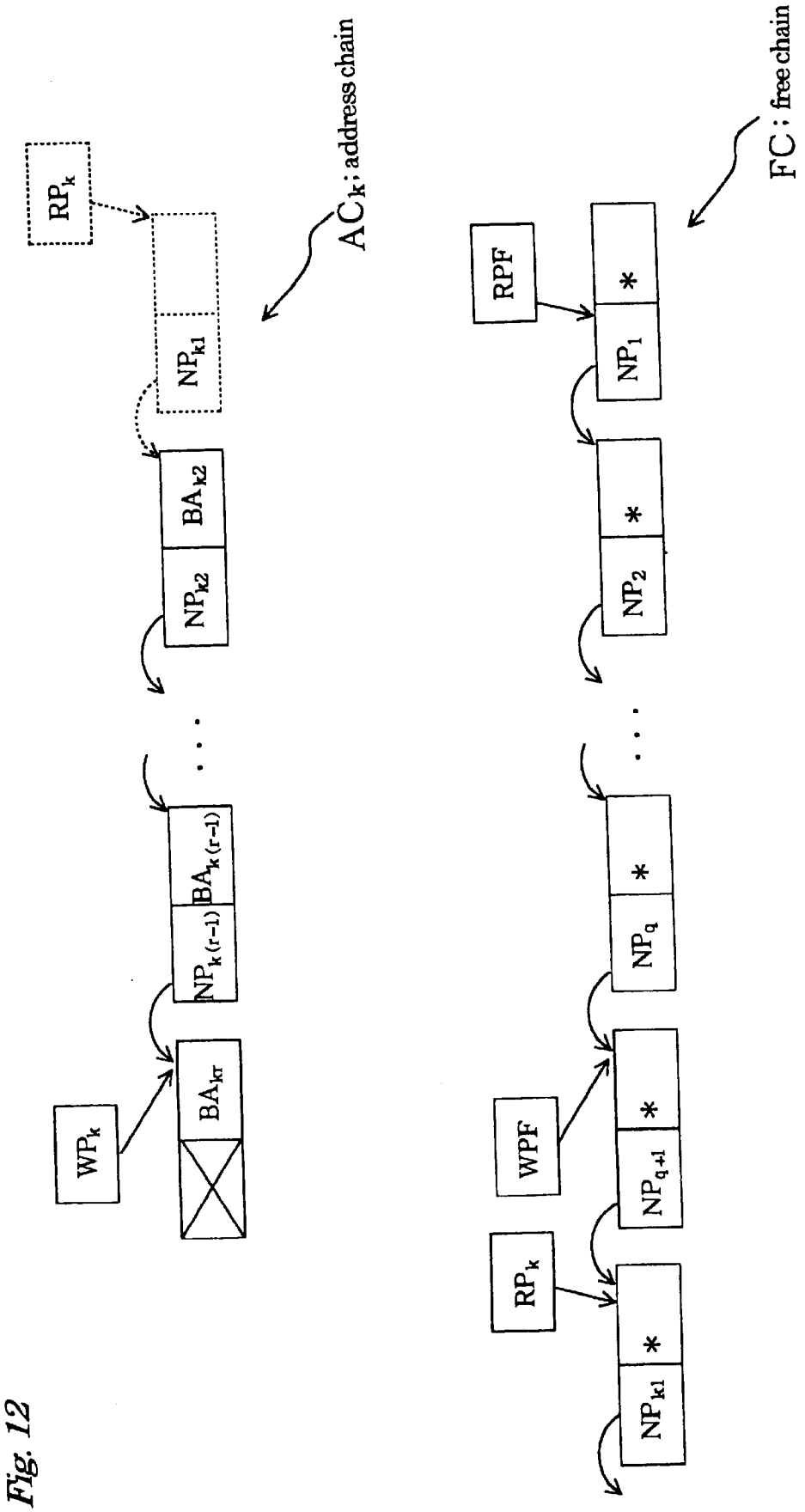
FIG. 12 is an explanatory diagram for describing a move of the pointer by a processing operation of the control unit employed in the first ATM switch circuit of FIG. 1.
Figure 13:
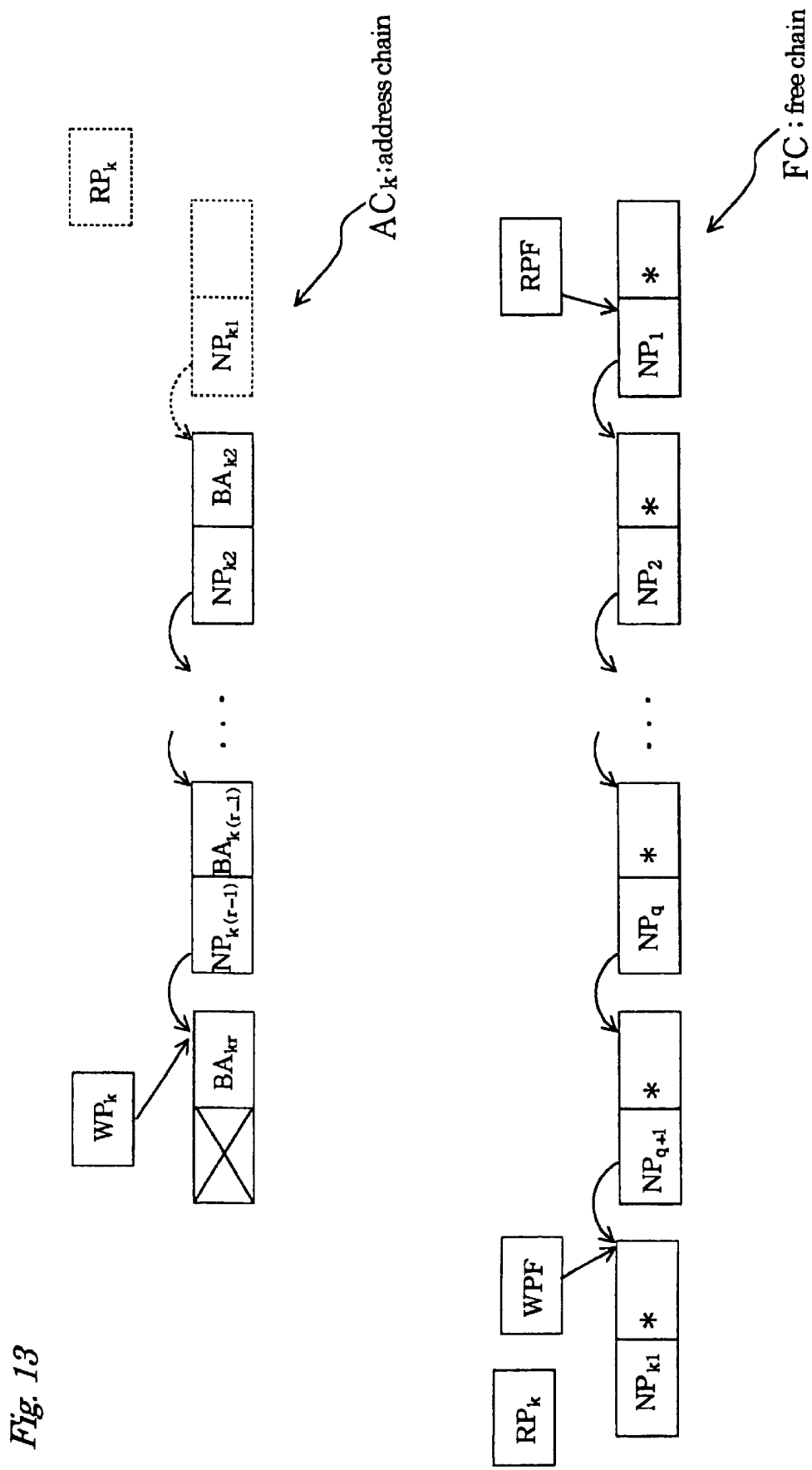
FIG. 13 is an explanatory diagram for describing a move of the pointer by a processing operation of the control unit employed in the first ATM switch circuit of FIG. 1.
Figure 14:
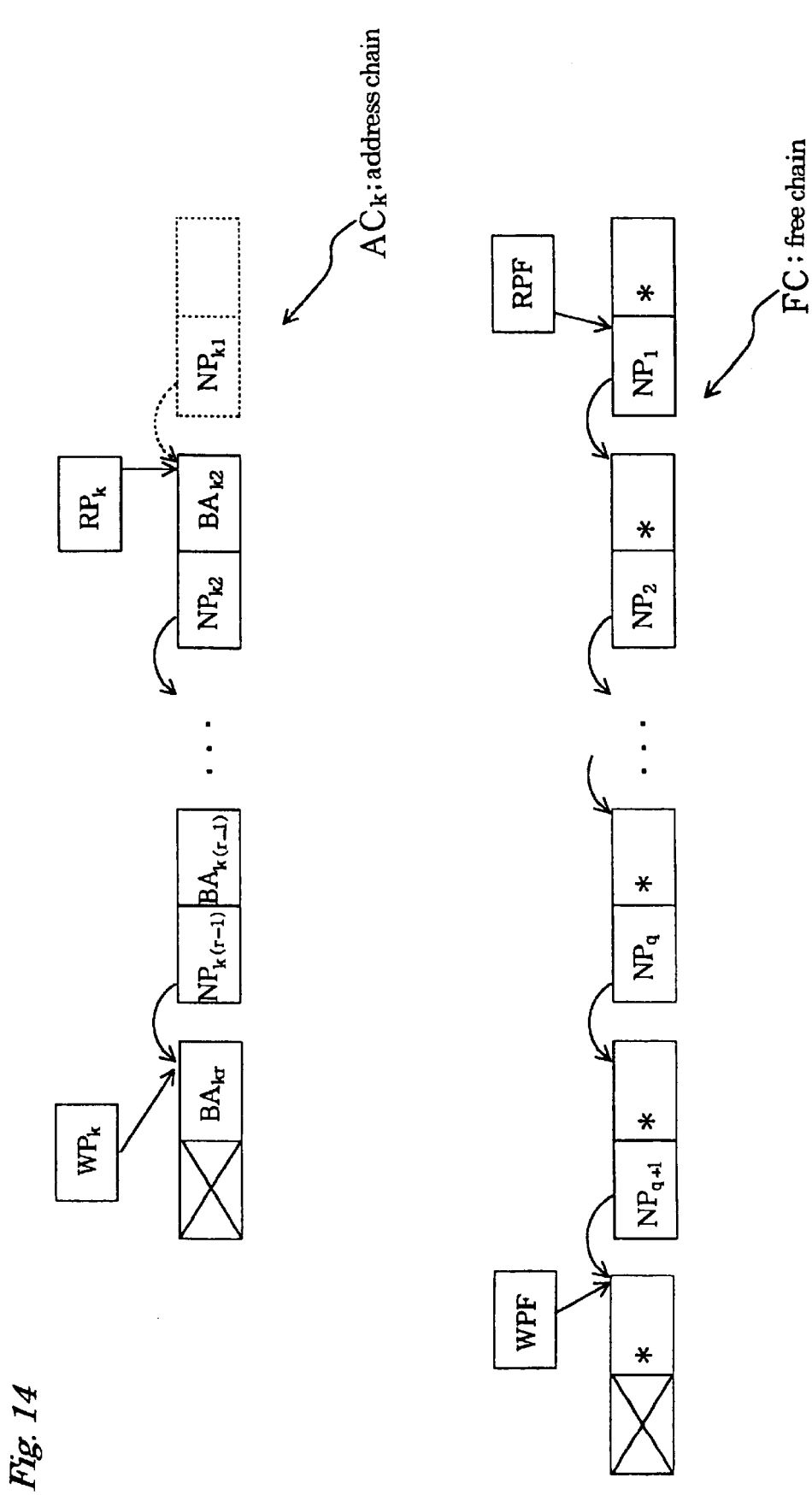
FIG. 14 is an explanatory diagram for describing a move of the pointer by a processing operation of the control unit employed in the first ATM switch circuit of FIG. 1.

FIG. 1 is a schematic block diagram for indicating an arrangement of an ATM switch circuit according to a first embodiment of the present invention. FIG. 2 is a structural diagram for showing a structure of an address storage memory employed in the first ATM switch circuit of FIG. 1. FIG. 3 is an explanatory diagram for explaining a chain structure of the first ATM switch circuit shown in FIG. 1. FIG. 4 is a structural diagram for representing a structure of a pointer storage memory employed in the first ATM switch circuit of FIG. 1. FIG. 5 is a flow chart for describing a process operation of an ATM cell storing operation by a control unit employed in the first ATM switch circuit of FIG. 1. FIG. 6 is an explanatory diagram for explaining a move of a pointer by a processing operation of the control unit employed in the first ATM switch circuit of FIG. 1. FIG. 7 is an explanatory diagram for explaining a move of a pointer by a processing operation of the control unit employed in the first ATM switch circuit of FIG. 1. FIG. 8 is an explanatory diagram for explaining a move of a pointer by a processing operation of the control unit employed in the first ATM switch circuit of FIG. 1. FIG. 9 is an explanatory diagram for explaining a move of a pointer by a processing operation of the control unit employed in the first ATM switch circuit of FIG. 1. FIG. 10 is a flow chart for explaining a cell output processing operation by the control unit employed in the first ATM switch circuit of FIG. 1. FIG. 11 is an explanatory diagram for describing a move of the pointer by a processing operation of the control unit employed in the first ATM switch circuit of FIG. 1. FIG. 12 is an explanatory diagram for describing a move of the pointer by a processing operation of the control unit employed in the first ATM switch circuit of FIG. 1. FIG. 13 is an explanatory diagram for describing a move of the pointer by a processing operation of the control unit employed in the first ATM switch circuit of FIG. 1. FIG. 14 is an explanatory diagram for describing a move of the pointer by a processing operation of the control unit employed in the first ATM switch circuit of FIG. 1.

Arrangement of First ATM Switch Circuit

As indicated in FIG. 1, this first ATM (Asynchronous Transfer Mode) switch circuit is arranged by a multiplexing unit 1, a cell buffer memory 2, a separating unit 3, a write control unit 4, a read control unit 5, a pointer storage memory 6, a control unit 7, an address storage memory 8, and an empty address management memory 9.

When ATM cells are received from the input ports $1_1$, $1_2$, - - - , $1_N$, the multiplexing unit 1 multiplexes the ATM cells by each other to produce a multiplexed ATM cell, and then transmits this multiplexed ATM cell to the cell buffer memory 2.

Upon receipt of this multiplexed ATM cell from the multiplexing unit 1 and also a write buffer address from the empty address management memory 9, the cell buffer memory 2 stores this received ATM cell into a storage area designated by this write buffer address. When the cell buffer memory 2 receives a read buffer address from the address storage memory 8, this cell buffer memory 2 reads an ATM cell stored in such a storage area designed by this read buffer address, and then outputs the read cell to the separating unit 3.

Upon receipt of the ATM cells read from the cell buffer memory 2, the separating unit 3 separates the above-described ATM cells. Thereafter, the separating unit 3 transfers the separated ATM cell to the relevant output port among the plural output ports $3_1$, $3_2$, - - - , $3_N$.

When the multiplexed ATM cell is outputted from the multiplexing unit 1, the write control unit 4 checks the output port to which the above-described cell is transmitted based upon information about a header portion contained in this multiplexed ATM cell. The write control unit 4 sends to the control unit 7 both a port signal indicative of the output port of the above-described transmitted cell and a storage request of this transmitted cell. Thereafter, when a storage permission is received from the control unit 7, the write control unit 4 sends an address output request to the empty address management memory 9. When the read control unit 5 outputs the ATM cell to the output ports $3_1$, $3_2$, - - - , $3_N$, this read control unit 5 transmits both the output port 31 and the output instruction of the buffer address to the control unit 7.

The empty address management memory 9 manages buffer addresses of empty areas in the cell buffer memory 2. Upon receipt of the address output request issued from the write control unit 4, the empty address management memory 9 sends a buffer address corresponding to an address of an empty region to both the cell buffer memory 2 and the address storage memory 8. As indicated in FIG. 2, this address storage memory 8 is constructed of a next pointer storage unit 8A and a buffer address storage unit 8B. A buffer address "BA" is stored into the relevant storage area of this buffer address storage unit 8B. This buffer address indicates a storage area of an ATM cell stored in the cell buffer memory 2. It should be understood that the above-explained buffer address "BA" is used to read an ATM cell from the cell buffer memory 2.

The next pointer storage unit 8A stores thereinto information used to modify each of the buffer memories so as to make up a chain structure. For instance, it is assumed that a buffer address of an ATM cell sent to the output port $3_1$ is equal to "$BA_{11}$", and a buffer address of another ATM cell subsequent to the first-mentioned ATM cell is equal to "$BA_{12}$". At this time, such information which constitutes a pair of the above buffer address "$BA_{11}$" and also indicates the next buffer address "$BA_{12}$" corresponds to a next pointer "$NP_{11}$". This "next pointer $NP_{11}$" is stored into the next pointer storage unit 8A in combination with the buffer address "$BA_{11}$".

As previously explained, buffer addresses "$BA_{11}$", "$BA_{12}$", - - - , "$BA_{1m}$" of ATM cells sent to the output port 31 are chained by next pointers "$NP_{11}$", "$NP_{12}$", - - - , "$NP_{1(m-1)}$" to form a logical chain structure. As a result, as shown in FIG. 3, an address chain $AC_1$ corresponding to the output port $3_1$ is formed. Similarly, address chains $AC_2$, - - - , $AC_N$ are formed by next pointers "$NP_{21}$" to "$NP_{2(n-1)}$", - - - , "$NP_{N1}$" to "$NP_{N(P-1)}$".

Similar to the above-described manner, unused areas contained in the buffer address storage unit 8B are sequentially chained with each other by next pointers "$NP_1$" to "$NP_q$" so as to form a logical chain structure. As a consequence, a free chain FC is formed. These unused areas to which no addresses are stored are indicated by symbol "*" as shown in FIG. 3, and similarly in other drawings.

The buffer address "BA" and the next pointer "NP" are read/written from/into the address storage memory 8 under control of the control unit 7. In other words, as represented in FIG. 2, when the address storage memory 8 receives an access instruction signal a4 indicative of reading operation and also a pointer signal a3 for designating a storage area from the control unit 7, the next pointer "NP" of the next pointer storage unit 8A and the buffer address "BA" of the buffer address storage unit 8B are read from the storage area designated by the pointer 8C based upon the pointer signal a3, and then are supplied to the control unit 7.

In the case that the address storage memory 8 receives both the pointer signal a3 and the address instruction signal 4a indicative of the writing operation from the control unit 7, both the buffer address "BA" and the pointer "NP" are written into the storage areas of the next pointer storage unit 8A and also of the buffer address storage unit 8B, which are designated by the pointer 8C.

As indicated in FIG. 4, the pointer storage memory 6 is equipped with a chain presence/absence storage unit 6A, a write pointer storage unit 6B, and a read pointer storage unit 6C. As shown in this drawing, presence/absence data "$E_1$", "$E_2$", - - - , "$E_N$" and "EF" are stored into this chain presence/absence storage unit 6A. The presence/absence data "$E_1$", "$E_2$", - - - , "$E_N$" indicate as to whether or not address chains $AC_1, AC_2$, - - -, $AC_N$ are present, whereas the presence/absence data "EF" indicates as to whether or not the free chain is present. In this embodiment, when the values of the respective presence/absence data "$E_1$", "$E_2$", - - - , "$E_N$", and "EF" are equal to "1", these data indicate "chain is present", whereas when the values of the respective presence/absence data are equal to "0", these data represent "chain is not present, or absent".

As indicated in FIG. 4, write pointers "$WP_1$", "$WP_2$", - - - , "$WP_N$" and "WPF" are stored into the write pointer storage unit 6B.

The write pointers "$WP_1$", "$WP_2$", - - - , "$WP_N$" correspond to pointers indicative of buffer addresses of final portions of the address chains $AC_1, AC_2$, - - - , $AC_N$. Also, the write pointer "WPF" corresponds to a pointer indicative of an unused area of a final portion of the free chain FC. As the respective pointers, pointers representative of storage areas of the address storage memory, or pointers used to specify these storage areas are employed.

As shown in FIG. 4, read pointers "$RP_1$", "$RP_2$", - - - , "$RP_N$", and "RPF" are stored into the read pointer storage unit 6C. The read pointers "$RP_1$", "$RP_2$", - - - , "$RP_N$" correspond to such pointers indicative of buffer addresses of head portions of the address chains $AC_1, AC_2$, - - - , $AC_N$, whereas the read pointer "RPF" corresponds to such a pointer representative of an unused area of a head portion of the free chain FC.

Both the above-explained read pointers and the above-described write pointers are read/written from/into the pointer storage memory 6 under control of the control unit 7. In other words, when the pointer storage memory 6 receives a port signal a1 indicative of the address chain and the free chain, and also an access instruction signal a2 indicative of the reading writing operations from the control unit 7, the presence/absence data, the write pointer, and also the read pointer, which correspond to the port signal a1, are read out from the chain presence/absence storage unit 6A, the write pointer storage unit 6B and the read pointer storage unit 6C. Then, these presence/absence data, write pointer, and read pointer are supplied to the control unit 7.

Also, in such a case that both the port signal a1 indicative of the address chain and the free chain, and the access instruction signal a2 indicative of the writing/reading operations are received from the control unit 7 by the pointer storage memory 6, the write data received from the control unit 7 are stored as the presence/absence data, the write pointer, and the read pointer into the chain presence/absence storage unit 6A, the write pointer storage unit 6B, and the read pointer storage unit 6C, respectively.

ATM Cell Storing Operation By First ATM Switch Circuit

When the control unit 7 receives a storage request sent from the write control unit 5, this control unit 7 executes a process operation defined in a flow chart of FIG. 5. In this first embodiment, it is assumed that an ATM cell outputted from the multiplexing unit 1 is transmitted to the output port $3_k$ (symbol "k"=1 to N). Upon receipt of the above-described storage request, the control unit 7 transmits to the pointer storage memory 6, both the port signal a1-1 indicative of the free chain FC, and the access instruction signal a2-1 indicative of the data read from the chain presence/absence storage unit 6A. Thereafter, when the presence/absence data "EF" is received from the pointer storage memory 6, the control unit 7 judges as to whether not the value of the presence/absence data "EF" is equal to "0" (step S1). When the value of the presence/absence data "EF" is equal to "1", the control unit 7 judges that the free chain FC is present, so that this control unit 7 permits the write control unit 4 to store the entered ATM cell (step S2).

When the process operation defined at the above step S2 is accomplished, the control unit 7 judges as to whether or not the value of the presence/absence data "$E_k$" of the address chain $C_k$ corresponding to the output port $3_k$ is equal to "0" (step S3). To execute the process operation defined at the step S3, the control unit 7 transmits both the port signal a1-2 and the access instruction signal a2-1 to the pointer storage memory 6. This port signal a1-2 indicates the output port $3_k$, and the access instruction signal a2-1 represents the data read out from the chain presence/absence storage unit 6A. Thereafter, when the presence/absence data "$E_k$" is received from the pointer storage memory 6, the control unit 7 executes the above-explained judgement.

In such a case that the value of the presence/absence data "$E_k$" is equal to "1" and also there is an address chain $AC_k$ corresponding-to the output port $3_k$, the control unit 7 executes:

a process operation of NP($WP_k$) RPF (step S4). The content of the above-described process operation defined at the above step S4 is given as shown in FIG. 6. That is, an unused area pointed out by the read pointer "RPF" of the free chain FC is pointed out by a next pointer "$NP_{kr}$" of the address chain $AC_k$. This next pointer "$NP_{kr}$" may be paired with a buffer address "$BA_{kr}$" pointed by the write pointer "$WP_k$".

To execute a process operation defined at a step S4, the control unit 7 transmits both the port signal a1-1 and an access instruction signal a2-2 to the pointer storage memory 6. This port signal a1-1 indicates the free chain FC, and the access instruction signal a2-2 indicates the read pointer read out from the read pointer storage unit 6C. As a result, upon receipt of the read pointer "RPF" from the pointer storage memory 6, the control unit 7 sends both a port signal a1-3 and an access instruction signal a2-3 to the pointer storage memory 6. This port signal a1-3 denotes the address chain $AC_k$, and the access instruction signal a2-3 represents the write pointer read out from the write pointer storage unit 6B. As a consequence, when the write pointer "$WP_k$" is received from the pointer storage memory 6, the control unit 7 sets this write pointer "$WP_k$" as a pointer signal a3. The write pointer "$WP_k$" points out a buffer address "$BA_k$". Thereafter, the control unit 7 transmits to the address storage memory 8, both this pointer signal a3 and an access instruction signal a2-4 indicative of a writing operation with respect to the next pointer storage unit 8A. Also, the control unit 7 supplies a read pointer "RPF" as write data to the address storage memory 8. As a consequence, this read pointer. "RPF" is stored as a next pointer "$NP_k$" of the buffer address "$BA_k$" into the next pointer storage unit 8A of the address storage memory 8. As a result, the unused area pointed by the read pointer "RPF" of the free chain FC may be pointed out by the next pointer "$NP_{kr}$" of the address chain "$AC_k$".

When the process operation defined at the step S4 is ended, the control unit 7 executes:

a process operation of
$WP_k \leftarrow RPF$ (step S5).

A process operation defined at a step S5 is performed as shown in FIG. 7. That is, an unused area pointed by the read pointer "RPF" of the free chain FC may be pointed out by the write pointer "$WP_k$".

To execute a process operation defined at step S5, the control unit 7 transmits both the port signal a1-1 and the access instruction signal a2-5 to the pointer storage memory 6. This port signal a1-1 indicates the free chain FC, and the access instruction signal a2-5 indicates the read pointer read out from the read pointer storage unit 6C. As a result, upon receipt of the read pointer "RPF" from the pointer storage memory 6, the control unit 7 sends both a port signal a1-3 and an access instruction signal a2-6 to the pointer storage memory 6. This port signal a1-3 denotes the address chain $AC_k$, and the access instruction signal a2-6 represents the write pointer read out from the write pointer storage unit 6B.

Also, the control unit 7 transmits the read pointer "RPF" as write data to the pointer storage memory 6. As a result, the read pointer "RPF" is stored as a write pointer "$WP_k$". Accordingly, the unused area pointed out by the read pointer RPF of the free chain FC may be pointed out by the next pointer "$NP_{kr}$" of the address chain $AC_k$.

Also, when the process operation defined at the previous step S3 is carried out, if there is no address chain $AC_k$, then the control unit 7 executes:

a process operation of;
$RP_k \leftarrow RPF$,
$WP_k \leftarrow RPF$, and
$E \leftarrow 1$ (step S6).

A process operation defined at a step S6 is performed as follows: That is, an unused area pointed by the read pointer "RPF" of the free chain FC may be pointed out by the write pointer "$WP_k$", and also the read pointer "$RP_k$" of the address chain $AC_k$. As a consequence, the control unit 7 newly produces an address chain $AC_k$ corresponding to the output port $3_k$. Then, the control unit 7 sets the presence/absence data "$E_k$" of the pointer storage memory 6 to "1".

To execute a process operation defined at the step S6, the control unit 7 transmits both the port signal a1-1 and an access instruction signal a2-7 to the pointer storage memory 6. This port signal a1-1 indicates the free chain FC, and the access instruction signal a2-7 indicates the read pointer read out from the read pointer storage unit 6C. As a result, upon receipt of the read pointer "RPF" from the pointer storage memory 6, the control unit 7 sends both the port signal a1-3 and an access instruction signal a2-8 to the pointer storage memory 6. This port signal a1-3 denotes the address chain $AC_k$, and the access instruction signal a2-8 represents the write pointers read out from the write pointer storage unit 6B, and the read pointer storage unit 6C. Also, the control unit 7 supplies a read pointer "RPF" as write data to the pointer storage memory 6. As a consequence, this read pointer "RPF" is stored as a read pointer "$RP_k$" and a write pointer "$WP_k$". As a result, the unused area pointed by the read pointer "RPF" of the free chain FC may be pointed out by the read pointer "$RP_k$" of the address chain "$AC_k$", and also the write pointer "$WP_k$".

Thereafter, the control unit 7 sends both the port signal a1-3 indicative of the address chain $AC_k$, and an access instruction signal a2-9 representative of the writing operation with respect to the chain presence/absence storage unit 6A. Also, the control unit 7 sends a value of "1" as the write data to the pointer storage memory 6. As a consequence, the value of "1" is stored as presence/absence data "$E_k$" into this pointer storage memory 6.

When the process operation defined at either the step S5 or the step S6 is accomplished, the control unit 7 judges as to whether or not the write pointer WPF of the free chain FC is identical to the read pointer RPF (step S7). A process operation defined at this step S7 corresponds to such a process operation that the control unit 7 checks as to whether or not the free chain FC is not present after the process operation defined at the step S6 has been accomplished. To execute the process operation of this step S7, the control unit 7 sends both the port signal a1-1 indicative of the free chain FC, and the access instruction signal a2-10 to the pointer storage memory 6. This access instruction signal a2-10 represents the pointers from the write pointer storage unit 6B and also from the read pointer storage unit 6C. As a consequence, the control unit 7 receives both the write pointer WPF of the free chain FC and the read pointer RPF from the pointer storage memory 6 so as to execute the above-described judging operation.

In the case that the write pointer "WPF" of the free chain FC is different from the read pointer "RPF", the control unit 7 executes:

a process operation of RPF←NP (RPF) (step S8)

A process operation defined at the step S8 is carried out in such a manner that, as shown in FIG. 8, an unused area pointed by such a next pointer $NP_1$ of the free chain FC may be pointed out by the read point RPF of the free chain FC. As a consequence, the control unit 7 move the read pointer "RPF" to a new head of the free chain FC.

To execute a process operation defined at this step S8, the control unit 7 transmits both the port signal a1-1 and the access instruction signal a2-5 to the pointer storage memory 6. This port signal a1-1 indicates the free chain FC, and the access instruction signal a2-5 indicates the read pointer readout from the read pointer storage unit 6C. As a result, upon receipt of the read pointer "RPF" from the pointer storage memory 6, the control unit 7 sets the read pointer "RPF" as a pointer signal a3. Thereafter, the control unit 7 transmits to the next pointer storage unit 8A of the address storage memory 8, both this pointer signal a3 and an access instruction signal a4 indicative of a reading operation with respect to the next pointer storage unit 8A. As a consequence, when the control unit 7 receives the next pointer "$NP_k$" from the address storage memory 8, this control unit 7 transmits both the port signal a1-1 indicative of the free chain FC, and also the access instruction signal a2-11 indicative of the writing operation with respect to the read pointer storage unit 6C.

Also, the control unit 7 sends the next pointer "$NP_k$" as write data to the pointer storage memory 6. Accordingly, in this pointer storage memory 6, the next pointer "$NP_k$" is stored as the read pointer "RPF". As a result, an unused area pointed out by the next pointer $NP_1$ of the free chain FC may be pointed out by the read pointer "RPF" of the free chain FC.

Also, when the write pointer WPF of the free chain FC is identical to the read pointer RPF at the previous step S7, the control unit 7 sets the value of the presence/absence data "EF" of the free chain FC to "0" (step S9). The execution of this process operation indicates that the free chain FC is not present.

To execute a process operation defined at the step S9, the control unit 7 transmits both the port signal a1-1 and the access instruction signal a2-9 to the pointer storage memory 6. This port signal a1-1 indicates the free chain FC, and the access instruction signal a2-9 indicates the writing operation with respect of the chain presence/absence storage unit 6A. Also, the control unit 7 sends the value of "0" as the write data to the pointer storage memory 6. As a consequence, the value of "0" is stored as the presence/absence data "EF" into the pointer storage memory 6.

When the process operation defined at either the step S8 or the step S9 is accomplished, the control unit 7 executes:

a process operation of BA (WP)←empty buffer address (step S10).

This process operation defined at the step S10 is carried out as follows: That is, as indicated in FIG. 9, when the address storage memory 8 receives an empty buffer address from the empty address management memory 9, the control unit 7 controls the above-described empty buffer address to be stored as a buffer address "$BA_{k(r+1)}$" into a storage area of the buffer address storage unit 8B, which is pointed by the write pointer "$WP_k$". The control unit 7 accomplishes the overall process operation of FIG. 5 after this step S10.

If there is no free chain FC at the previous step S1, then the control unit 7 supplies to the write control unit 4, no permission of storing the entered cell (step S11), and thereafter, accomplishes the overall process operation of FIG. 5.

As previously explained, when the control unit 7 receives a storage request from the write control unit 4, this control unit 7 executes such a process operation that a new buffer address is stored into the last portion of the relevant address chain $AC_k$.

Buffer Address Control in First ATM Switch Circuit

On the other hand, when the output port $3_k$ and an output instruction of a buffer address are received by a buffer address are received by the control unit 7, this control unit 7 commences a process operation defined by a flow chart shown in FIG. 10. In other words, upon receipt of both the output port $3_k$ and the output instruction, the control unit 7 controls to output a buffer address (step S21). The process operation defined at this step S21 is carried out in such a manner that such a buffer address pointed by the read pointer "$RP_k$" of the address chain "$AC_k$" is derived from the buffer address storage unit 8B.

To execute a process operation defined at a step S21, the control unit 7 transmits both the port signal a1-3 and the access instruction signal a2-5 to the pointer storage memory 6. This port signal a1-3 indicates the address chain $AC_k$, and the access instruction signal a2-5 indicates the read pointer read out from the read pointer storage unit 6C. As a result, upon receipt of the read pointer "$RP_k$" from the pointer storage memory 6, the control unit 7 sets the read pointer "$RP_k$" as a pointer signal a3. Thereafter, the control unit 7 transmits both this pointer signal a3 and also an access instruction signal a4 indicative of a buffer address read out from the buffer address storage unit 8B to the address storage memory 8. As a consequence, a buffer address "$BA_{k1}$" is transmitted to both the cell buffer memory 2 and the empty address management memory 9.from the address storage memory 8.

When the process operation defined at the step S21 is accomplished, the control unit 7 checks as to whether or not the presence/absence data "EF" of the free chain FC is equal to the value of "0" (step S22). When the free chain FC is present, the control unit 7 executes:

a process operation of NP(WPF) $RP_k$ (step S23). The content of the above-described process operation defined at the above step S23 is given as shown in FIG. 12. That is, an unused area pointed out by the read pointer "$RP_k$" of the address chain $AC_k$ is pointed out by a next pointer "$NP_{q+1}$" of the free chain FC. In other words, a storage area from which the buffer address "$BA_{k1}$" has already been outputted may be pointed out by the next pointer "$NP_{q+1}$" of the free chain FC.

As a consequence, the control unit 7 connects the head of the address chain $AC_k$ to the last portion of the free chain FC.

To execute a process operation defined at a step S23, the control unit 7 transmits both the port signal a1-3 and the access instruction signal a2-5 to the pointer storage memory 6. This port signal a1-3 indicates the address chain $AC_k$, and the access instruction signal a2-5 indicates the read pointer read out from the read pointer storage unit 6C. As a result, upon receipt of the read pointer "$RP_k$" from the pointer storage memory 6, the control unit 7 sends both a port signal a1-1 and an access instruction signal a2 to the pointer storage memory 6. This port signal a1-1 denotes the free chain FC, and the access instruction signal a2-12 represents the write pointer read out from the write pointer storage unit 6B. As a consequence, when the write pointer "WPF" is received from the pointer storage memory 6, the control unit 7 sets this write pointer "WPF" as a pointer signal a3. Thereafter, the control unit 7 transmits to the address storage memory 8, both this pointer signal a3 and an access instruction signal a4 indicative of a writing operation with respect to the next pointer storage unit 8A. Also, the control unit 7 supplies a read pointer "$RP_k$" as write data to the address storage memory 8. As a consequence, this read pointer "$RP_k$" is stored as a next pointer "$NP_{q+1}$" of the free chain FC into the next pointer storage unit 8A of the address storage memory 8. As a result, the unused area pointed by the read pointer "$RP_k$" of the address chain $AC_k$ may be pointed out by the next pointer "$NP_{q+1}$" of the free chain "FC".

When the process operation defined at the step S23 is ended, the control unit 7 executes:

a process operation of
WPF←$RP_k$ (step S24)

A process operation defined at a step S24 is performed as shown in FIG. 13. That is, an unused area pointed by the read pointer "$RP_k$" of the address chain $AC_k$ may be pointed out by the write pointer "WPF" of the free chain FC. As a result, the control unit 7 moves the write pointer WPF to the last portion of the free chain FC.

To execute a process operation defined at a step S24, the control unit 7 transmits both the port signal a1-1 and the access instruction signal a2-5 to the pointer storage memory 6. This port signal a1-1 indicates the free chain FC, and the access instruction signal a2-5 indicates the read pointer read out from the read pointer storage unit 6C. As a result, upon receipt of the read pointer "$RP_k$" from the pointer storage memory 6, the control unit 7 sends both a port signal a1-1 and an access instruction signal a2-12 to the pointer storage memory 6. This port signal a1-1 denotes the free chain FC, and the access instruction signal a2-12 represents the write pointer read out from the write pointer storage unit 6B.

Also, the control unit 7 transmits the read pointer "$RP_k$" as write data to the pointer storage memory 6. As a result, the read pointer "$RP_k$" is stored as a write pointer "WPF". Accordingly, the unused area pointed out by the read pointer $RP_k$ of the address chain $AC_k$ may be pointed out by the write pointer "WPF" of the free chain FC.

Also, when the process operation defined at the previous step S22 is carried out, if there is no free chain FC, then the control unit 7 executes:

a process operation of;
RPF←$RP_k$,
WPF←$RP_k$, and
EF←1 (step S25)

A process operation defined at a step S25 is performed as follows: That is, an unused area pointed by the read pointer "$RP_k$" of the address chain $AC_k$ may be pointed out by the write pointer "WPF", and also the read pointer "RPF" of the free chain FC. As a consequence, the control unit 7 newly produces a free chain FC. Then, the control unit 7 sets the presence/absence data "EF" of the pointer storage memory 6 to "1".

To execute a process operation defined at the step S25, the control unit 7 transmits both the port signal a1-3 and the access instruction signal a2-5 to the pointer storage memory 6. This port signal a1-3 indicates the address chain $AC_k$, and the access instruction signal a2-5 indicates the read pointer read out from the read pointer storage unit 6C. As a result, upon receipt of the read pointer "$RP_k$" from the pointer storage memory 6, the control unit 7 sends both a port signal a1-1 and an access instruction signal a2-14 to the pointer storage memory 6. This port signal a1-1 denotes the free chain FC, and the access instruction signal a2-14 represents the writing operations with respect to the write pointer storage unit 6B, and the read pointer storage unit 6C. Also, the control unit 7 supplies a read pointer "$RP_k$" as write data to the pointer storage memory 6. As a consequence, this read pointer "$RP_k$" is stored as a read pointer "RPF" and a write pointer "WPF". As a result, the unused area pointed by the read pointer "RPF" of the free chain FC may be pointed out by the read pointer "RPF" of the free chain "FC", and also the write pointer "WPF".

Thereafter, the control unit 7 sends both the port signal a1-1 indicative of the free chain FC, and an access instruction signal a2-9 representative of the writing operation with respect to the chain presence/absence storage unit 6A. Also, the control unit 7 sends a value of "1" as the write data to the pointer storage memory 6. As a consequence, the value of "1" is stored as presence/absence data "EF" into this pointer storage memory 6.

When the process operation defined at either the step S24 or the step S25 is accomplished, the control unit 7 judges as to whether or not the write pointer $WP_k$ of the address chain $AC_k$ is identical to the read pointer $RP_k$ (step S26). To execute the process operation of this step S26, the control unit 7 sends both the port signal a1 indicative of the address chain $AC_k$, and the access instruction signal a2 to the pointer storage memory 6. This access instruction signal a2 represents the reading operations from the write pointer storage unit 6B and also from the read pointer storage unit 6C. As a consequence, the control unit 7 receives both the write pointer $WP_k$ of the address chain $AC_k$ and the read pointer $RP_k$ from the pointer storage memory 6 so as to execute the above-described judging operation.

In the case that the write pointer "$WP_k$" of the address chain $AC_k$ is different from the read pointer "$RP_k$", the control unit 7 executes:

a process operation of $RP_k$←NP ($RP_k$) (step S27)

A process operation defined at the step S27 is carried out in such a manner that, as shown in FIG. 14, a buffer address "$BA_{k2}$" pointed by such a next pointer $NP_{k1}$ may be pointed out by the read point $RP_k$ of the address chain $AC_k$. As a consequence, the control unit 7 moves the read pointer "$RP_k$" to a head of the address chain $AC_k$.

To execute a process operation defined at this step S27, the control unit 7 transmits both the port signal a1-3 and the access instruction signal a2-5 to the pointer storage memory 6. This port signal a1-3 indicates the address chain $AC_k$, and the access instruction sinal a2-5 indicates the read pointer read out from the read pointer storage unit 6C. As a result, upon receipt of the read pointer "$RP_k$" from the pointer storage memory 6, the control unit 7 sets the read pointer "$RP_k$" as a pointer signal a3. Thereafter, the control unit 7 transmits to the address storage memory 8, both this pointer signal a3 and an access instruction signal a4 indicative of a reading operation with respect to the next pointer storage unit 8A. As a consequence, when the control unit 7 receives the next pointer "$NP_k$" from the address storage memory 8, this control unit 7 transmits both the port signal a1-3 indicative of the address chain $AC_k$, and also the access instruction signal a2-11 indicative of the writing operation with respect to the read pointer storage unit 6C. Also, the control unit 7 sends the next pointer "$NP_k$" as write data to the pointer storage memory 6. Accordingly, in this pointer storage memory 6, the next pointer "$NP_k$" is stored as the read pointer "$RP_k$". As a result, the buffer address $BA_{k2}$ pointed out by the next pointer $NP_{k1}$ may be pointed out by the read pointer "$RP_k$" of the address chain $AC_k$.

Also, when the write pointer $WP_k$ of the address chain $AC_k$ is identical to the read pointer RPF at the previous step S26, the control unit 7 sets the value of the presence/absence data "EF" of the address chain $AC_k$ to "0" (step S28). The execution of this process operation indicates that the address chain $AC_k$ is not present.

To execute a process operation defined at the step S27, the control unit 7 transmits both the port signal a1-3 and the access instruction signal a2-9 to the pointer storage memory 6. This port signal a1-3 indicates the address chain $AC_k$, and the access instruction signal a2-9 indicates the writing operation with respect of the chain presence/absence storage unit 6A. Also, the control unit 7 sends the value of "0" as the write data to the pointer storage memory 6. As a consequence, the presence/absence data "EF" becomes a value of 0 in the pointer storage memory 6.

When the process operation defined at the step S28 is ended, the control unit 7 accomplishes the process operations shown in FIG. 10.

Overall Operation in First ATM Switching Circuit

Now, a description is made of an overall operation executed in the first ATM switching circuit of FIG. 1.

ATM cells which are entered into the input ports $1_1$, $1_2$, - - -, $1_N$ are multiplexed by the multiplexing unit 1, and then the multiplexed ATM cell is supplied to the cell buffer memory 2. When this multiplexed cell is outputted, the write control unit 4 checks a destination of this multiplexed cell. When the destination of this multiplexed ATM cell is the output port $3_k$, the write control unit 4 both the port signal indicative of this output port $3_k$ and also the storage request of this multiplexed ATM cell to the control unit 7.

Upon receipt of the above-described storage request, the control unit 7 checks as to whether or not the free chain FC is present at the step S1. If the free chain FC is not present, then the control unit 7 gives no permission of storing the above-explained cell at the step S11. When the write control unit 4 receives the non-permission of storing the above-described cell, this write control unit 4 discards this multiplexed ATM cell.

Conversely, when the free chain FC is present at the step S1, the control unit 7 permits the write control unit 4 to store the entered cell at the step S2. Upon receipt of the above storage permission from the control unit 7, the write control unit 4 sends an address output request to the empty address management memory 9. In response to this address output request, the control unit 7 reads a buffer address corresponding to an address of an empty area from the empty address management memory 9, and then supplies this buffer address to the cell buffer memory 2 and the address storage memory 8. When the buffer address is received from the empty address management memory 9, the above-explained multiplexed ATM cell outputted from the multiplexing unit 1 is stored into a storage area designated by this buffer address.

Upon receipt of the above-described buffer address by the address storage memory 8, the control unit 7 checks at the step S3 as to whether or not the address chain $AC_k$ is present. When this address chain $AC_k$ is present, the control unit 7 connects the head portion of the free chain FC to the last portion of the address chain $AC_k$ at the steps S4 and S5, so that an unused area for storing thereinto the buffer address is secured in the address chain $AC_k$. Thereafter, the control unit 7 controls such an operation that the read pointer "$RP_k$" of the address chain $AC_k$ points out a newly-defined last portion. Conversely, when the address chain $AC_k$ is not present, the control unit 7 newly produces an address chain $AC_k$ so as to secure an unused area for storing thereinto the buffer address at the step S6. In the case that the write pointer WPF of the free chain FC is different from the read pointer RPF at the step S7, the control unit 7 judges that the free chain FC is still present. Thus, the control unit 7 moves the read pointer RPF to a new head portion of the free chain FC. Conversely, when the write pointer WPF is equal to the read pointer RPF, the control unit 7 judges that the free chain FC is not present, and thus sets the presence/absence data EF of the free chain FC to the value of "0" at the step S9.

When securing of the unused area is accomplished, the control unit 7 stores the above-explained buffer address as "$BA_{k(r+1)}$" into this unused area. The buffer address $BA_{k(r+1)}$ of the ATM cell entered in the above-described manner is connected to the last portion of the address chain $AC_k$.

On the other hand, when the cell is outputted to the output port $3_k$, the read control unit 3 sends both the output port $3_k$ and also the output instruction of the buffer address to the control unit 7. As a consequence, the control unit 7 controls the address storage memory 8 at the step S21. While the buffer address $BA_{k1}$ of the head portion of the address chain $AC_k$ is read from the address storage memory 8, the read control unit 5 sends the read buffer address $BA_{k1}$ to the cell buffer memory 2 and the empty address management memory 9.

In the cell buffer memory 2, the ATM cell is read from the storage area designated by the buffer address $BA_{k1}$ to be transmitted to the output port $3_k$ under control of a controller (not shown). Also, the empty address management memory 9 manages the buffer address $BA_{k1}$ as the empty buffer address.

When the buffer address $BA_{k1}$ is outputted from the address storage memory 8, the control unit 7 executes the following control operation. In other words, the control unit 7 checks as to whether or not the free chain FC is present at the step S22. If the free chain FC is present, then the control unit 7 cuts out the head portion of the address chain $AC_k$ and then connects the cut head portion to the last portion of the free chain FC at the step S23. As a result, such an unused area from which the buffer address $BA_{k1}$ has been outputted is connected to the last portion of the free chain FC. Subsequently, at the step S24, the control unit 7 causes the write pointer WPF of the free chain FC to point out a newly-defined final portion. Conversely, if the free chain FC is not present, then the control unit 7 produces a new free chain FC by using the unused area from which the buffer address $BA_{k1}$ has been outputted at the step S25.

Thereafter, the control unit 7 checks as to whether or not the address chain $AC_k$ is present at the step S26. When the address chain $Ac_k$ is present, the control unit 7 moves the read pointer $RP_k$ to a newly-defined head portion of the address chain $AC_k$ at the step S27. Then the overall process operation is accomplished.

Conversely, when the address chain $AC_k$ is not present, the control unit 7 sets the presence/absence data $E_k$ of the address chain $AC_k$ to the value of "0". Then, the overall process operation is accomplished.

As previously explained, the storage area which becomes the unused area when the buffer address is outputted is connected to the last portion of the free chain FC.

As previously described, in accordance with the ATM switching circuit of the first embodiment, the address storage memory 8 may be commonly used with respect to the output ports $3_1$ to $3_N$. As a result, since the length of the address chain corresponding to the output ports $3_1$ to $3_N$ may be adjusted in accordance with the use frequencies of the output ports, the address storage memory 8 can be effectively used, depending upon the output ports $3_1$ to $3_N$.

Overview of Second ATM Switching Circuit

Referring to drawings, an ATM switching circuit according to a second embodiment of the present invention will be described in detail.

Figure 15:
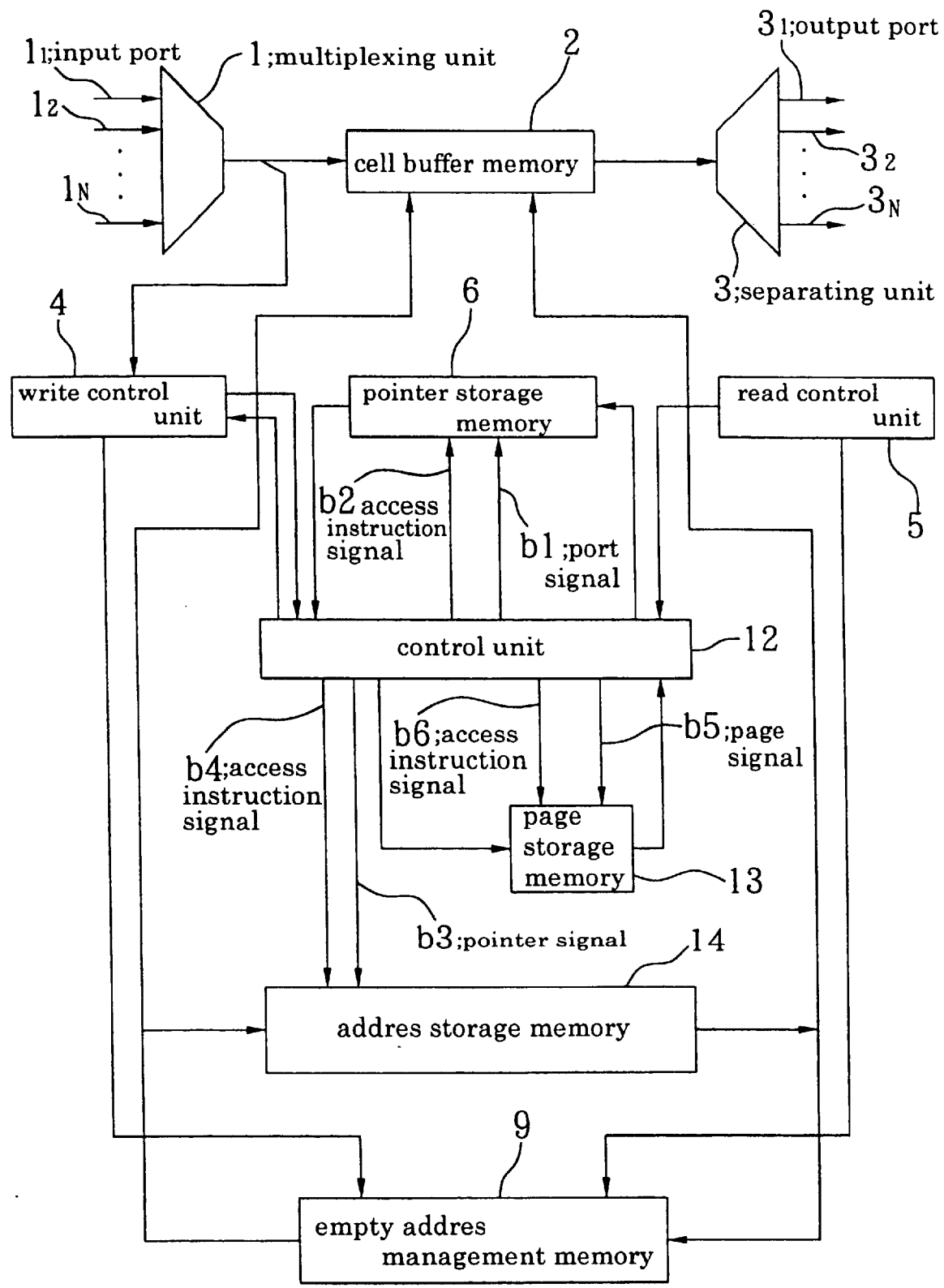
FIG. 15 is a schematic block diagram for showing an arrangement of an ATM switch circuit according to a second embodiment of the present invention.
Figure 16:
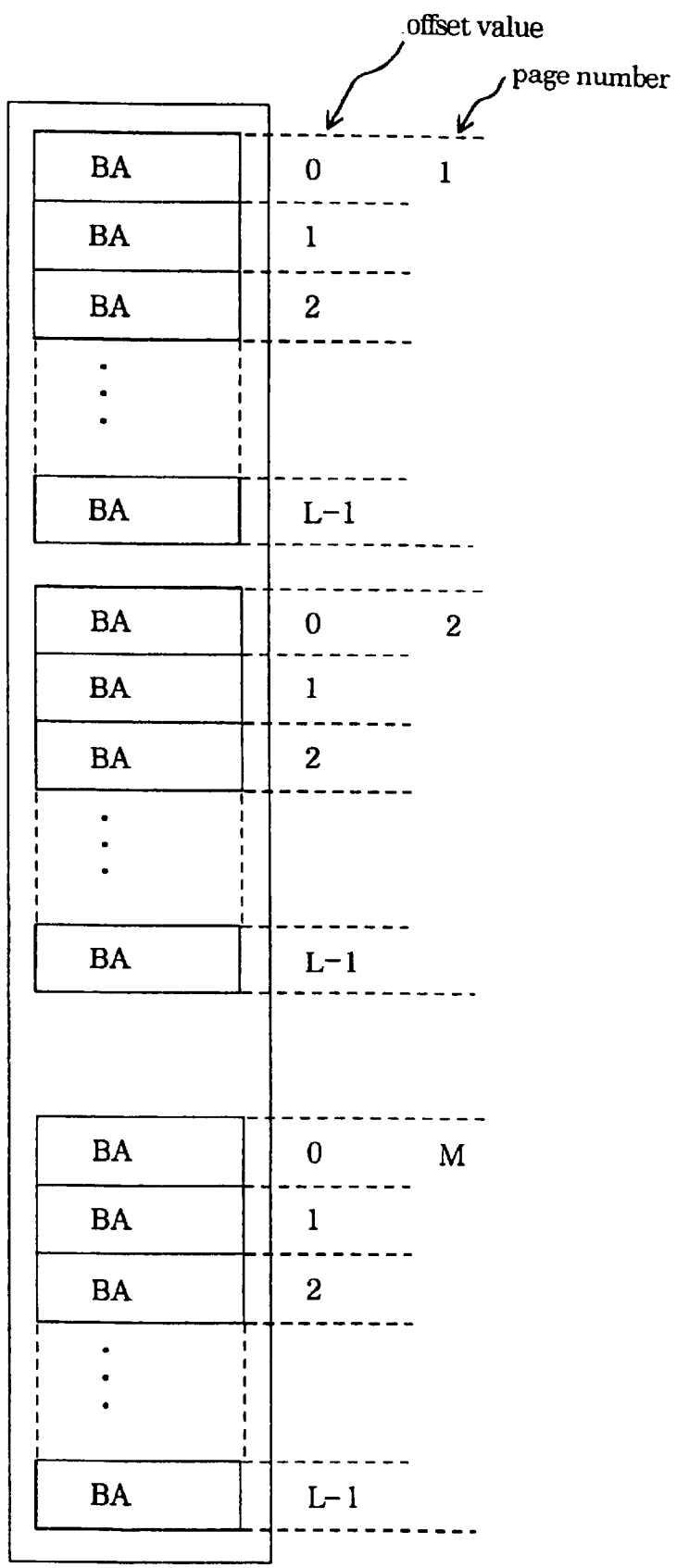
FIG. 16 is a structural diagram for indicating a structure of an address storage memory employed in the second ATM switch circuit of FIG. 15.
Figure 17:
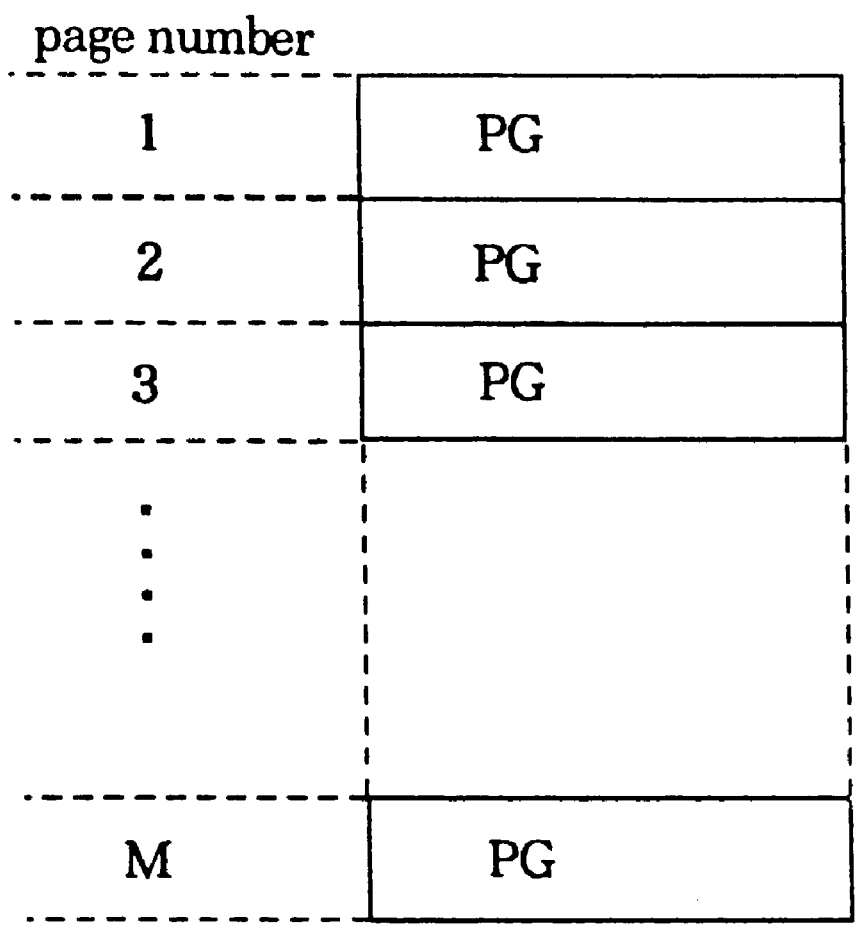
FIG. 17 is a structural diagram for representing a structure of a page storage memory employed in the second ATM switch circuit of FIG. 15.
Figure 18:
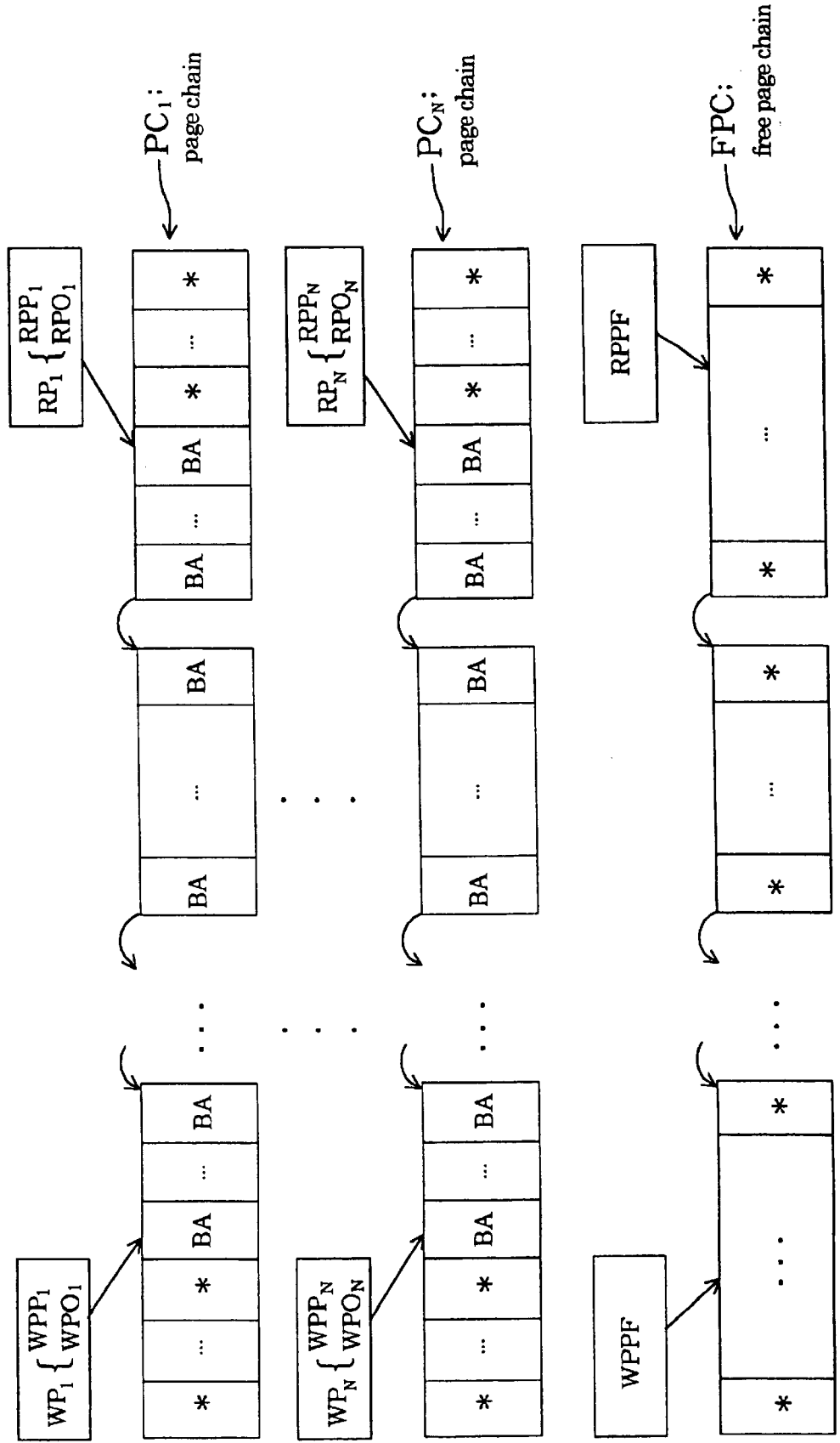
FIG. 18 is an explanatory diagram for explaining a chain structure of the second ATM switch circuit shown in FIG. 15.
Figure 19:
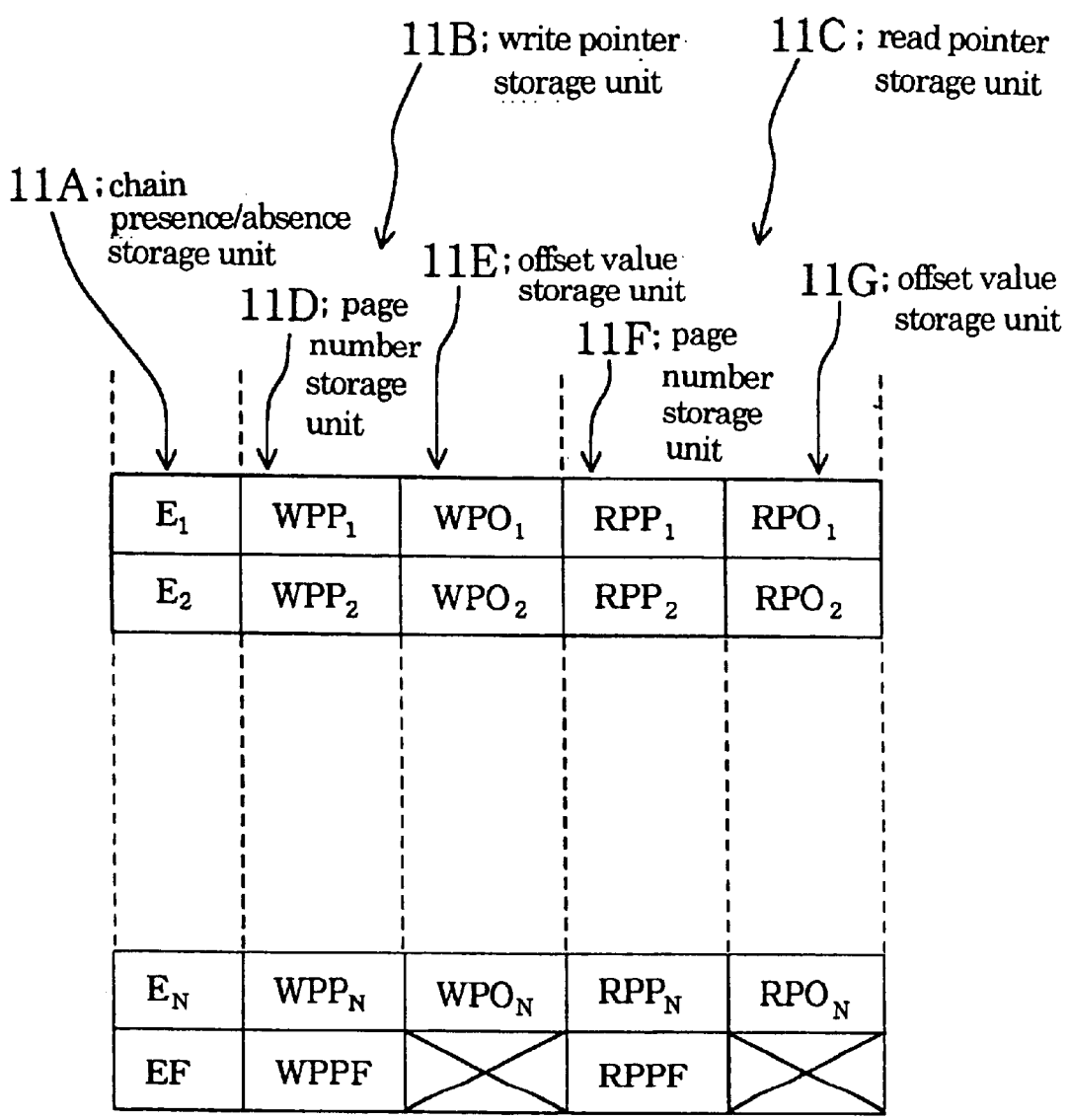
FIG. 19 is a structural diagram for representing a structure of a pointer storage memory employed in the second ATM switch circuit of FIG. 15.
Figure 20:
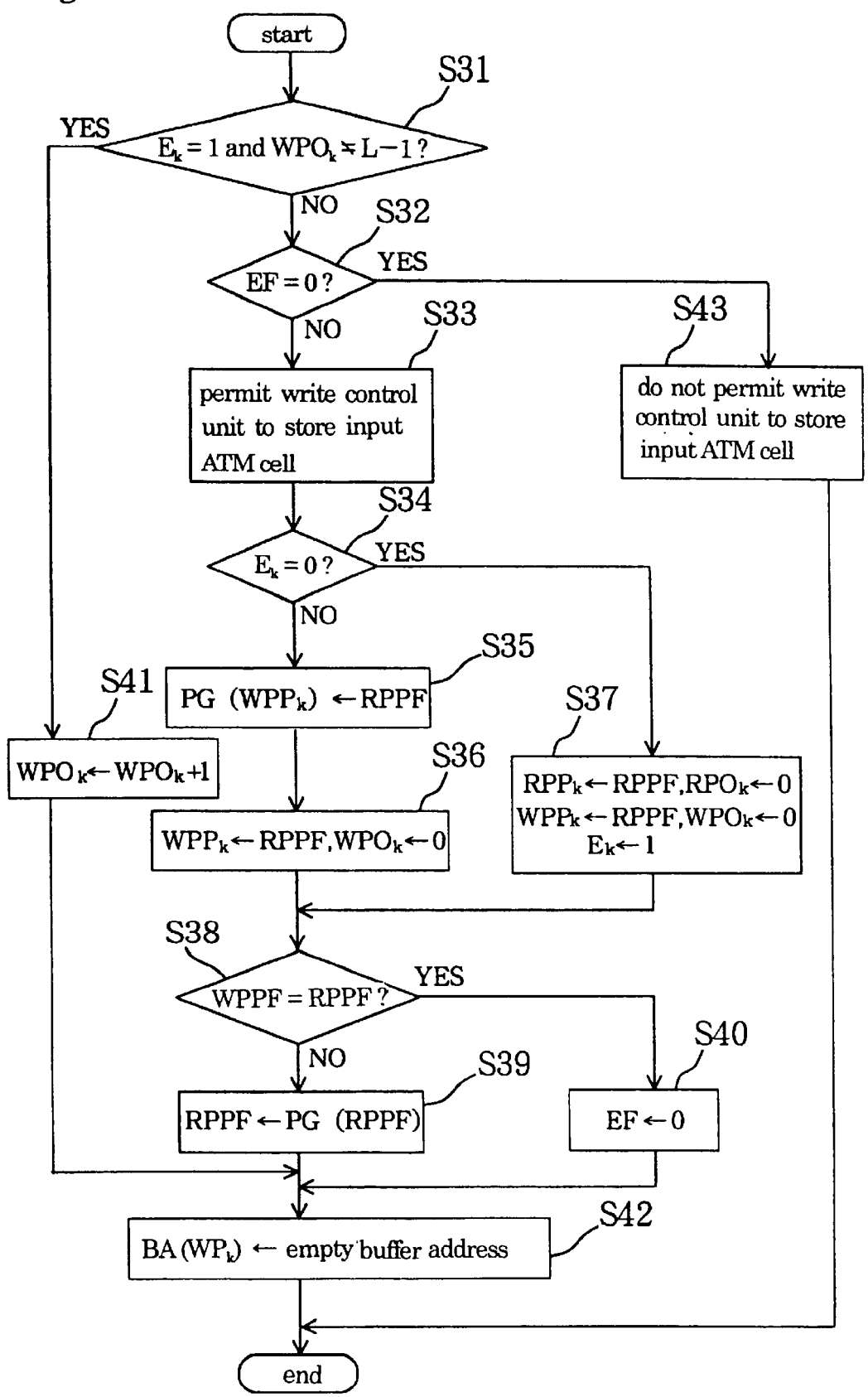
FIG. 20 is a flow chart for describing a process operation of an ATM cell storing operation by a control unit employed in the second ATM switch circuit of FIG. 15.
Figure 21:
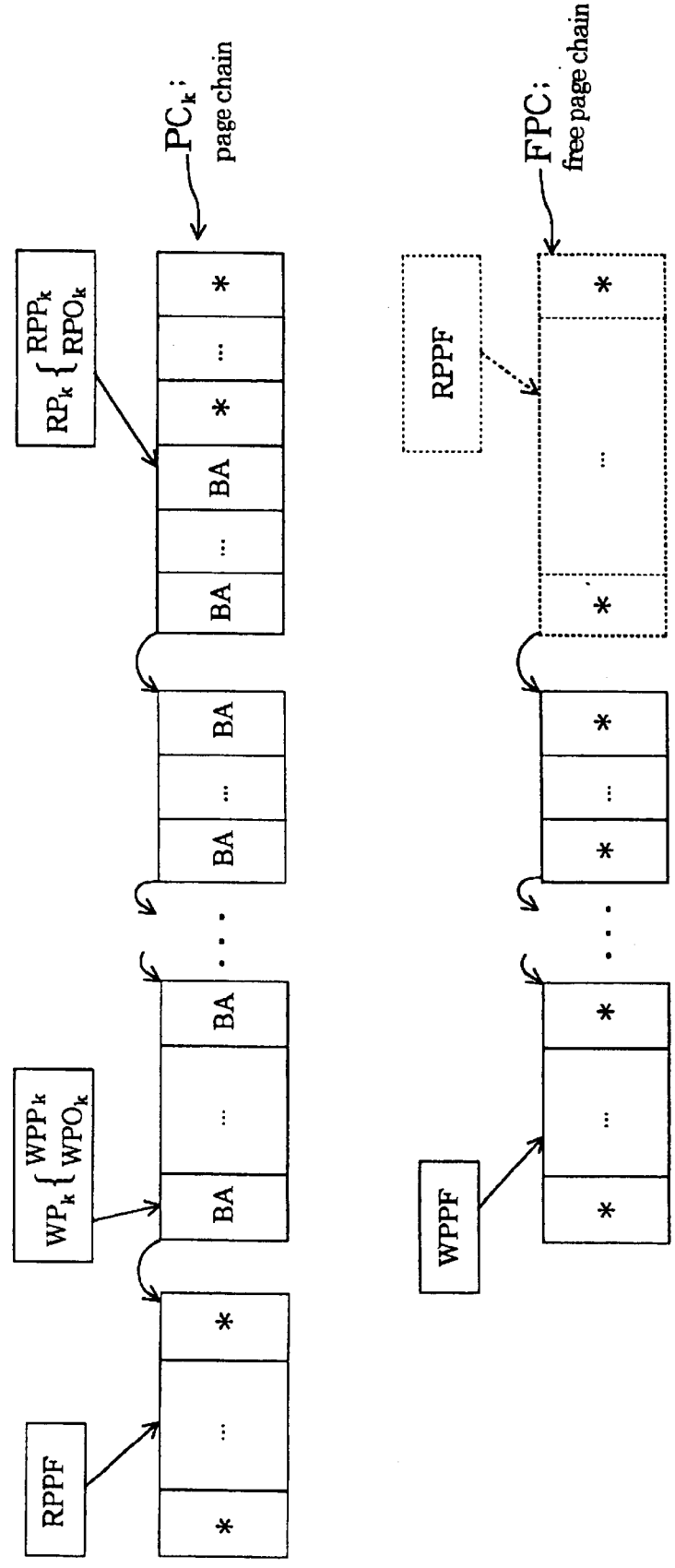
FIG. 21 is an explanatory diagram for explaining a move of a pointer by a processing operation of the control unit employed in the second ATM switch circuit of FIG. 15.
Figure 22:
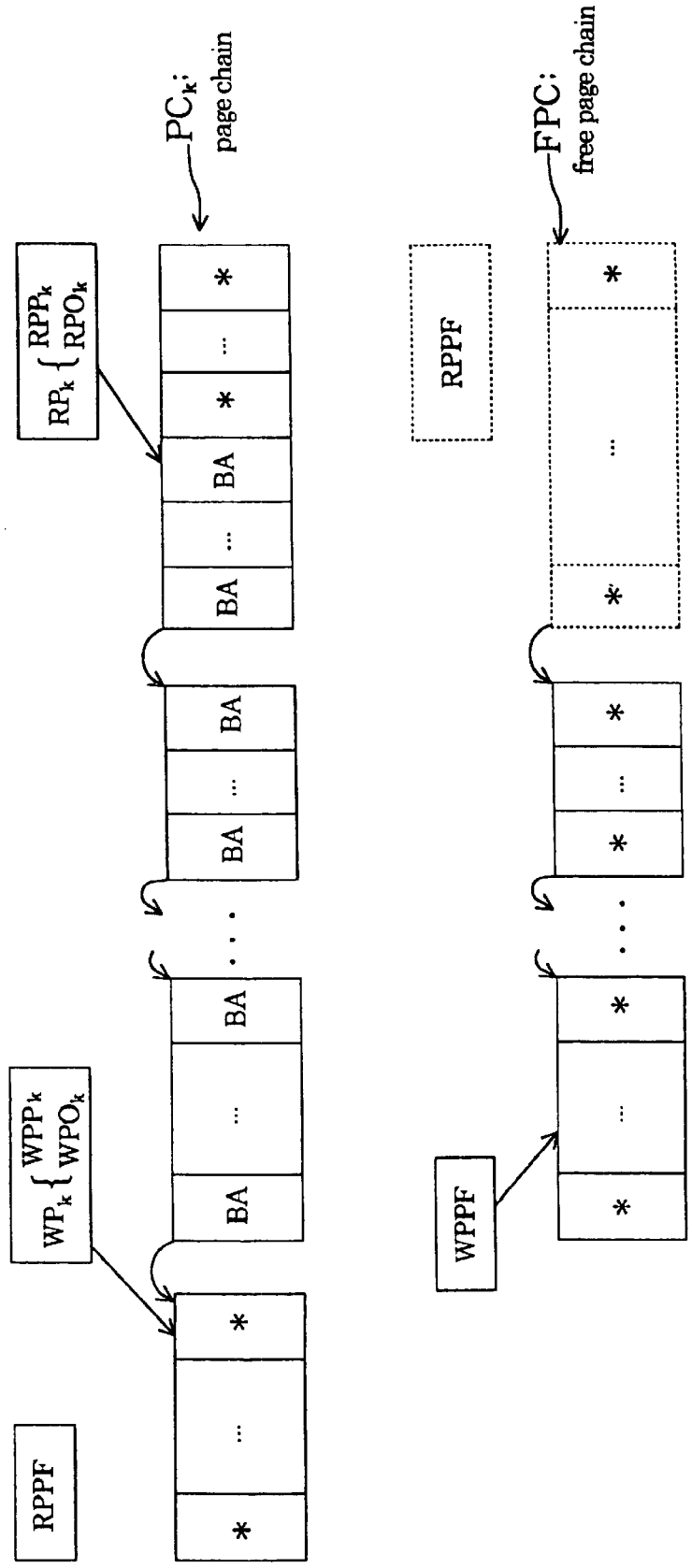
FIG. 22 is an explanatory diagram for explaining a move of a pointer by a processing operation of the control unit employed in the second ATM switch circuit of FIG. 15.
Figure 23:
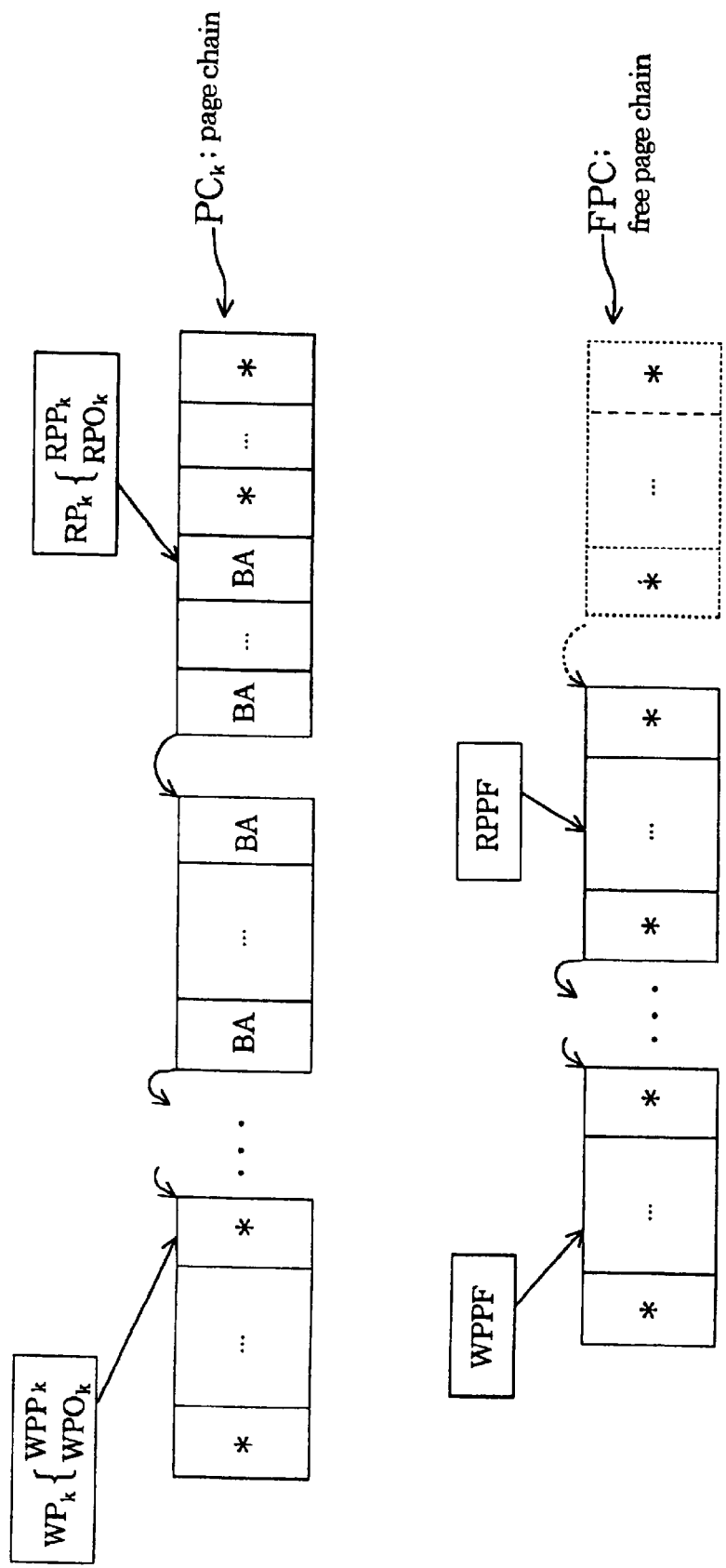
FIG. 23 is an explanatory diagram for explaining a move of a pointer by a processing operation of the control unit employed in the second ATM switch circuit of FIG. 15.
Figure 24:
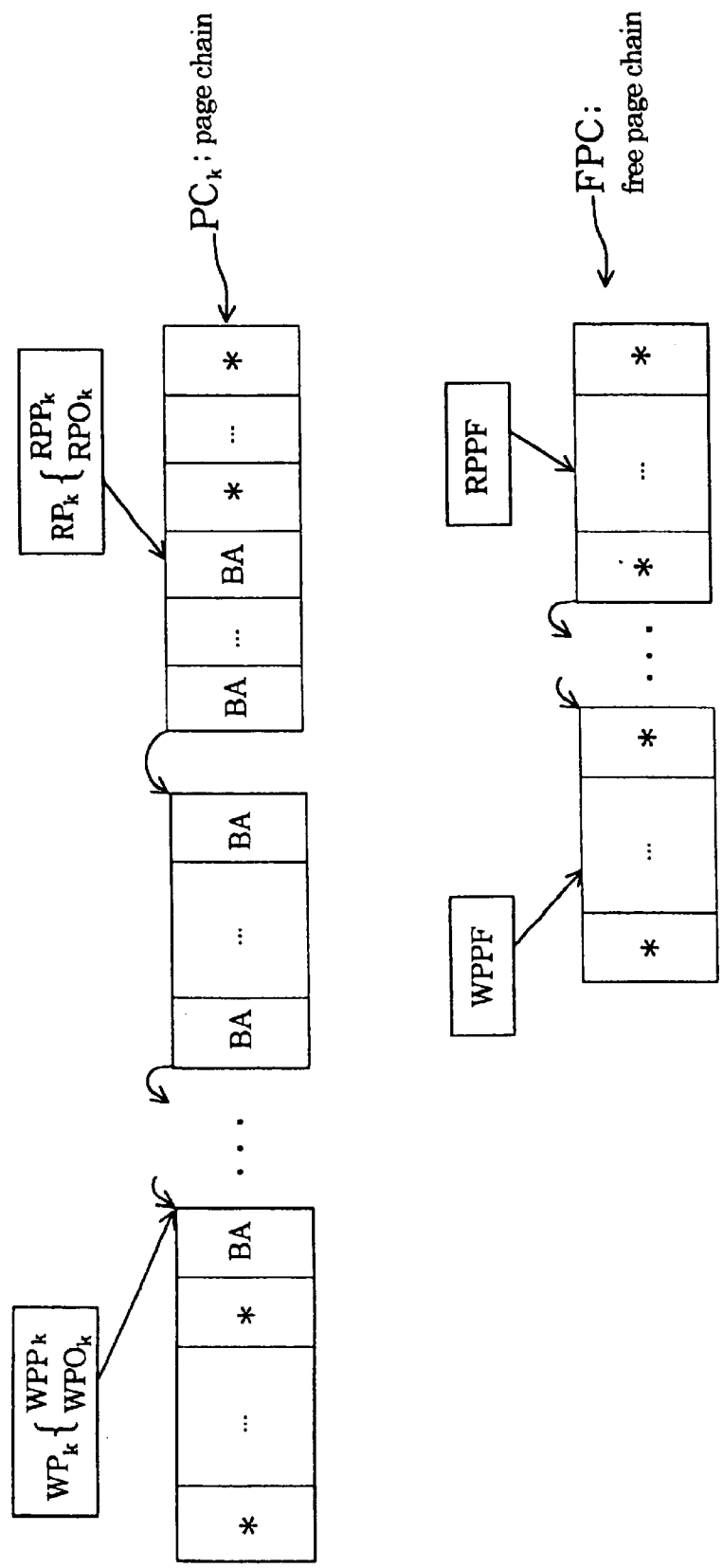
FIG. 24 is an explanatory diagram for explaining a move of a pointer by a processing operation of the control unit employed in the second ATM switch circuit of FIG. 15.
Figure 25:
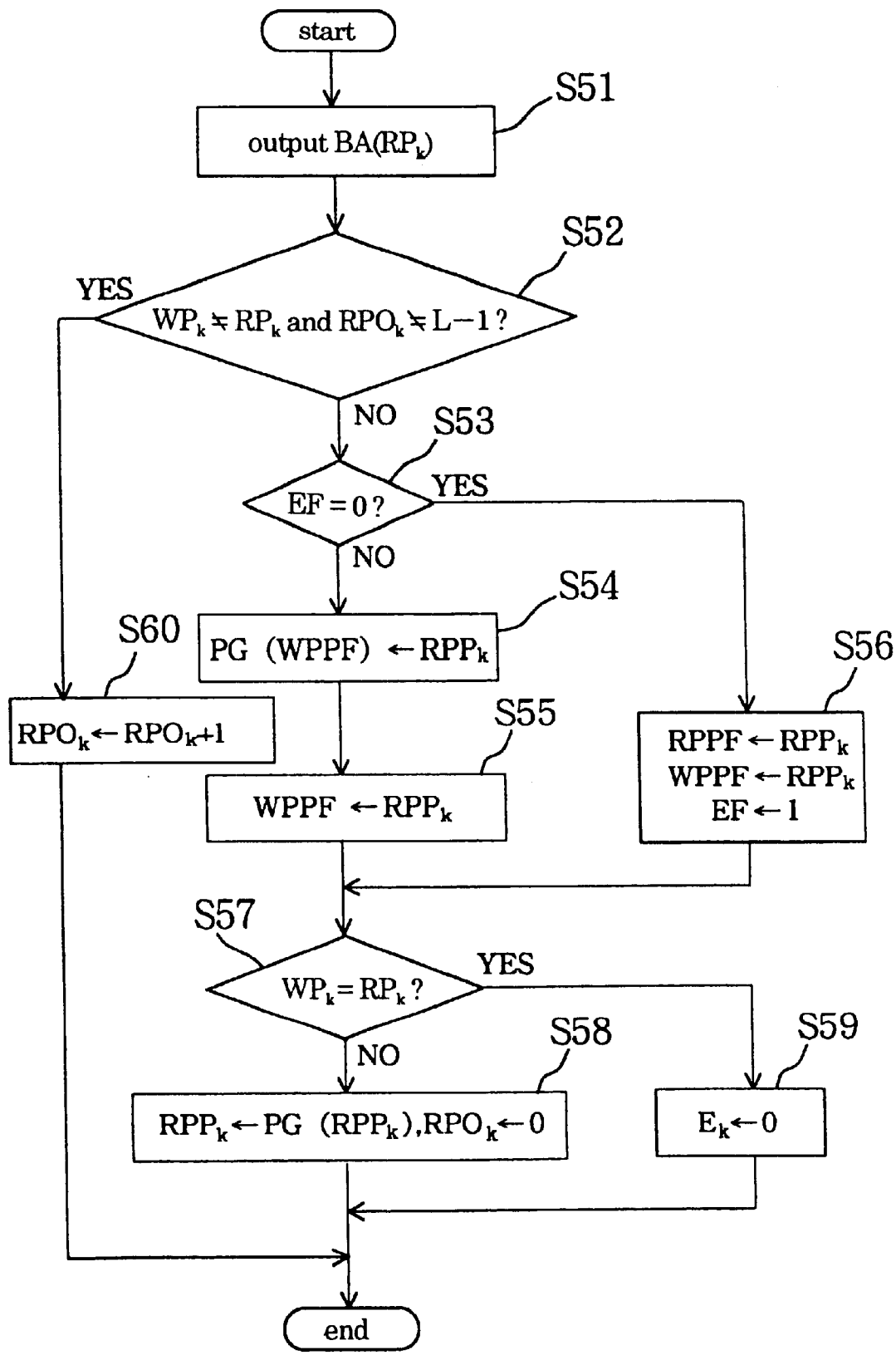
FIG. 25 is a flow chart for explaining a cell output processing operation by the control unit employed in the second ATM switch circuit of FIG. 15.
Figure 26:
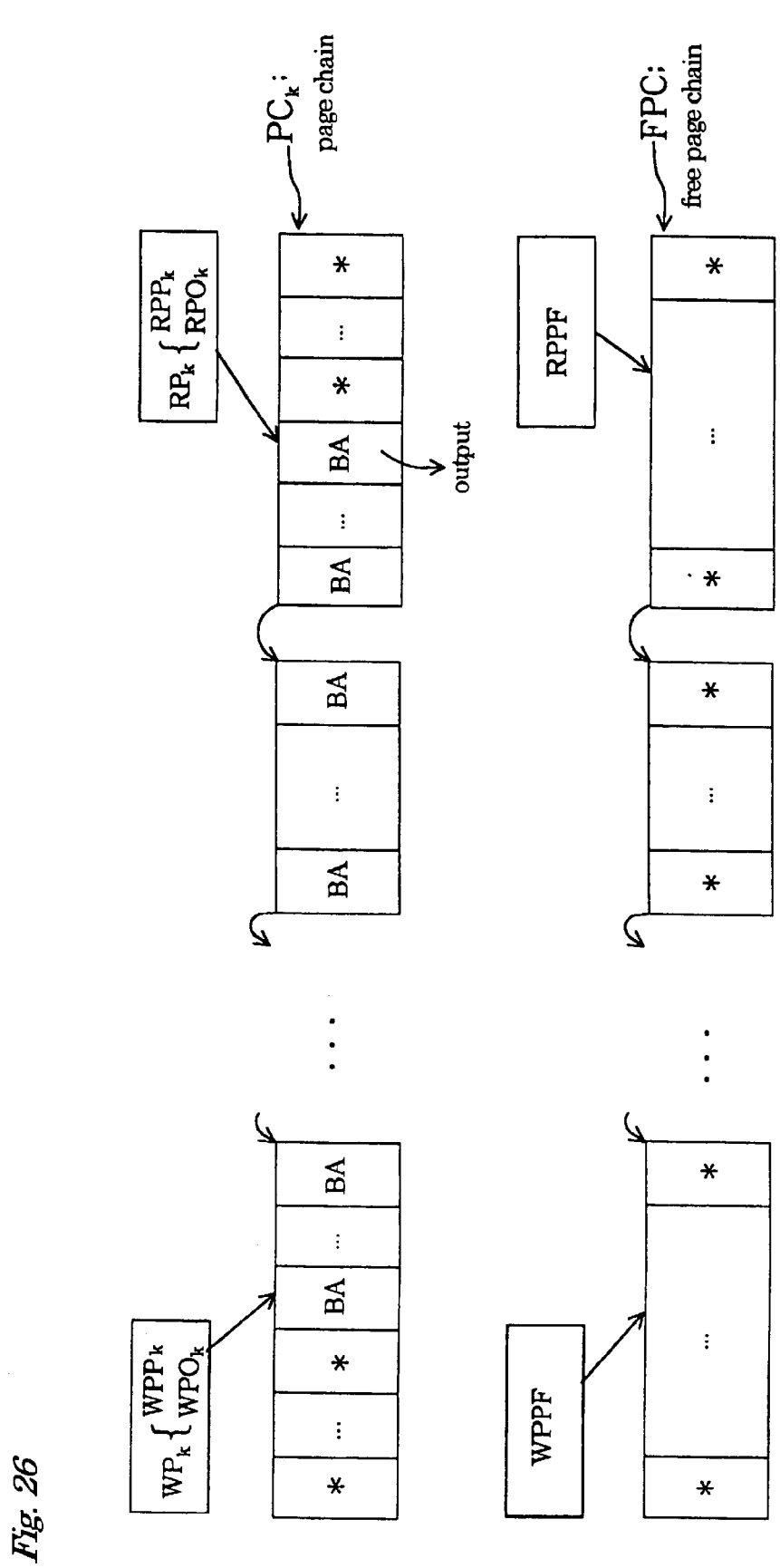
FIG. 26 is an explanatory diagram for describing a move of the pointer by a processing operation of the control unit employed in the second ATM switch circuit of FIG. 15.
Figure 27:
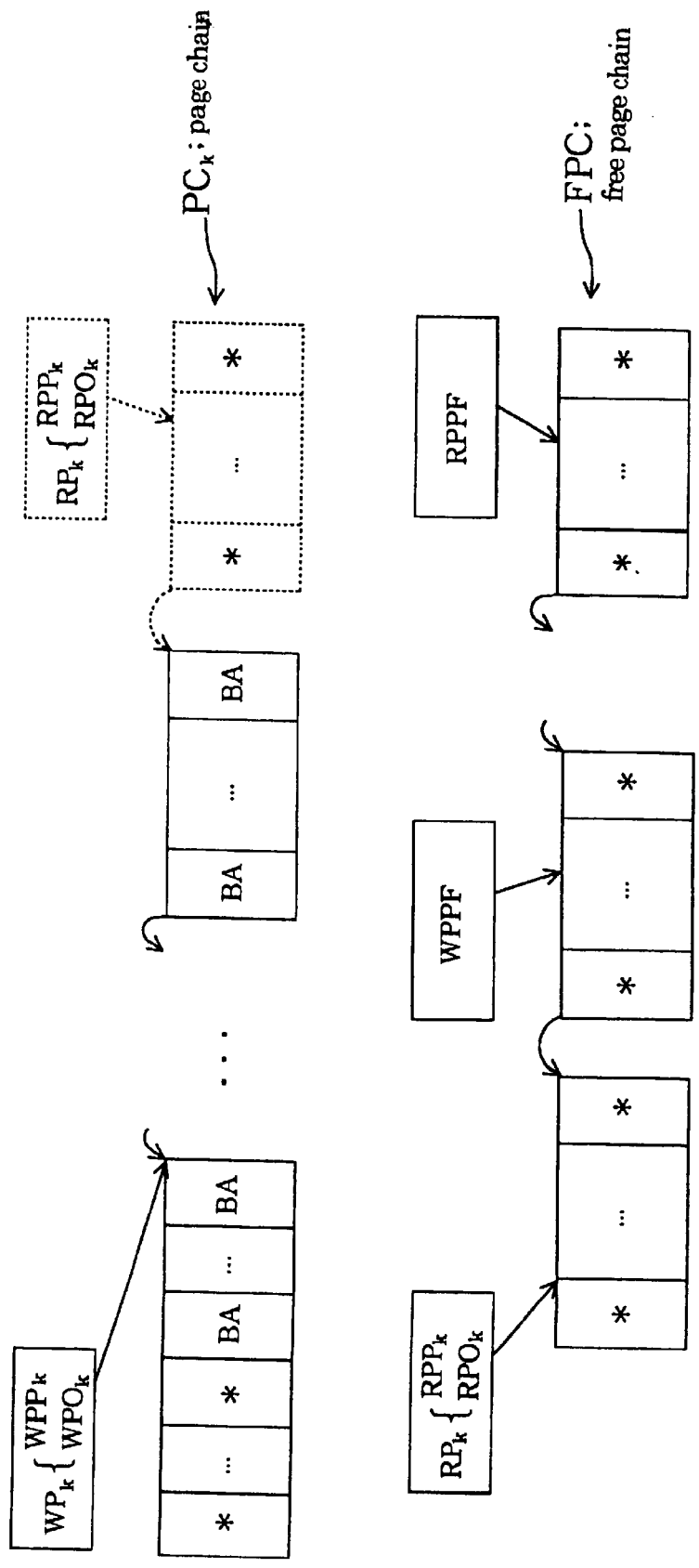
FIG. 27 is an explanatory diagram for describing a move of the pointer by a processing operation of the control unit employed in the second ATM switch circuit of FIG. 15.
Figure 28:
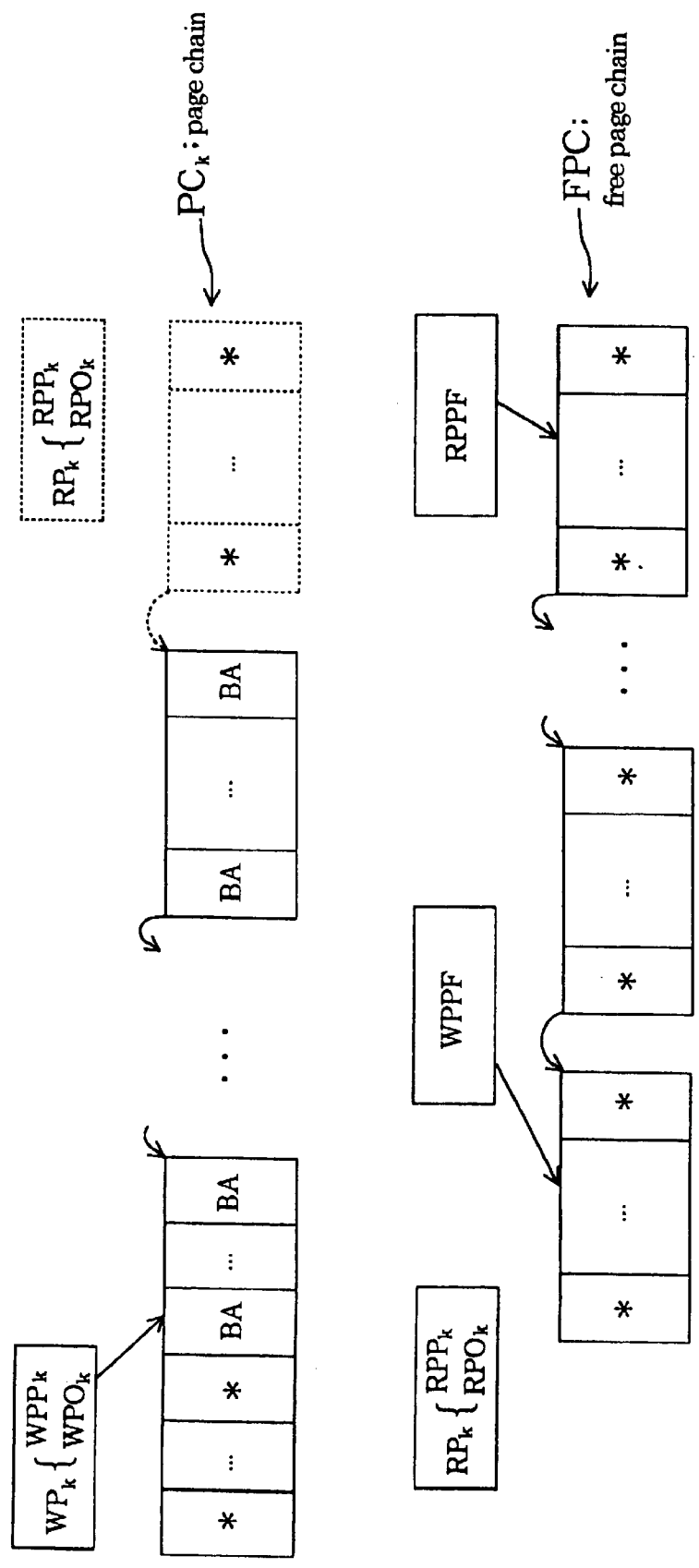
FIG. 28 is an explanatory diagram for describing a move of the pointer by a processing operation of the control unit employed in the second ATM switch circuit of FIG. 15.
Figure 29:
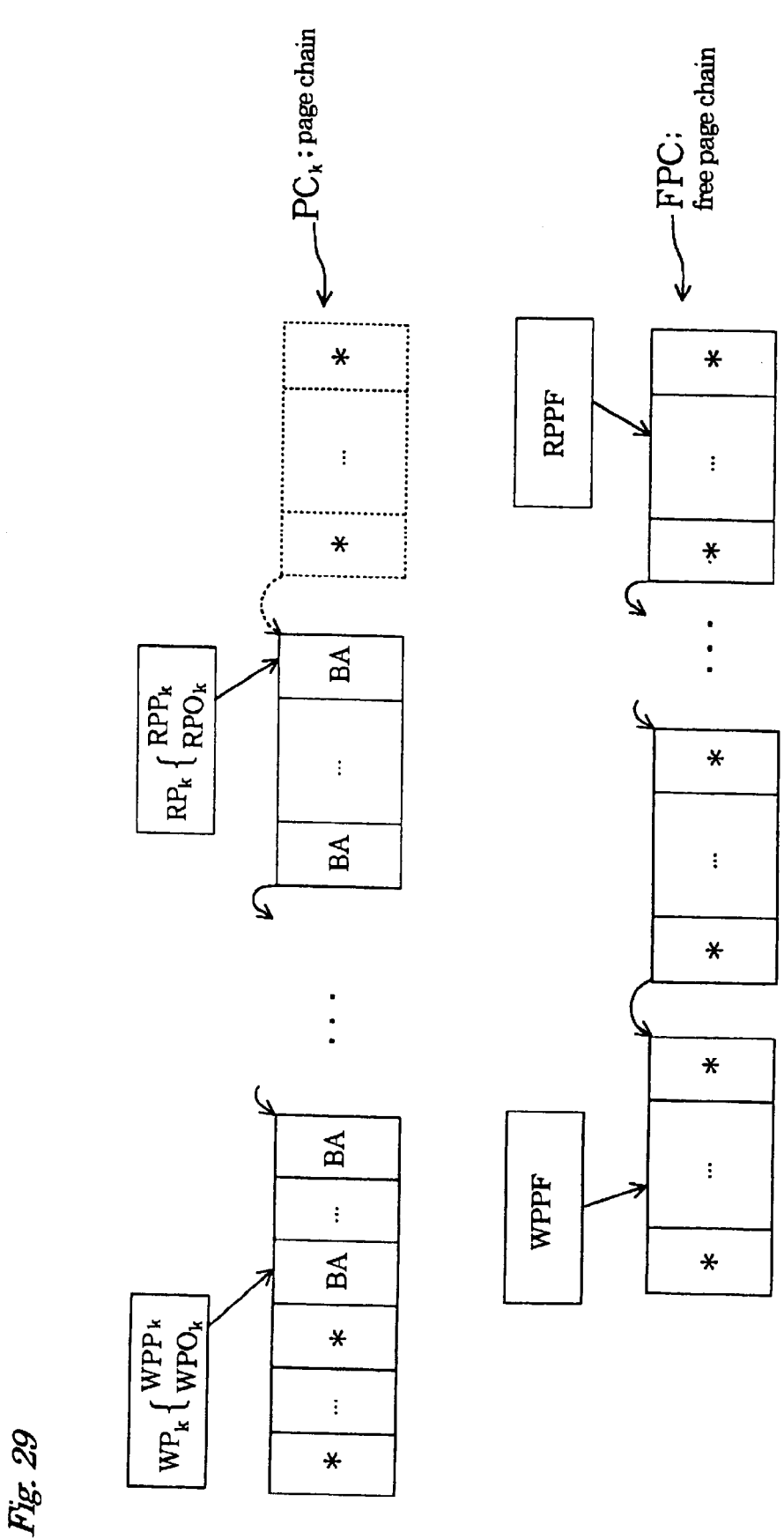
FIG. 29 is an explanatory diagram for describing a move of the pointer by a processing operation of the control unit employed in the second ATM switch circuit of FIG. 15.

FIG. 15 is a schematic block diagram for showing an arrangement of an ATM switch circuit according to a second embodiment of the present invention. FIG. 16 is a structural diagram for indicating a structure of an address storage memory employed in the second ATM switch circuit of FIG. 15. FIG. 17 is a structural diagram for representing a structure of a page storage memory employed in the second ATM switch circuit of FIG. 15. FIG. 18 is an explanatory diagram for explaining a chain structure of the second ATM switch circuit shown in FIG. 15. FIG. 19 is a structural diagram for representing a structure of a pointer storage memory employed in the second ATM switch circuit of FIG. 15. FIG. 20 is a flow chart for describing a process operation of an ATM cell storing operation by a control unit employed in the second ATM switch circuit of FIG. 15. FIG. 21 is an explanatory diagram for explaining a move of a pointer by a processing operation of the control unit employed in the second ATM switch circuit of FIG. 15. FIG. 22 is an explanatory diagram for explaining a move of a pointer by a processing operation of the control unit employed in the second ATM switch circuit of FIG. 15. FIG. 23 is an explanatory diagram for explaining a move of a pointer by a processing operation of the control unit employed in the second ATM switch circuit of FIG. 15. FIG. 24 is an explanatory diagram for explaining a move of a pointer by a processing operation of the control unit employed in the second ATM switch circuit of FIG. 15. FIG. 25 is a flowchart for explaining a cell output processing operation by the control unit employed in the second ATM switch circuit of FIG. 15. FIG. 26 is an explanatory diagram for describing a move of the pointer by a processing operation of the control unit employed in the second ATM switch circuit of FIG. 15. FIG. 27 is an explanatory diagram for describing a move of the pointer by a processing operation of the control unit employed in the second ATM switch circuit of FIG. 15. FIG. 28 is an explanatory diagram for describing a move of the pointer by a processing operation of the control unit employed in the second ATM switch circuit of FIG. 15. FIG. 29 is an explanatory diagram for describing a move of the pointer by a processing operation of the control unit employed in the second ATM switch circuit of FIG. 15.

Arrangement of Second ATM Switch Circuit

As indicated in FIG. 15, this second ATM (Asynchronous Transfer Mode) switch circuit is arranged by a multiplexing unit 1, a cell buffer memory 2, a separating unit 3, a write control unit 4, a read control unit 5, a pointer storage memory 11, a control unit 12, a page storage memory 13, an address storage memory 14, and an empty address management memory 9. It should be understood that the same reference numerals shown in FIG. 1 will be employed as those for indicating the same, or similar circuit elements of FIG. 15, and therefore, detailed descriptions thereof are omitted.

The address storage memory 14 stores thereinto a buffer address. The buffer address is employed when an ATM cell is stored into the cell buffer memory 2. As represented in FIG. 16, the address storage memory 14 is used to store a buffer address "BA" into a storage area, and "L" pieces of storage areas are grouped to be handled as a logic page. That is to say, in the address storage memory 14, a page number "1" owns storage areas indicated by offset values of "0" to "L−1". Similarly, page numbers "2", - - - , "M" each own storage areas indicated by offset values of "0" to "L−1". Then, each buffer address "BA" is specified based on both the above-described page number and the above-explained offset value.

The page storage memory 13 stores thereinto such information used to modify pages of the address storage memory 14 as a chain structure. For example, in order that buffer addresses are stored in all of storage regions and a page number into which a cell to be sent to the output port 3 has been stored, when the page number is advanced to the next page, the next page number is stored into the page storage memory 13. In other words, as shown in FIG. 17, the next page number "PG" is stored into the page storage memory 13 in correspondence with the page number. Similarly, the next page number "PG" corresponding to each of the page numbers "2", - - - , "M" is stored in the page storage memory 13, respectively.

As indicated in FIG. 18, page chains $PC_1$, $PC_2$, - - - , $PC_N$ are formed based on the page numbers and the next page numbers stored in the page storage memory 13 in correspondence with the output ports $3_1$, $3_2$, - - - , $3_N$.

Similarly, free pages made of unused areas into which no buffer address is stored within the address storage memory 14 are sequentially chained to each other by way of the next page number PG so as to be formed as a logical chain structure. As a consequence, a free page chain FPC is formed.

As indicated in FIG. 19, the pointer storage memory 11 is equipped with a chain presence/absence storage unit 11A, a write pointer storage unit 11B, and a read pointer storage unit 11C. Furthermore, this write pointer storage unit 11B is equipped with a page number storage unit 11D, and an offset value storage unit 11E. The read pointer storage unit 11C is equipped with a page number storage unit 11F and an offset value storage unit 11G.

Into the chain presence/absence storage unit 11A, presence/absence data of "$E_1$", "$E_2$", - - - , "$E_N$" and "EF" are stored. These presence/absence data of "$E_1$", "$E_2$", - - - , "$E_N$" show whether or not the page chains $PC_1$, $PC_2$, - - - , $PC_N$ are present, whereas the presence/absence data EF represents whether or not the free page chain FPC is present.

A page number "$WPP_1$" of "$WP_1$" equal to a write pointer of the page chain $PC_1$ is stored into the page number storage unit 11D. Also, as to the page number "$WPP_1$", an offset value "$WPO_1$" is stored into the offset value storage unit 11E. The offset value "$WPO_1$" designates a storage area within a page designated by the page number "$WPP_1$".

Similarly, page numbers "$WPP_2$", - - - , "$WPP_N$" of write pointers "$WP_2$", - - - , "$WP_N$" of the page chains $PC_2$, - - - , $PC_N$ are stored into the page number storage unit 11D, whereas offset values "WPO2", - - - , "$WPO_N$" of page numbers "$WPP_2$", - - - , "$WPP_N$" are stored into the offset value storage unit 11E. Also, a write pointer of the free page chain FPC is stored as a page number "WPPE" into the page number storage unit 11D.

Similarly, page numbers "$RPP_1$", "$RPP_2$", - - - , "$RPP_N$" of read pointers "$RP_1$", "$RP_2$", - - - , "$RP_N$" of the page chains $PC_1$, $PC_2$, ---, $PC_N$ are stored into the page number storage unit 11F, whereas offset values "$RPO_1$", "$RPO_2$", ---, "$RPO_N$" of page numbers "$RPP_1$", "$RPP_2$", ---, "$RPP_N$" are stored into the offset value storage unit 11G. Also, a read pointer of the free page chain FPC is stored as a page number "RPPF" into the page number storage unit 11F.

Writing Operation in Second ATM Switching Circuit

Upon receipt of a storage request issued from the write control unit 4, the control unit 12 executes a process operation shown in a flow chart of FIG. 20. It is now assumed that an ATM cell outputted from the multiplexing unit 1 is sent to the output $3_k$. The control unit 12 transmits a port signal b1-1 and an access instruction signal b2-2 to the pointer storage memory 11. The port signal b1 indicates a page chain $PC_k$ corresponding to the output port $3_k$, and the access instruction signal b2 indicates reading operations with respect to the chain presence/absence storage unit 11A and the offset value storage unit 11E. Thereafter, upon receipt of presence/absence data "$E_k$" and an offset value "$WPO_k$" from the pointer storage memory 11, the control unit 12 judges as to whether or not the data $E_k$ is equal to a value of "1" and the offset value $WPO_k$ is equal to a value of "L-1" (step S31). That is to say, the process operation defined at the step S31 is to check as to whether or not an empty storage area is present in a page pointed out by a write pointer "$WP_k$" when the page chain $PC_k$ is present.

In the case that the control unit 12 judges at this step S31 that the page chain $PC_k$ is present and also the offset value $WPO_k$ is different from the value of "L-1", this control unit 12 judges as to whether or not the presence/absence data EF of the free page chain FPC is equal to the value of "0" (step S32). As a consequence, the control unit 12 sends a port signal "b1-2" and an access instruction signal "b2-2" to the pointer storage memory 11. This port signal b1-2 shows a free page chain FPC, and the access instruction signal b2-2 represents a reading operation from the chain presence/absence storage unit 11A. Thereafter, upon receipt of the presence/absence data EF from the pointer storage memory 11, the control unit 12 may execute the above-described judgment.

If the control unit 12 judges at the step S32 that the free page chain FPC is present, then this control unit 12 sends a storage permission to the write control unit 4 (step S33). This storage permission is to permit storing of an inputted ATM cell. When the process operation defined at the step S33 is accomplished, the control unit 12 judges as to the presence/absence data $E_k$ of the page chain $PC_k$ is equal to "0" (step S34). As a consequence, the control unit 12 transmits a port signal "b1-3" and the access instruction signal "b2-2" to the pointer storage memory 11. The port signal b1-3 indicates the output port $3_k$, and the access instruction signal b2-2 denotes a reading operation from the chain presence/absence storage unit 11A. Thereafter, upon receipt of the data $E_k$ from the pointer storage memory 11, the control unit 12 executes the above-described judgment.

When it is so judged at the step S34 that the page chain $PC_k$ is present, the control unit 12 executes:

a process operation of $PG(WPP_k) \leftarrow RPPF$ (step S35). As indicated in FIG. 21, the process operation defined at this step S35 is carried out in such a manner that a page pointed by the read pointer "RPPF" of the free page chain FPC may be pointed out by a next page number "PG" of a last page of the page chain "$PC_k$" (step S35). The above-described last page corresponds to such a page pointed by a write pointer "$WP_k$".

To execute the process operation defined at the step S35, the control unit 12 transmits both the port signal b1-2 and an access instruction signal "b2-3" to the pointer storage memory 11. The port signal b1-2 indicates the free page chain FPC, and the access instruction signal b2-3 indicates the pointer read out from the read pointer storage unit 11C. As a result, when the page number RPPF of the free page chain FPC is received from the pointer storage memory 11, the control unit 12 sends both the port signal b1-1 and an access instruction signal "b2-4" to the pointer storage memory 11. The port signal b1-1 shows the page chain $PC_k$, and the access instruction signal b2-4 represents a reading operation from the page number storage unit 11D. As a consequence, when the page number $WPP_k$ of the write pointer $WP_k$ is received from the pointer storage memory 11, the control unit 12 sets the page number $WPP_k$ as a page signal a5. Thereafter, the control unit 12 sends this page signal b5 and another access instruction signal b6 indicative of a writing operation to the page storage memory 13. Also, the control unit 12 transmits the page number RPPF as write data to the page storage memory 13. Accordingly, the read pointer RPPF is stored as the next page number PG into such a storage area corresponding to the page number $WPP_k$ of the page storage memory 13. As a result, such a page pointed by the read pointer RPPF of the free page chain FPC may be pointed out by the next page number PG of the page pointed by the write pointer $WP_k$.

When the process operation defined at the step S35 is accomplished, the control unit 12 executes:

a process operation of:
$WPP_k \leftarrow RPPF$,
and $WPO_k \leftarrow 0$ (step S36)

The process operation defined at the step S36 is carried out in such a manner that, as shown in FIG. 22, such a page pointed by the page number RPPF may be pointed out by the page number $WPP_k$ of the write pointer $WP_k$, and also the offset value $WPO_k$ of the write pointer $WPP_k$ is set to a value of "0".

To execute the process operation defined at the step S36, the control unit 12 transmits both the port signal b1-1 and an access instruction signal "b2-5" to the pointer storage memory 11. The port signal b1-1 indicates the page chain $PC_k$, and an access instruction signal b2-5 indicates the writing operation with respect to the write pointer storage unit 11B.

Also, the control unit 12 sends a value of "0" as write data to the pointer storage memory 11. Accordingly, the value of "0" is stored as an offset value "$WPO_k$" of a write pointer "$WP_k$".

Thereafter, the control unit 12 sends both the port signal b1-2 and an access instruction signal "b2-6" to the pointer storage memory 11. The port signal b1-2 shows the free page chain FPC, and the access instruction signal b2-6 represents a reading operation from a page number storage unit 11F. As a consequence, when the page number RPPF is received from the pointer storage memory 11, the control unit 12 sends the page signal b1-1 indicative of a page chain $PC_k$ and another access instruction signal "b2-7" indicative of a writing operation to the page number storage unit 11D. Also, the control unit 12 transmits the read pointer RPPF as write data to the pointer storage memory 11. Accordingly, the page number RPPF is stored as the page number $WPP_k$ of the page pointer $WP_k$. As a result, such a page pointed by the page number RPPF of the free page chain FPC may be pointed out by the write pointer $WP_k$.

In such a case that the page chain $PC_k$ is not present at the step S34, the control unit 12 executes:

such a process operation of;
$RPP_k \leftarrow RPPF, RPO_k \leftarrow 0,$
$WPP_k \leftarrow RPPF, WPO_k \leftarrow 0,$
$E_k \leftarrow 1$ (step S37).

The process operation defined at the step S37 is carried out in such a manner that an unused area pointed by the read pointer $RP_k$ of the free page chain FPC may be pointed out by both the read pointer $RP_k$ of the page chain $PC_k$ and the write pointer $WP_k$. As a consequence, the control unit 12 newly forms a page chain "$PC_k$" corresponding to the output port $3_k$. Then, the control unit 12 sets the presence/absence data "$E_k$" of the pointer storage memory 11 to "1".

To execute the process operation defined at the step S37, the control unit 12 transmits both the port signal b1-1 indicative of the page chain $PC_k$, and also an access instruction signal "b2-8" to the pointer storage memory 11. This access instruction signal b2-8 indicates a writing operation with respect to the offset value storage units 11E and 11G. Also, the control unit 12 sends "0" as write data to the pointer storage memory 11. As a result the value of "0" is stored into this pointer storage 11 as an offset value $WPO_k$ of the write pointer $WP_k$ and an offset value $RPO_k$ of the read pointer $RP_k$.

Thereafter, the control unit 12 transmits both the port signal b1-2 indicative of the free page chain FPC and the access instruction signal b2-6 to the pointer storage memory 11. This access instruction signal b2-6 represents a reading operation from the page number storage unit 11F. Upon receipt of the page number RPPF from the pointer storage memory 11, as a result, the control unit 12 transmits both the port signal b1-1 indicative of the page chain $PC_k$ and an access instruction signal "b2-9" to the pointer storage memory 11. This access instruction signal b2-9 indicates a writing operation with respect to the page number storage units 11D and 11F.

Also, the control unit 12 sends the page number RPPF as write data to the pointer storage memory 11. As a result, the page number RPPF is stored into this pointer storage 11 as a page number $WPP_k$ of the write pointer $WP_k$ and a page number $RPP_k$ of the read pointer $RP_k$.

Thereafter, the control unit 12 transmits both the port signal b1-1 indicative of the page chain $PC_k$ and an access instruction signal "b2-10" to the pointer storage memory 11. This access instruction signal b2-10 represents a writing operation with respect to chain presence/absence storage unit 11A. Also, the control unit 12 sends a value of "1" as write data to the pointer storage memory 11. As a consequence, the value of "1" is stored as the presence/absence data "$E_k$".

When the process operation defined at either the step S36 or the step S37 is accomplished, the control unit 12 judges as to whether or not the page number WPPF of the free page chain FPC is identical to the page number RPPF (step S38). To execute the process operation defined at the step S38, the control unit 12 transmits both the port signal b1-2 indicative of the free page chain FPC, and also an access instruction signal "b2-11" to the pointer storage memory 11. This access instruction signal b2-11 indicates a reading operation from the page number storage units 11D and 11F. As a consequence, upon receipt of the page numbers "WPPF" and "RPPF" of the free page chain FPC from the pointer storage memory 11, the control unit 12 executes the above-described judgement.

In such a case that the page number WPPF of the free page chain FPC is different from the page number RPPF at the above step S38, the control unit 12 executes:

a process operation of;
$RPPF \leftarrow PG(RPPF)$ (step S39)

As illustrated in FIG. 23, the process operation defined at the step S39 is carried out in this manner that such a page pointed by a next page number PG of a head page of the free page chain FPC may be pointed out by the page number RPPF equal to the read pointer of the free page chain FPC. As a consequence, when the process operations defined up to the step S38 are ended, if the head page of the free page chain FPC is shifted by 1 page along the backward direction, the control unit 12 moves the page number RPPF to a new head page of the free page chain FPC.

To perform the process operation defined at the step S39, the control unit 12 transmits both the port signal b1-2 indicative of the free page chain FPC, and the access instruction signal b2-6 to the pointer storage memory 11. This access instruction signal b2-6 indicates a reading operation from the page number storage unit 11F. As a result, upon receipt of the page number RPPF from the pointer storage memory 11, the control unit 12 sets this page number RPPF as a page signal b5. Thereafter, the control unit 12 transmits both the page signal b5 and an access instruction signal b6 indicative of a reading operation to the page storage memory 13. As a consequence, when the next page number PG is received from the page storage memory 13, the control unit 12 transmits both the port signal b1-2 indicative of the free page chain FPC and an access instruction signal "b2-12" representative of the reading operation with respect to the page number storage unit 11F to the pointer storage memory 11.

Also, the control unit 12 sends the next page number PG as write data to the pointer storage memory 11. As a consequence, the next page number PG is stored as the page number RPPF in this pointer storage memory 11.

In the case that the page number WPPF of the free page chain FPC is identical to the page number RPPF at the previous step S38, the control unit 12 sets the presence/absence data EF of the free page chain FPC as a value of "0" (step S40).

The execution of this process operation indicates such a fact that the free page chain FPC is not present.

To execute the process operation defined at the step S40, the control unit 12 transmits both the port signal b1-2 indicative of the free page chain FPC and the access instruction signal b2-10 representative of the writing operation with respect to the chain presence/absence storage unit 11A to the pointer storage memory 11. Also, the control unit 12 sends the value of "0" as write data to the pointer storage memory 11. As a consequence, the value of "0" is stored as the presence/absence data EF RPPF in this pointer storage memory 11. Furthermore, in the case that the page chain $PC_k$ is present, and also the offset value $WPO_k$ is different from the value "L−1" at the previous step S31, the control unit 12 increments the value of the offset value $WPO_k$ by 1 (step S41).

To execute the process operation defined at the step S41, the control unit 12 transmits both the port signal b1-1 and an access instruction signal "b2-13" to the pointer storage memory 11. The port signal b1-1 indicates the page chain $PC_k$, and the access instruction signal b2-13 indicates the reading operation from the offset value storage unit 11E. As a result, when the offset value $WPO_k$ is received from the pointer storage memory 11, the control unit 12 performs a calculation of adding the value of "1" to the value $WPO_k$. Thereafter, the control unit 12 sends both the port signal b1-1 and an access instruction signal "b2-14" to the pointer storage memory 11. The port signal b1-1 shows the page chain $PC_k$, and the access instruction signal b2-14 represents a writing operation with respect to the offset value storage unit 11E.

Also, the control unit 12 sends a value of "$WPO_k+1$" as write data to the pointer storage memory 11. As a consequence, this value of "$WPO_k+1$" is stored as the offset value "$WPO_k$".

When the process operation defined at the step S39, the step S40, or the step S41 is accomplished, the control unit 12 executes:

a process operation of BA ($WP_k$)←empty buffer address (step S42).

This process operation defined at the step S42 is carried out as follows: That is, as indicated in FIG. 24, when the address storage memory 14 receives an empty buffer address from the empty address management memory 9, the control unit 12 controls the above-described empty buffer address to be stored as a buffer address "BA" into an unused area pointed by the write pointer "$WP_k$".

If there is no free page chain FPC at the previous step S32, then the control unit 12 supplies to the write control unit 4, no permission of storing the entered cell (step S43), and thereafter, accomplishes the overall process operation of FIG. 5.

As previously explained, when the control unit 12 receives a storage request from the write control unit 4, this control unit 12 executes such a process operation that a new buffer address is stored into the last portion of the relevant page chain $PC_k$.

Buffer Address Control in Second ATM Switch Circuit

On the other hand, when the output port $3_k$ and an output instruction of a buffer address are received from the read control unit 5, the control unit 12 commences a process operation defined by a flow chart shown in FIG. 25. In other words, upon receipt of both the output port $3_k$ and the output instruction, the control unit 12 controls to output a buffer address (step S51). The process operation defined at this step S51 is carried out in such a manner that, as indicated in FIG. 26, since the page chain $PC_k$ corresponds to the output port $3_k$, such a buffer address "BA" pointed out by the read pointer $RP_k$ of the page chain $PC_k$ is outputted.

To execute a process operation defined at the step S51, the control unit 12 transmits both the port signal b1-1 and an access instruction signal "b2-15" to the pointer storage memory 11. This port signal b1-1 indicates the page chain $PC_k$, and the access instruction signal b2-16 indicates the reading operations from the page number storage unit 11F and the offset storage unit 11G. As a result, upon receipt of the read pointer "$RP_k$" from the pointer storage memory 6, the control unit 12 sets the read pointer "$RP_k$" as a pointer signal b3. This read pointer $RP_k$ is constructed of the page number $RPP_k$ and the offset value $RPO_k$. Thereafter, the control unit 12 transmits both this pointer signal b3 and also an access instruction signal b4 indicative of a reading operation to the address storage memory 14. As a consequence, a buffer address "BA" is transmitted to both the cell buffer memory 2 and the empty address management memory 9 from the address storage memory 14. This buffer address BA is specified by the page number $RPP_k$ and the offset value $RPO_k$.

When the process operation defined at the step S51 is accomplished, the control unit 12 checks as to whether or not the write pointer $WP_k$ of the page chain $PC_k$ is different from the read pointer $RP_k$, and furthermore, the offset value $RPO_k$ is different from the value "L−1" (step S52).

To execute a process operation defined at the step S52, the control unit 12 sends both the port signal b1-1 representative of the page chain $PC_k$, and an access instruction signal "b2-16" to the pointer storage memory 11. This access instruction signal b2-16 represents reading operations from the page number storage units 11D, 11F, and the offset value storage units 11E, 11G. Thereafter, both a write pointer $WP_k$ and a read pointer $RP_k$ are received from the pointer storage memory 11. The write pointer $WP_k$ is arranged by a page number "$WPP_k$" and an offset value "$WPO_k$", whereas the read pointer "$RP_k$" is arranged by a page number "$RPP_k$" and an offset value "$RPO_k$".

In the case that the control unit 12 judges at the step 52 that either the write pointer $WP_k$ is equal to the read pointer $RP_k$ or the offset value $RPO_k$ is equal to the value "L−1", the control unit 12 judges that the presence/absence data EF of the free page chain FPC is equal to the value of "0" in a similar manner to the above-explained step S32 (step S53).

When the control unit 12 judges that the free page chain FPC is present at this step S53, this control unit 12 executes:

a process operation of
PG(WPPF)←$RPR_k$ (step S54)

The process operation defined at the step S54 is carried out, as shown in FIG. 27. That is, a page pointed by the page number $RPP_k$ may be designated by the next page number PG. The next page number PG corresponds to such a page subsequent to the page designated by the page number WPPF of the free page chain FPC.

To execute the process operation defined at the step S54, the control unit 12 transmits both the port signal b1-1 and the access instruction signal b2-6 to the pointer storage memory 11. The port signal b1-1 indicates the page chain $PC_k$, and the access instruction signal b2-6 indicates the reading operation from the page number storage unit 1F. Thereafter, when the page number $RPP_k$ is received from the pointer storage memory 11, the control unit 12 sends both the port signal b1-2 and an access instruction signal b2-4 to the pointer storage memory 11. The port signal b1-2 shows the free page chain FPC, and the access instruction signal b2-4 represents a reading operation from the page number storage unit 11D. Thereafter, when the page number WPPF is received from the pointer storage memory 11, the control unit 12 sets the page number WPPF as a page signal b5. Thereafter, the control unit 12 sends this page signal b5 and another access instruction signal b6 indicative of a writing operation to the page storage memory 13. Also, the control unit 12 transmits the page number $RPP_k$ as write data to the page storage memory 13. Accordingly, the value of "$RPP_k$" is stored as the next page number PG into such a storage area corresponding to the page number WPPF of the page storage memory 13. As a result, such a page pointed by the page number $RPP_k$ may be pointed out by the next page number PG.

When the process operation defined at the step S54 is accomplished, the control unit 12 executes:

a process operation of:
WPPF←$RPP_k$ (step S55).

The process operation defined at the step S55 is carried out, as illustrated in FIG. 28. That is, a page designated by the page number $RPP_k$ may be pointed by the page number WPPF.

To execute the process operation defined at the step S55, the control unit 12 transmits both the port signal b1-1 and the access instruction signal b2-6 to the pointer storage memory 11. The port signal b1-1 indicates the page chain $PC_k$, and the access instruction signal b2-6 indicates the reading operation from the page number storage unit 11F. As a result, when the page number $RPP_k$ is received from the pointer storage memory 11, the control unit 12 sends both the port signal b1-2 and the access instruction signal b2-6 to the pointer storage memory 11. The port signal b1-2 shows the free chain FPC, and the access instruction signal b2-6 represents a writing operation with respect to the page number storage unit 11D. Also, the control unit 12 transmits the value of $RPP_k$ as write data to the pointer storage memory 11. Accordingly, the value of $RPP_k$ is stored as the page number WPPF. As a result, such a page pointed by the page number $RPP_k$ may be pointed out by the page number WPPF.

Conversely, when the free page chain FPC is not present at the previous step S53, the control unit 12 executes:
a process operation of:
$RPPF \leftarrow RPP_k$,
$WPPF \leftarrow RPP_k$, and
$EF \leftarrow 1$ (step S56).

The process operation defined at the step S56 is carried out as follows: That is, a page designated by the page number $RPP_k$ of the page chain $PC_k$ may be pointed by the page number WPPF, and also the page number RPPF of the free page chain FPC. As a consequence, the control unit 12 newly produces a free page chain FPC. Then, the control unit 12 sets the presence/absence data EF of the pointer storage memory 11 to "1".

To execute the process operation defined at the step S56, the control unit 12 transmits both the port signal b1-1 and the access instruction signal b2-6 to the pointer storage memory 11. The port signal b1-1 indicates the page chain $PC_k$, and the access instruction signal b2-6 indicates the reading operation from the page number storage unit 11F. As a result, when the page number $RPP_k$ is received from the pointer storage memory 11, the control unit 12 sends both the port signal b1-2 and the access instruction signal b2-9 to the pointer storage memory 11. The port signal b1-2 shows the free page chain FPC, and the access instruction signal b2-9 represents a writing operation with respect to the page number storage units 11D and 11F. Also, the control unit 12 transmits the value of $RPP_k$ as write data to the pointer storage memory 11. Accordingly, the value of $RPP_k$ is stored as the page number WPPF and the page number RPPF. Thereafter, the control unit 12 transmits both the port signal b1-2 indicative of the free page chain FPC, and the access instruction signal b2-10 to the pointer storage memory 11. This access instruction signal b2-10 indicates the writing operation with respect to the chain presence/absence storage unit 11A. The control unit 12 transmits the value of "1" as write data to the pointer storage memory 11. As a result, the value of "1" is stored as the presence/absence data EF. As a result, a free page chain FPC is newly formed.

When the process operation defined at either the step S55 or the step S56 is accomplished, the control unit 12 judges as to whether or not the write pointer $WP_k$ of the page chain $PC_k$ is identical to the read pointer $RP_k$ (step S57). To execute the process operation defined at the step S57, the control unit 12 transmits both the port signal b1-1 indicative of the page chain $PC_k$, and also the access instruction signal b2-16 to the pointer storage memory 11. This access instruction signal b2-16 indicates reading operations with respect to the page number storage unit 11D and 11F, and also the offset value storage units 11E and 11G. Subsequently, when the control unit 12 receives a write pointer "$WP_k$" and a read pointer "$RP_k$" from the pointer storage memory 11, this control unit 12 executes the above-described judgment. This write pointer $WP_k$ is arranged by the page number $WPP_k$ and the offset value $WPO_k$, whereas the read pointer $RP_k$ is arranged by the page number $RPP_k$ and the offset value $RPO_k$.

When the control unit 12 judges that the write pointer $WP_k$ is different from the read pointer $RP_k$, the control unit 12 executes:
a process operation of;
$RPP_k \leftarrow PG(RPP_k)$, and
$RPO_k \leftarrow 0$ (step S58).

As illustrated in FIG. 29, the process operation defined at the step S58 is carried out in this manner that such a page pointed by a next page number PG of a head page of the page chain $PC_k$ may be pointed out by the page number $RPP_k$ of the read pointer $RP_k$, and furthermore, the offset value $RPO_k$ is set to the value of "0".

To perform the process operation defined at the step S58, the control unit 12 transmits both the port signal b1-1 indicative of the page chain $PC_k$, and the access instruction signal b2-6 to the pointer storage memory 11. This access instruction signal b2-6 indicates the reading operation from the page number storage unit 11F. As a result, upon receipt of the page number $RPP_k$ from the pointer storage memory 11, the control unit 12 sets this page number $RPP_k$ as a page signal b5. Thereafter, the control unit 12 transmits both the page signal b5 and the access instruction signal b6 indicative of the reading operation to the page storage memory 13. As a consequence, when the next page number PG is received from the page storage memory 13, the control unit 12 transmits both the port signal b1-1 indicative of the page chain $PC_k$ and the access instruction signal b2-12 representative of the writing operation with respect to the page number storage unit 11F to the pointer storage memory 11. Also, the control unit 12 sends the page number PG as write data to the pointer storage memory 11. As a consequence, the next page number PG is stored as the page number $RPP_k$ in this pointer storage memory 11.

Thereafter, the control unit 12 sends both the port signal b1-1 indicative of the page chain $PC_k$, and an access instruction signal "b2-17" indicative of the writing operation with respect to the offset value storage unit 11G to the pointer storage memory 11. Also, the control unit 12 sends the value of "0" as write data. As a result, the value of "0" is stored as the offset value RPO into the pointer storage memory 11. Then, the process operation defined at the step S58 is ended.

On the other hand, when the control unit 12 judges at the step S57 that the write pointer $WP_k$ is identical to the read pointer $RP_k$, this control unit 12 sets the presence/absence data $E_k$ of the page chain $PC_k$ to a value of "0" (step S59).

Furthermore, in such a case that the write pointer $WP_k$ of the page chain $PC_k$ is different from the read pointer $RP_k$ and also the offset value $RPO_k$ is different from the value "L−1" at the step S52, the control unit 12 adds a value of "1" of the offset value $RPO_k$ (step S60).

To perform the process operation defined at the step S60, the control unit 12 transmits the port signal b1-1 indicative of the page chain $PC_k$ and an access instruction signal b2-17 indicative of the reading operation from the offset value storage unit 11G to the pointer storage memory 11. As a consequence, upon receipt of the offset value $RPO_k$ from the pointer storage memory 11, the control unit 12 adds the value of "1" to this offset value $RPO_k$. Subsequently, the control unit 12 sends both the port signal b1-1 indicative of the page chain $PC_k$ and the access instruction signal b2-17 indicative of the writing operation with respect to the offset value storage unit 11G to the pointer storage memory 11. Also, the control unit 12 sends another value of "$RPO_k+1$" as write data to the pointer storage memory 11. As a consequence, this value of "$WPO_k+1$" is stored as the offset value $RPO_k$, and then the process operation defined at the step S60 is ended.

Overall Operation in Second ATM Switching Circuit

Now, a description is made of an overall operation executed in the second ATM switching circuit of FIG. 15.

ATM cells which are entered into the input ports $1_1$, $1_2$, - - - , $1_N$ are multiplexed by the multiplexing unit 1, and then the multiplexed ATM cell is supplied to the cell buffer memory 2. When this multiplexed cell is outputted, the write control unit 4 checks a destination of this multiplexed cell. When the destination of this multiplexed ATM cell is the output port $3_k$, the write control unit 4 both the port signal indicative of this output port $3_k$ and also the storage request of this multiplexed ATM cell to the control unit 12.

When the control unit 12 receives the above-described storage request, if the control unit 12 judges at the steps S31 and S41 that the page chain $PC_k$ corresponding to the output port $3_k$ is present and also the offset value $WPO_k$ of this write pointer $WP_k$ is different from the value L−1, then this control unit 12 adds the value of "1" to the present offset value $WPO_k$, and moves the storage area indicated by the write pointer $WP_k$ by 1, so that the write pointer $WP_k$ points out the unused area. Then, at the step S42, the control unit 12 stores the empty buffer address received from the empty address management memory 9 as the buffer address "BA" into the unused area pointed out by the write pointer $WP_k$.

Also, if the above-described storage request is received and at the step S31, the page chain $PC_k$ is not present, or the offset value $WPO_k$ of the write pointer $WP_k$ is equal to the value of "L−1", the control unit 12 judges that the unused area is not present in the page pointed out by the write pointer $WP_k$. Thereafter, when the free page chain FPC is not present at the step S32, the control unit 12 controls the write control unit 4 to discard the ATM cell derived from the multiplexing unit 1 at the step S43.

When the free page chain FPC is present at the step S32, the control unit 12 permits the write control unit 4 to store the inputted ATM cell at the step S33. Thereafter, when the page chain $PC_k$ is present at the step S34, the control unit 12 connects the head portion of the free page chain FPC to the last portion of the page chain $PC_k$ at the steps S35 and S36, so that an unused area for storing thereinto the buffer address is secured in the page chain $PC_k$. Thereafter, the control unit 12 controls such an operation that the read pointer "$RP_k$" of the page chain $PC_k$ points out a last portion thereof. Conversely, when the page chain $PC_k$ is not present at the step S34, the control unit 12 newly produces a page chain $PC_k$ so as to secure an unused area for storing thereinto the buffer address at the step S37.

When securing of the unused area is accomplished, if the page number WPPF of the free page chain FPC is different from the page number RPPF at the step S38, then the control unit 12 judges that the free page chain FPC is still present. Thus, the control unit 12 moves the page number RPPF to a new head page of the free page chain FPC. Conversely, when the page number WPPF of the free page chain FPC is identical to the page number RPPF at the step S38, the control unit 12 judges that the free page chain FPC is not present at the step S40.

Thereafter, at the step S42, the control unit 12 stores the empty buffer address received from the empty address management memory 9 as the buffer address "BA" into the unused area pointed out by the write pointer $WP_k$.

As previously explained, the buffer address "BA" of the entered ATM cell is stored into the last page of the page chain $PC_k$.

On the other hand, when the ATM cell is outputted to the output port $3_k$, the read control unit 5 sends both the output port $3_k$ and the output instruction of the buffer address to the control unit 12. As a result, the control unit 12 controls the address storage memory 14 at the step S51. The address storage memory 14 reads the buffer address BA pointed out by the read pointer $RP_k$ of the page chain $PC_k$ corresponding to the output port $3_k$, and then supplies this read buffer address BA to both the cell buffer memory 2 and the empty address management memory 9. In this empty address management memory 9, the ATM cell is read from the storage region designated by the buffer address BA, and then the read ATM cell is transmitted to the output port $3_k$ under control of the control unit 12. Also, in this empty address management memory 9, the buffer address BA is managed as the empty buffer address.

When the buffer address BA is outputted from the address storage memory 14, if either the write pointer $WP_k$ of the page chain $PC_k$ is identical to the read pointer $RP_k$, or the offset value $RPO_k$ of the read pointer $RP_k$ is different from the value "L−1" at the steps S52 and S60, then the control unit 12 adds the value of "1" to the present offset value $RPO_k$, and moves the storage area pointed by the read pointer $RP_k$ by 1. As a consequence, the read pointer $RP_k$ points out the next buffer address.

When the write pointer $WP_k$ of the page chain $PC_k$ s different from the read pointer $RP_k$, and also the offset value $RPO_k$ of the read pointer $RP_k$ is identical to the value "L−1" at the step S52, then the control unit 12 may judge that the buffer address BA is not present in the page designated by the read pointer $RP_k$. Thereafter, when the free page chain FPC is present at the step S53, the control unit 12 connects the page designated by the read pointer $RP_k$ to the last portion of the free page chain FPC at the steps S54 and S55, and then assembles this page into the free page chain FPC. Also, at the step S53, when there is no free page chain FPC, the control unit 12 newly produces a free page chain FPC at the step S56.

In the case that the control unit 12 accomplishes assembling of the page pointed by the write pointer $WP_k$ into the free page chain FPC, and also the write pointer $WP_k$ is different from the read pointer $RP_k$ at the step S57, the control unit 12 judges that the page chain $PC_k$ is present, and then executes the process operation defined at the step S58. As a result, the read pointer $RP_k$ may point out the head page of the page chain $PC_k$. Also, at the step S57, when the write pointer $WP_k$ is identical to the read pointer $RP_k$, the control unit 12 judges that the page chain $PC_k$ is not present, and thereafter accomplishes the overall process operation.

As previously explained, in accordance with the above-described circuit arrangement of the ATM switch circuit according to this second embodiment, the next pointer storage unit 8A of the address storage memory 8 can be omitted, although this next pointer storage unit 8A is required in the ATM switch circuit according to the first embodiment. For example, in such a case that 64,000 pieces of buffer addresses can be stored into the address storage memory 8, the storage capacity of the next pointer storage unit 8A requires:

$$16 \text{ bits} \times 64 \text{ k} = 1{,}024 \text{ kbits.}$$

In contrast, when 256 pieces of buffer addresses can be stored into 1 page, the storage capacity of the page storage memory 13 requires only:

$$8 \text{ bits} \times 256 = 2 \text{ kbits.}$$

As a consequence, since the storage capacity of the next pointer storage unit 8A is largely decreased, as compared with the increase in the storage capacity of the page storage memory 13, the resultant memory capacity can be reduced.

Overview of Third ATM Switch Circuit

Referring to drawings, another ATM switch circuit according to a third embodiment of the present invention will be described in detail.

Figure 30:
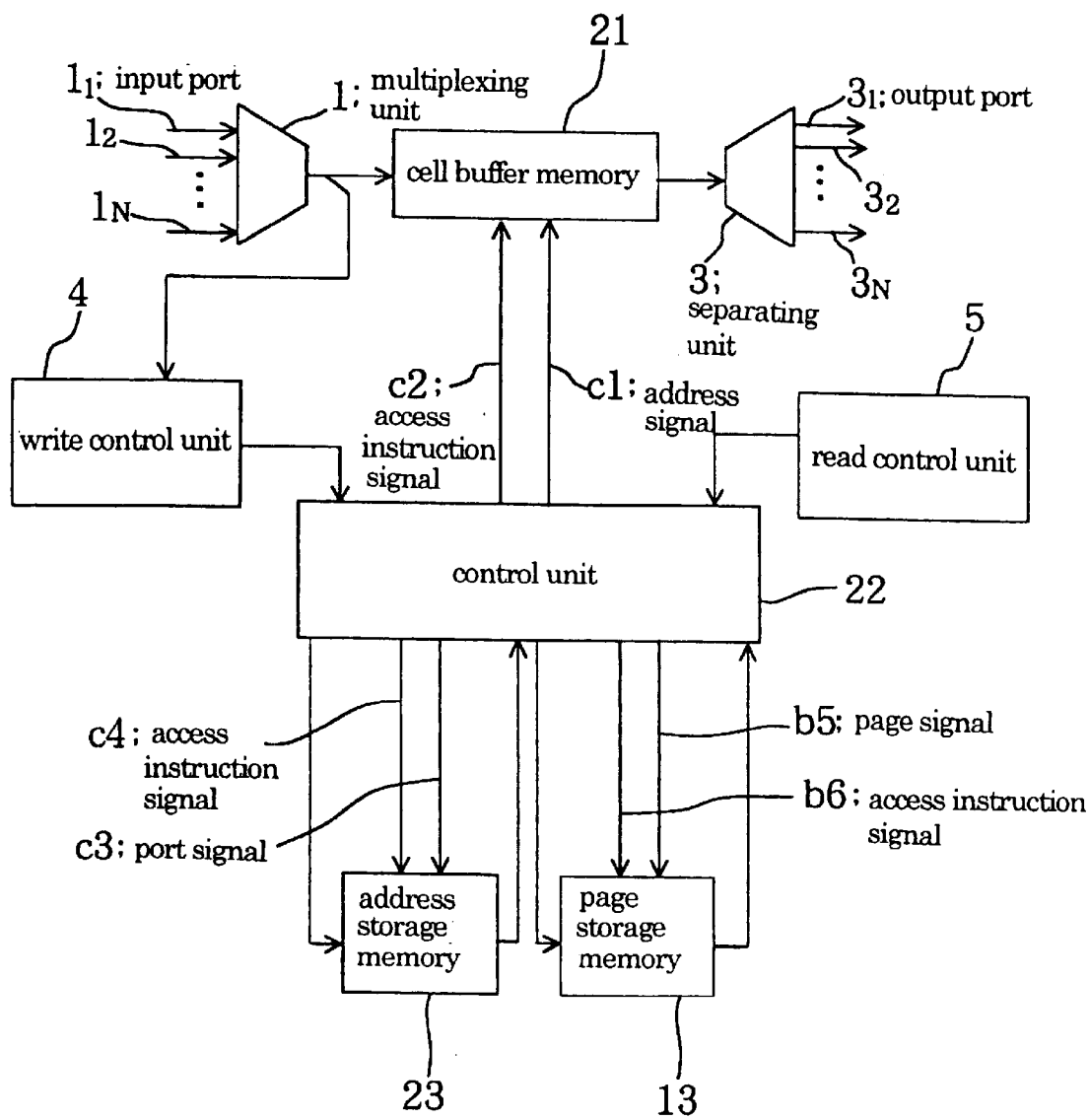
FIG. 30 is a schematic block diagram for showing an arrangement of an ATM switch circuit according to a third embodiment of the present invention.
Figure 31:
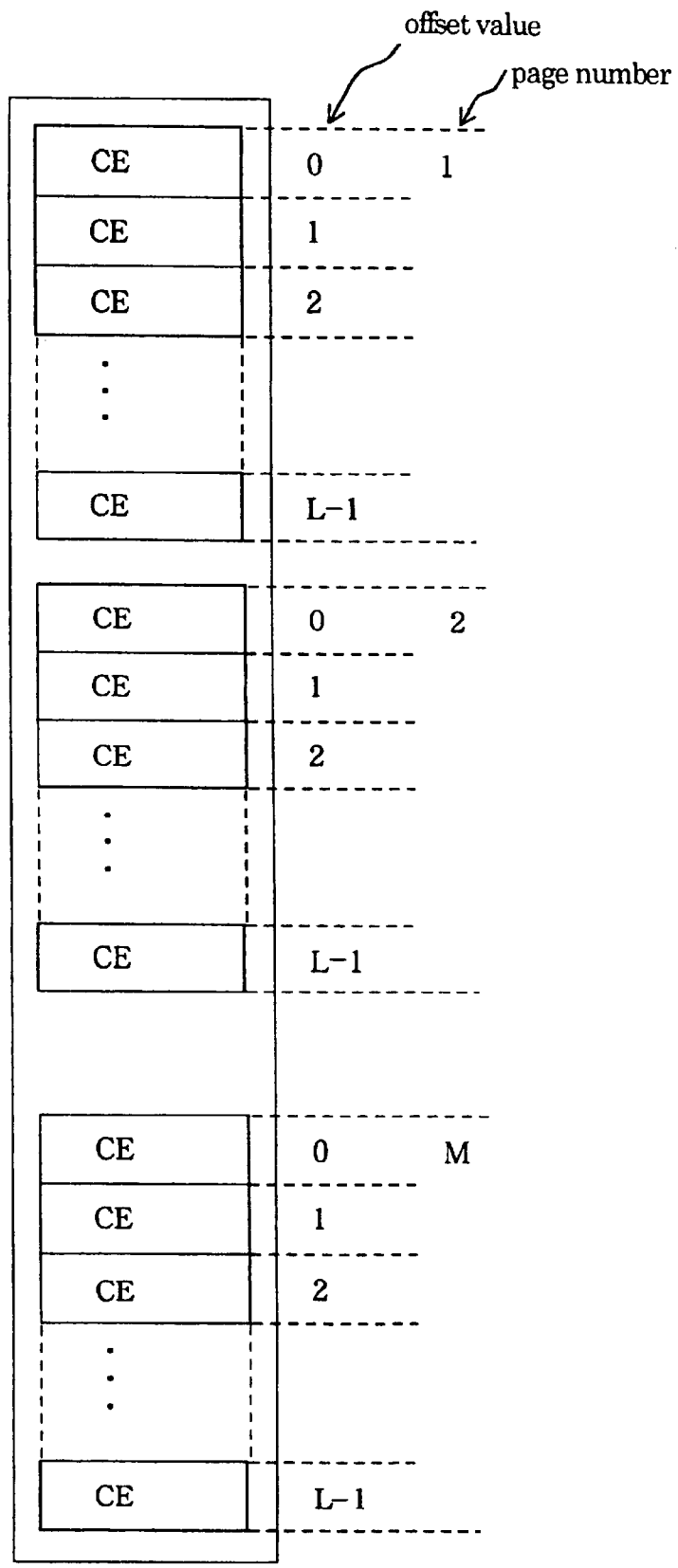
FIG. 31 is a structural diagram for indicating a structure of a cell buffer memory employed in the third ATM switch circuit of FIG. 30.
Figure 32:
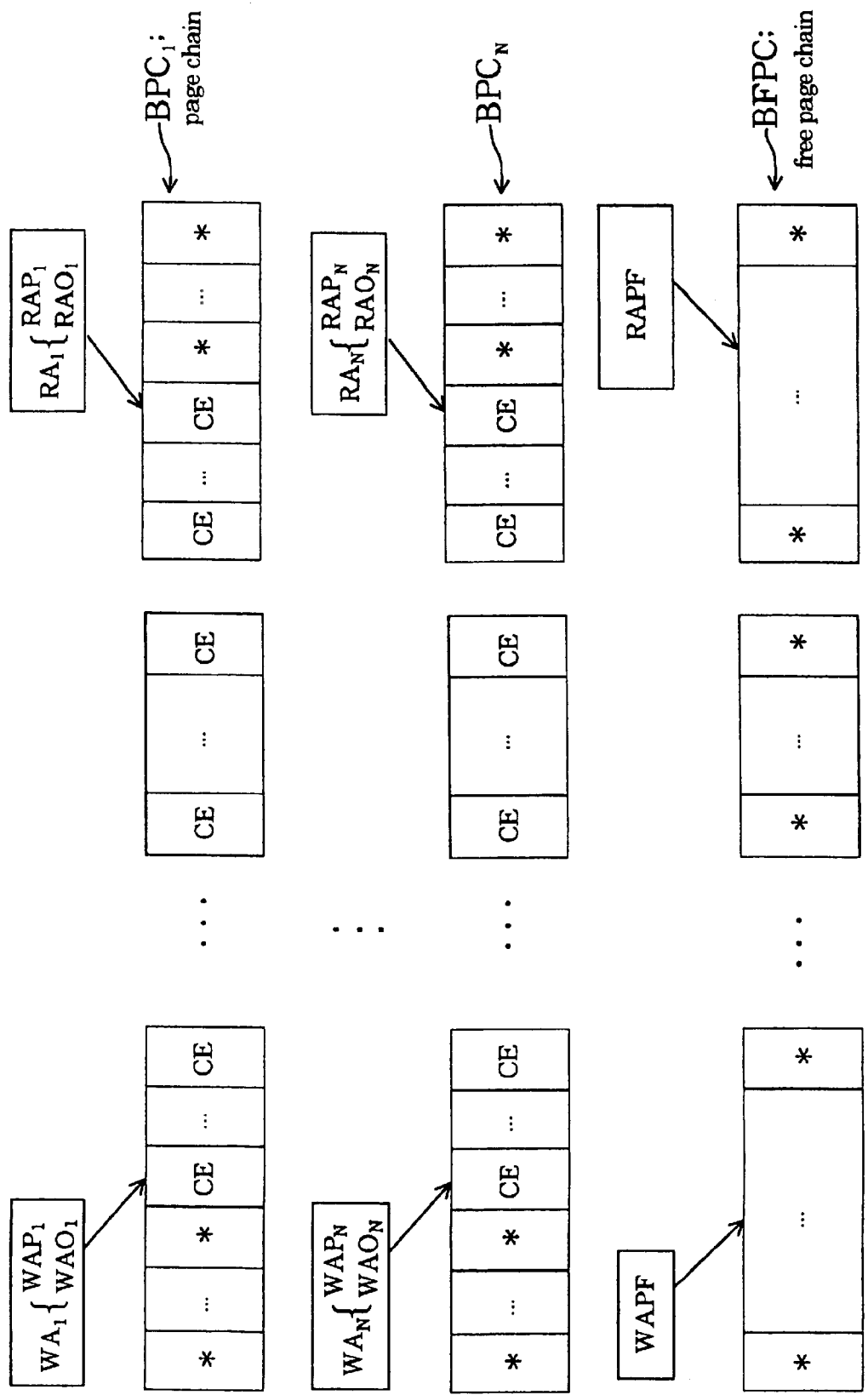
FIG. 32 is an explanatory diagram for explaining a chain structure of the third ATM switch circuit shown in FIG. 30.
Figure 33:
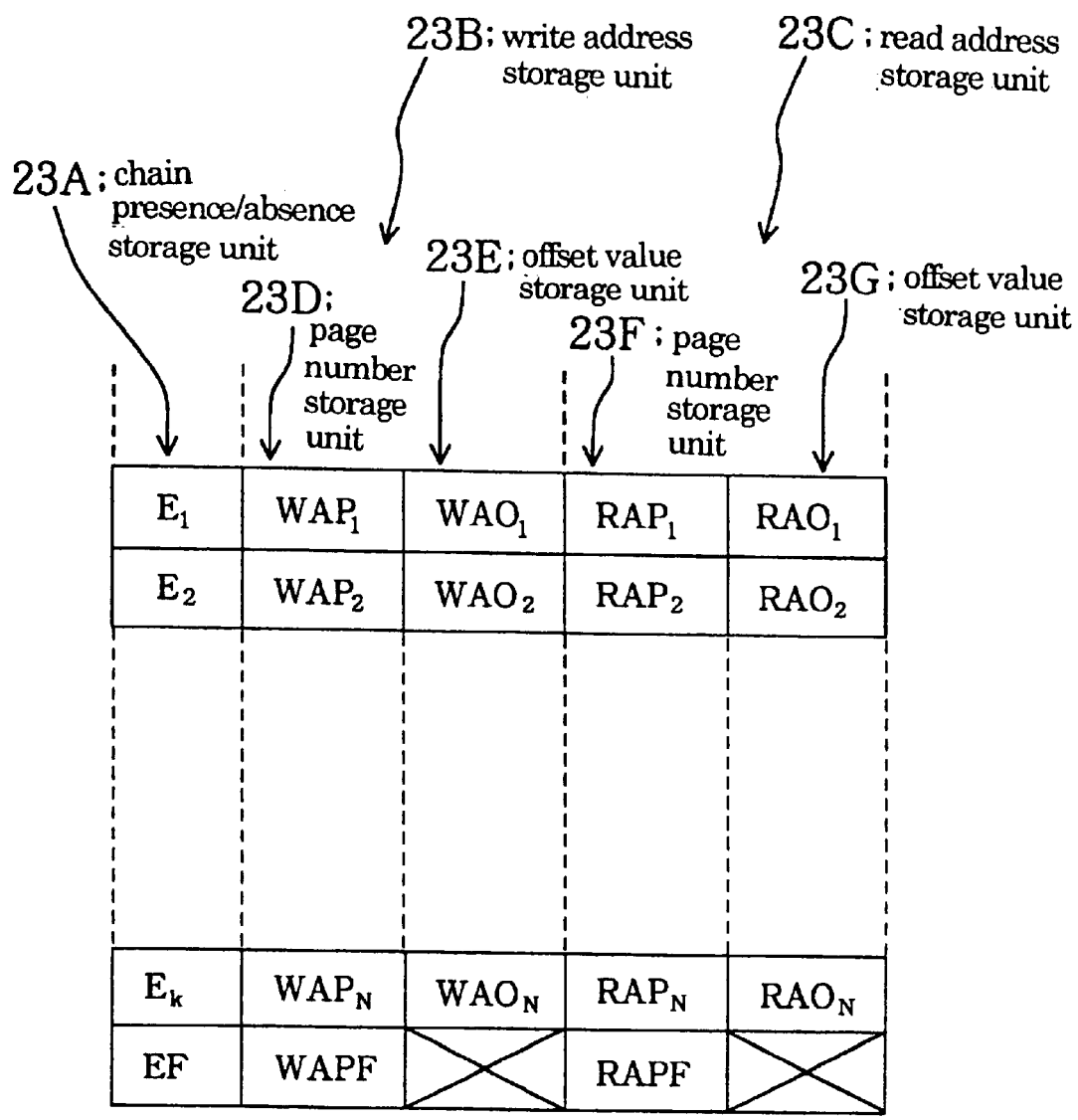
FIG. 33 is a structural diagram for representing a structure of an address storage memory employed in the third ATM switch circuit of FIG. 30.
Figure 34:
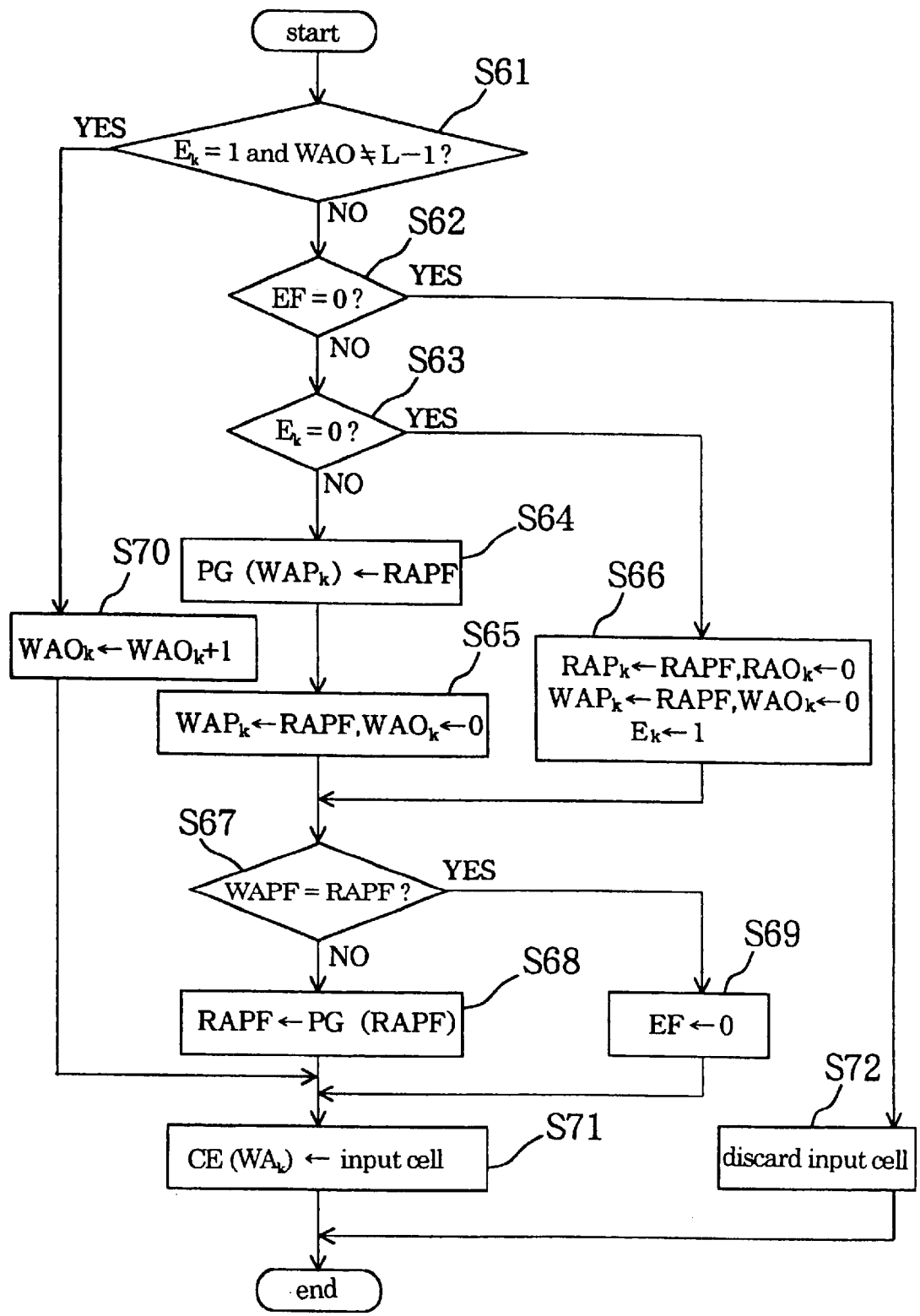
FIG. 34 is a flow chart for describing a process operation of an ATM cell storing operation by a control unit employed in the third ATM switch circuit of FIG. 30.
Figure 35:
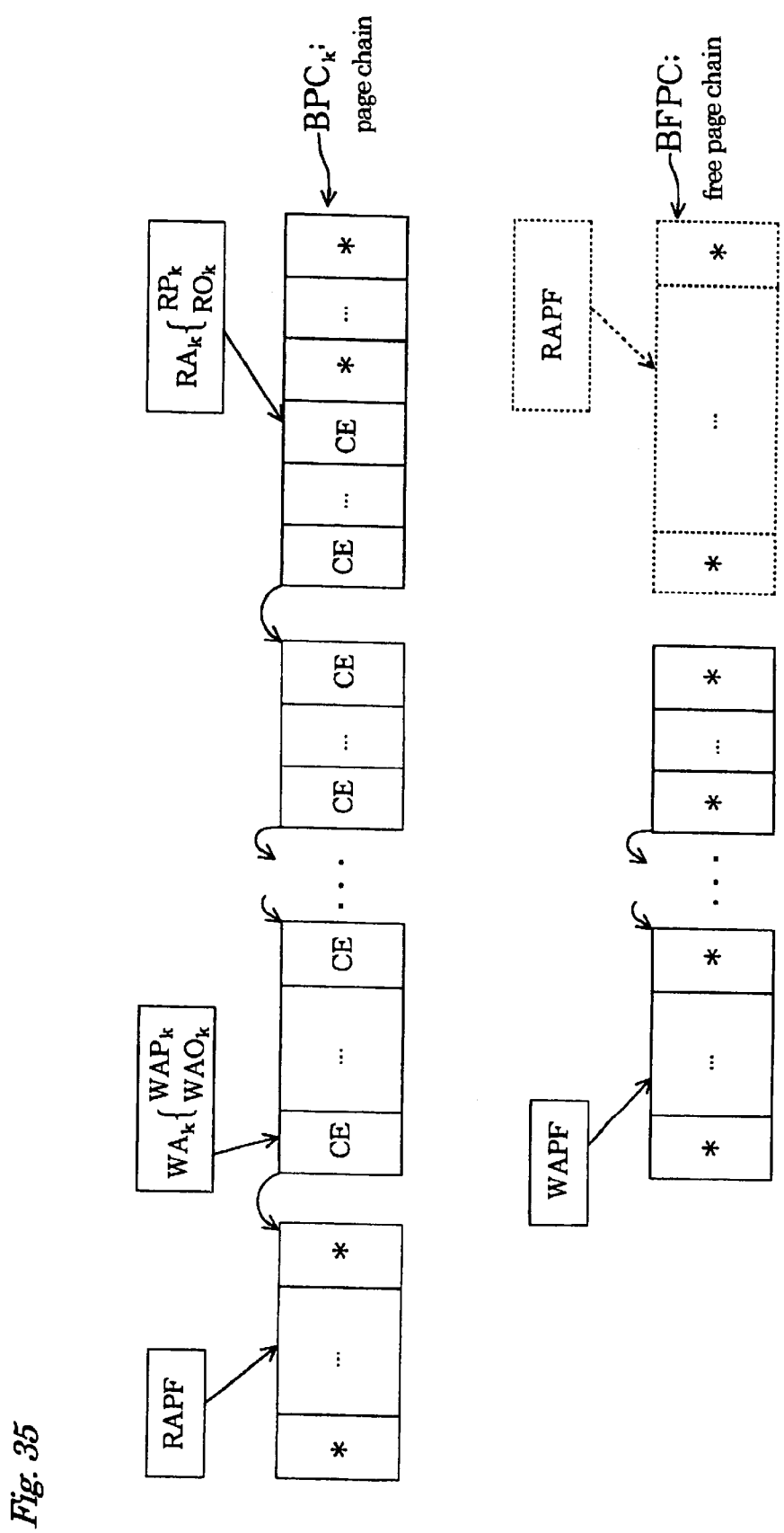
FIG. 35 is an explanatory diagram for explaining a move of a pointer by a processing operation of the control unit employed in the third ATM switch circuit of FIG. 30.
Figure 36:
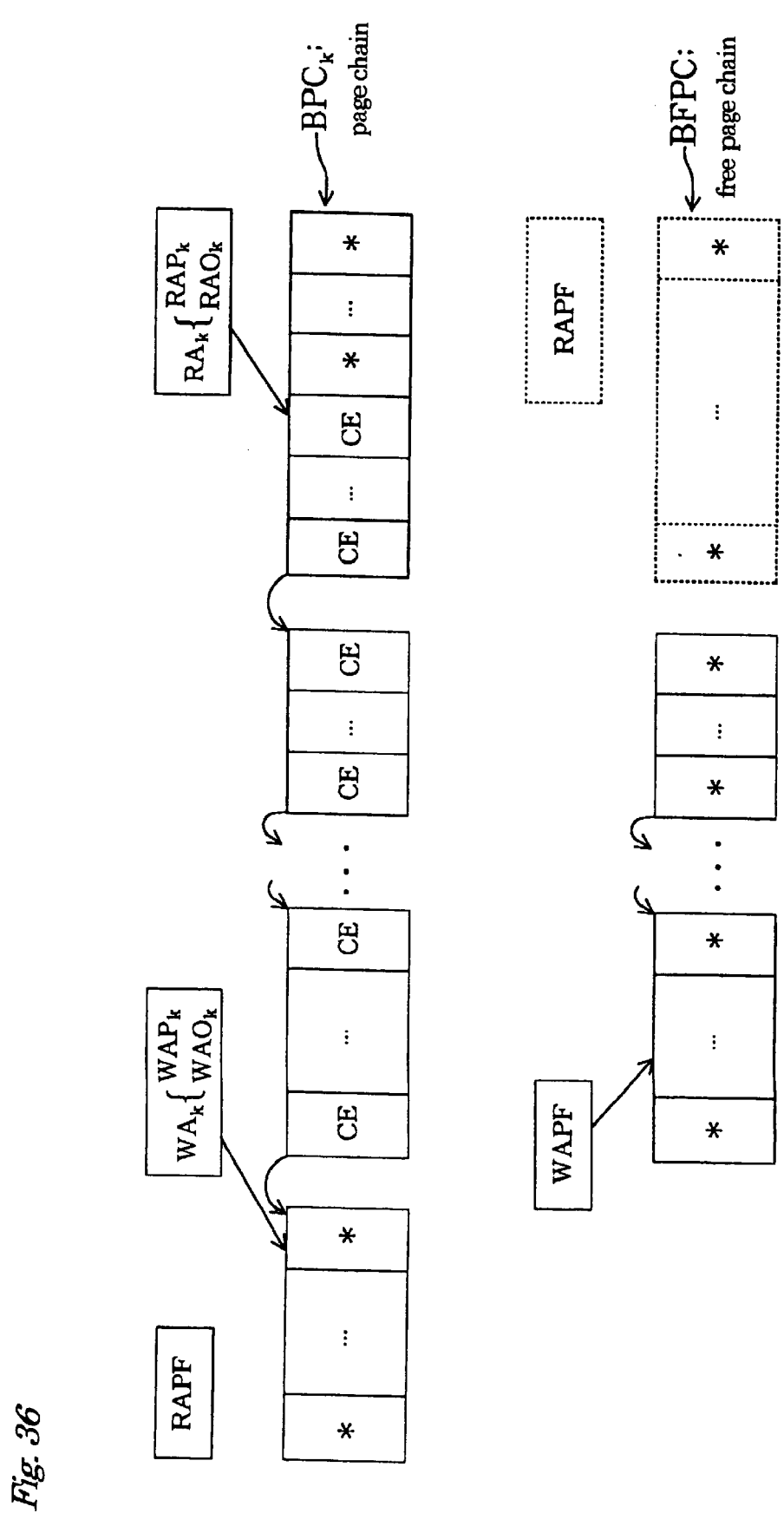
FIG. 36 is an explanatory diagram for explaining a move of a pointer by a processing operation of the control unit employed in the third ATM switch circuit of FIG. 30.
Figure 37:
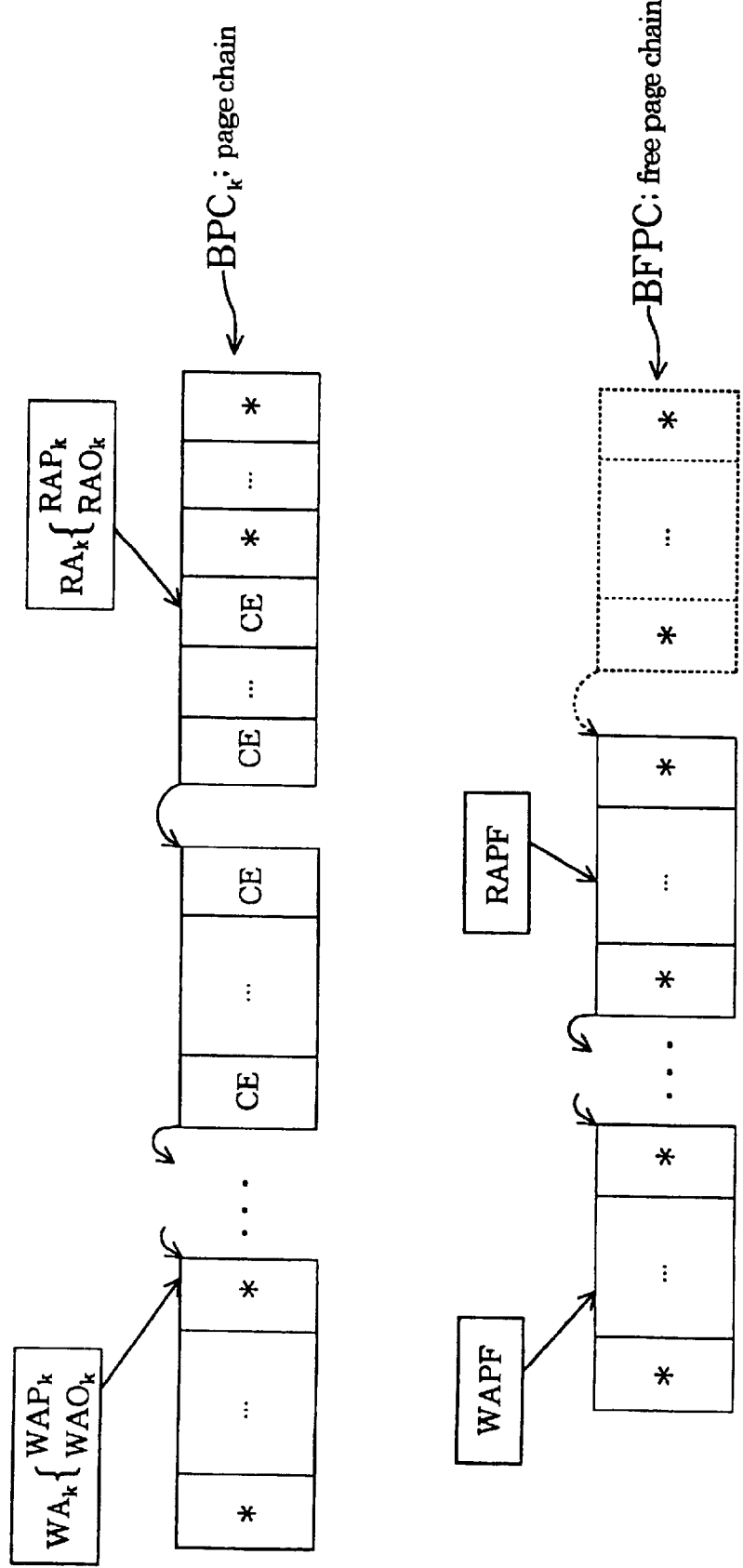
FIG. 37 is an explanatory diagram for explaining a move of a pointer by a processing operation of the control unit employed in the third ATM switch circuit of FIG. 30.
Figure 38:
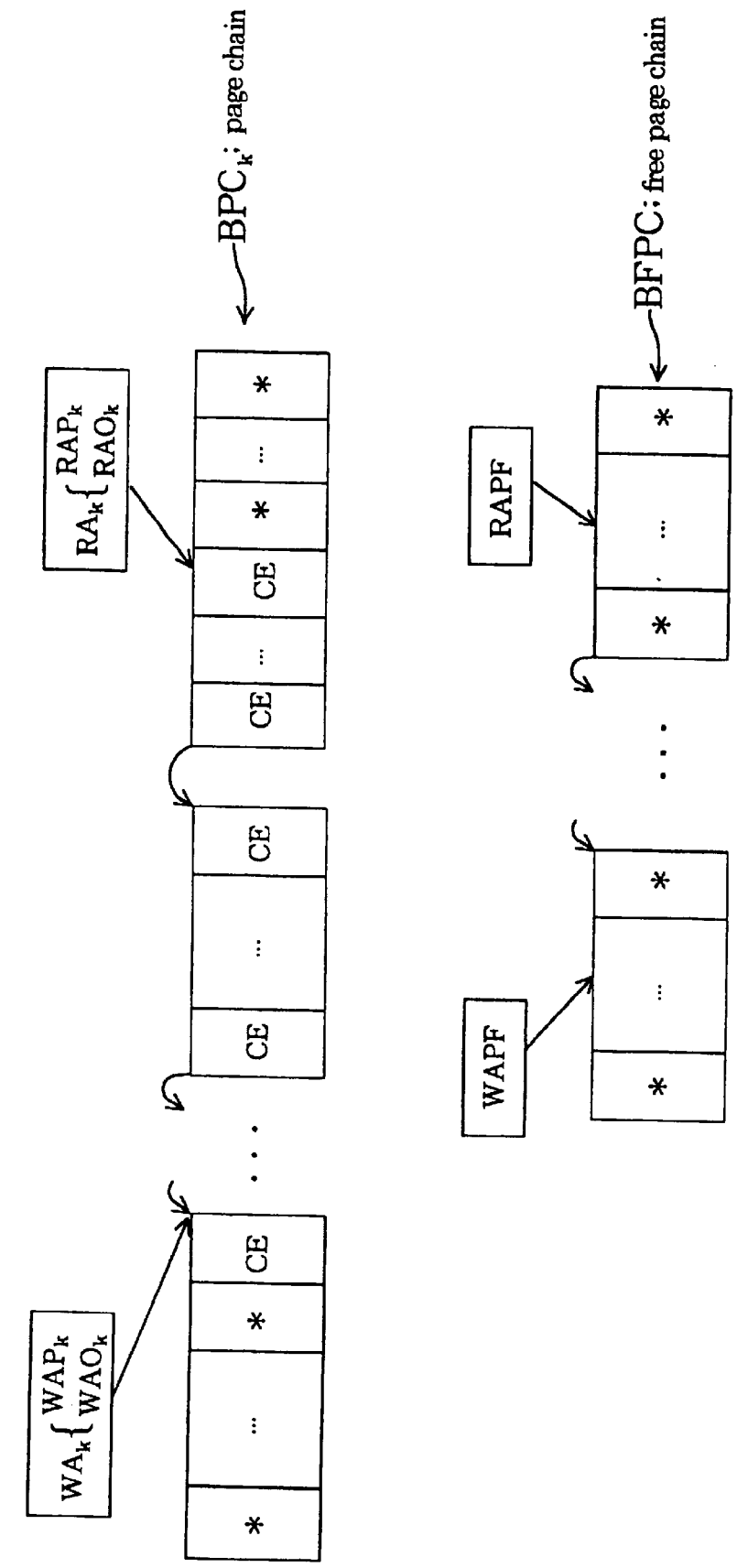
FIG. 38 is an explanatory diagram for explaining a move of a pointer by a processing operation of the control unit employed in the third ATM switch circuit of FIG. 30.
Figure 39:
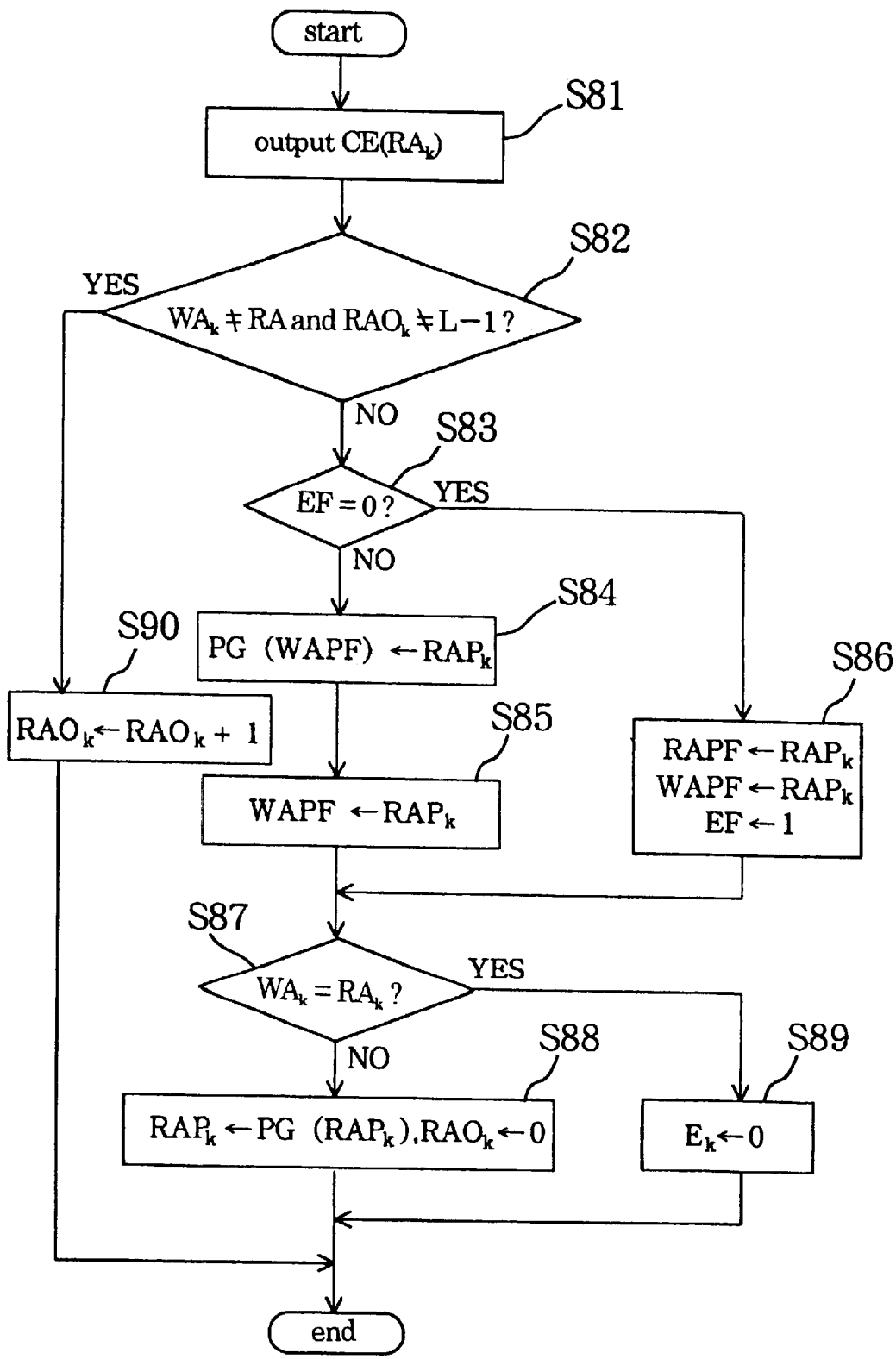
FIG. 39 is a flow chart for explaining a cell output processing operation by the control unit employed in the third ATM switch circuit of FIG. 30.
Figure 40:
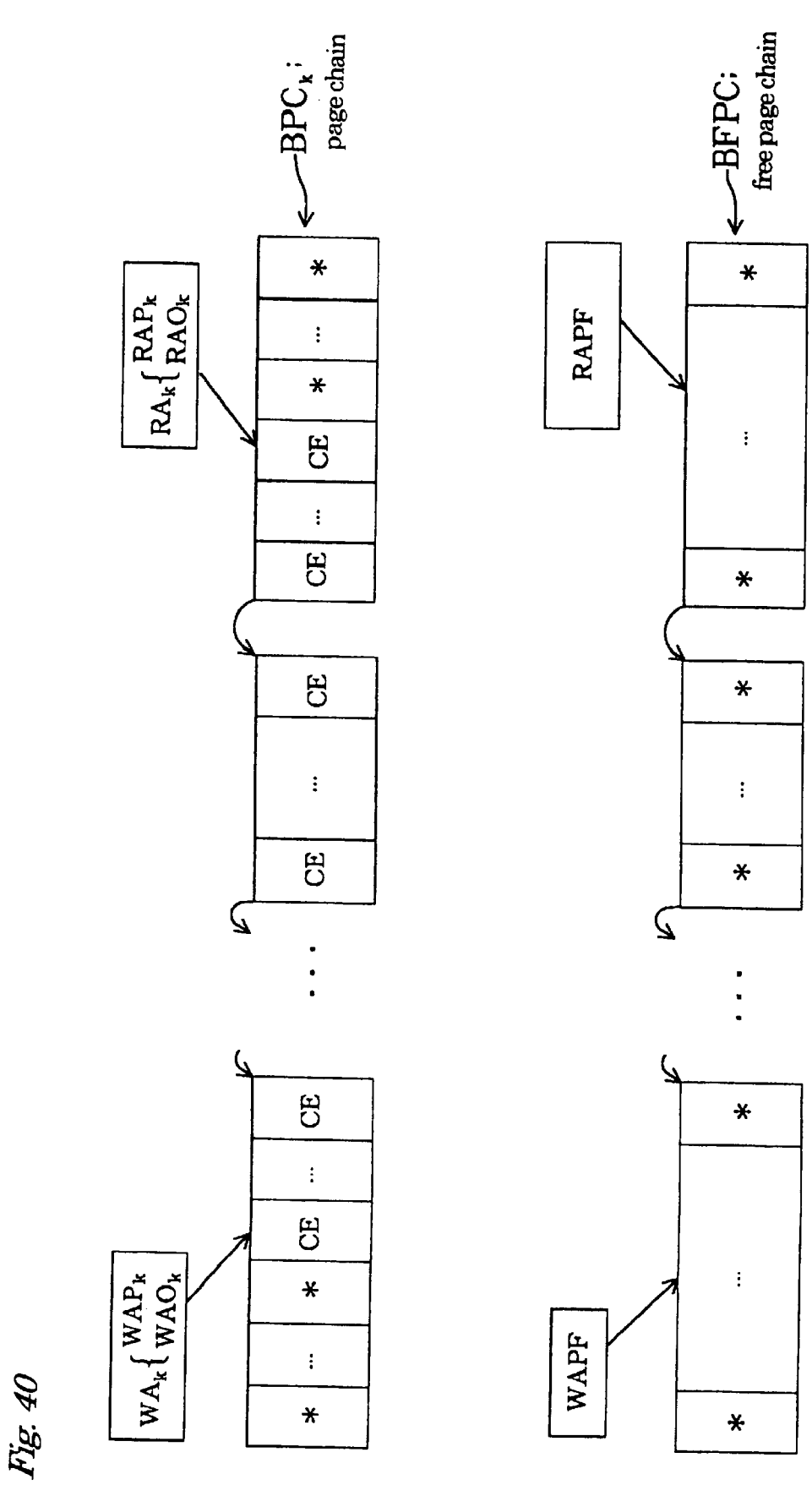
FIG. 40 is an explanatory diagram for describing a move of the pointer by a processing operation of the control unit employed in the third ATM switch circuit of FIG. 30.
Figure 41:
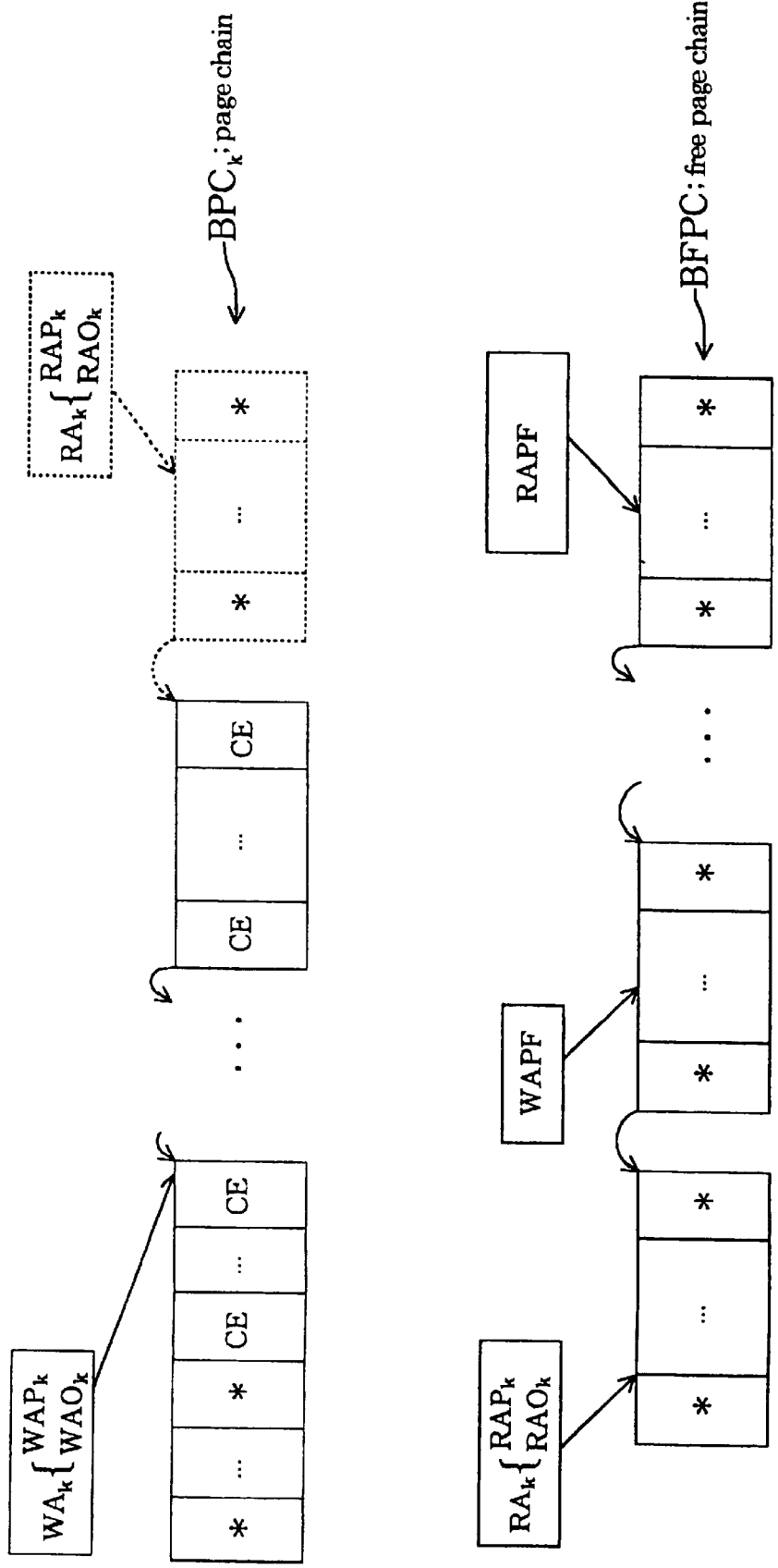
FIG. 41 is an explanatory diagram for describing a move of the pointer by a processing operation of the control unit employed in the third ATM switch circuit of FIG. 30.
Figure 42:
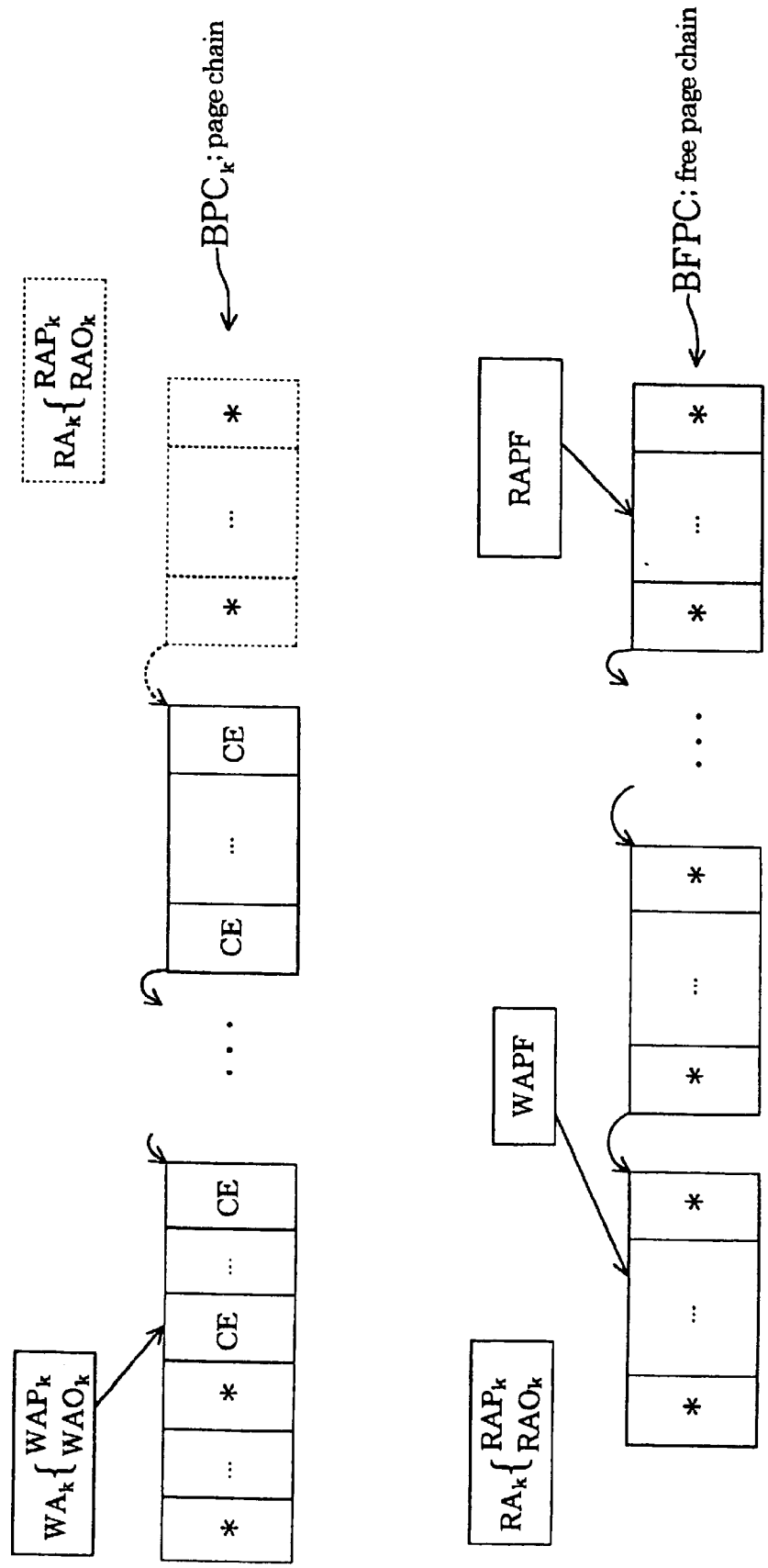
FIG. 42 is an explanatory diagram for describing a move of the pointer by a processing operation of the control unit employed in the third ATM switch circuit of FIG. 30.
Figure 43:
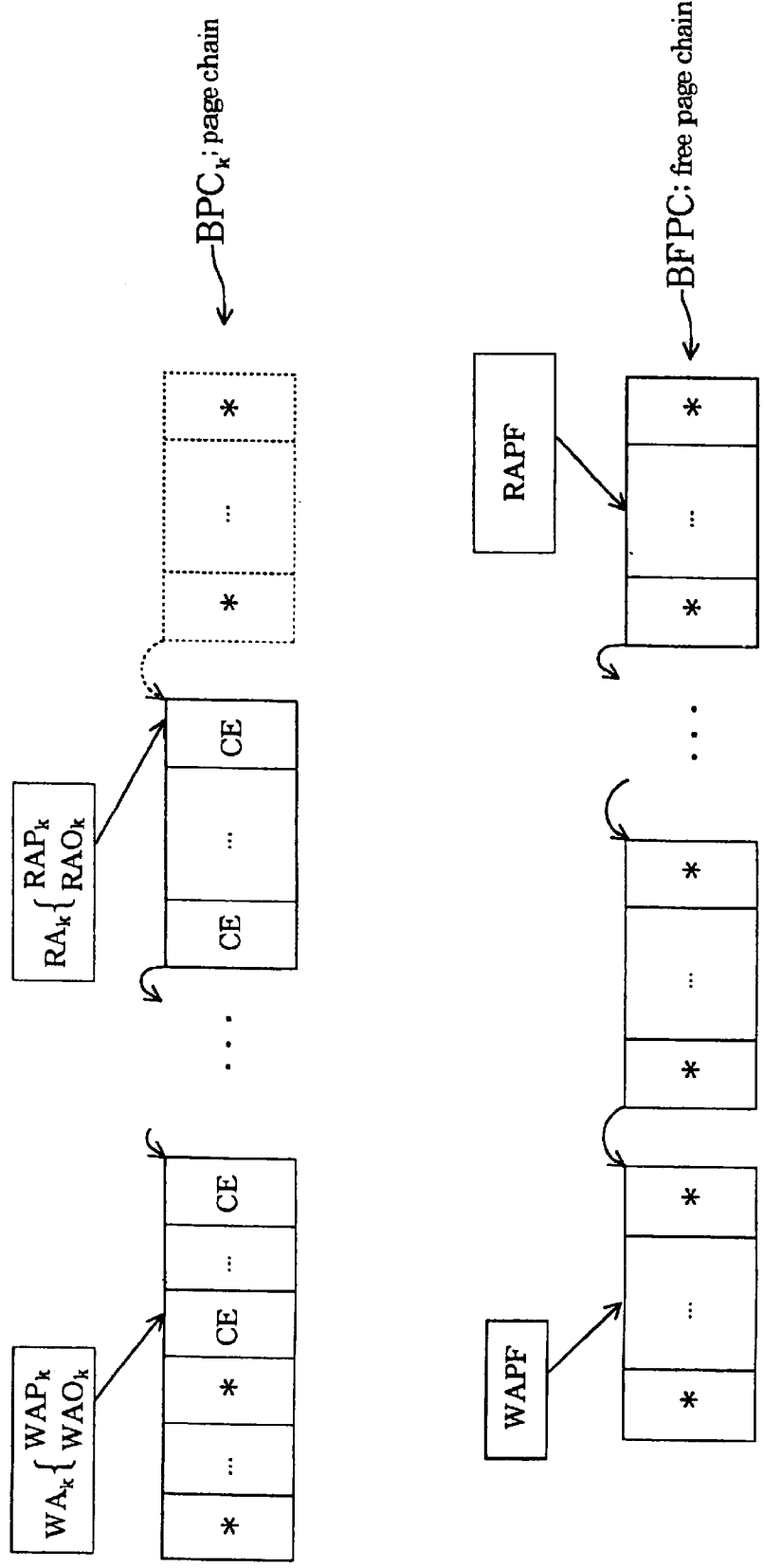
FIG. 43 is an explanatory diagram for describing a move of the pointer by a processing operation of the control unit employed in the third ATM switch circuit of FIG. 30.
Figure 44:
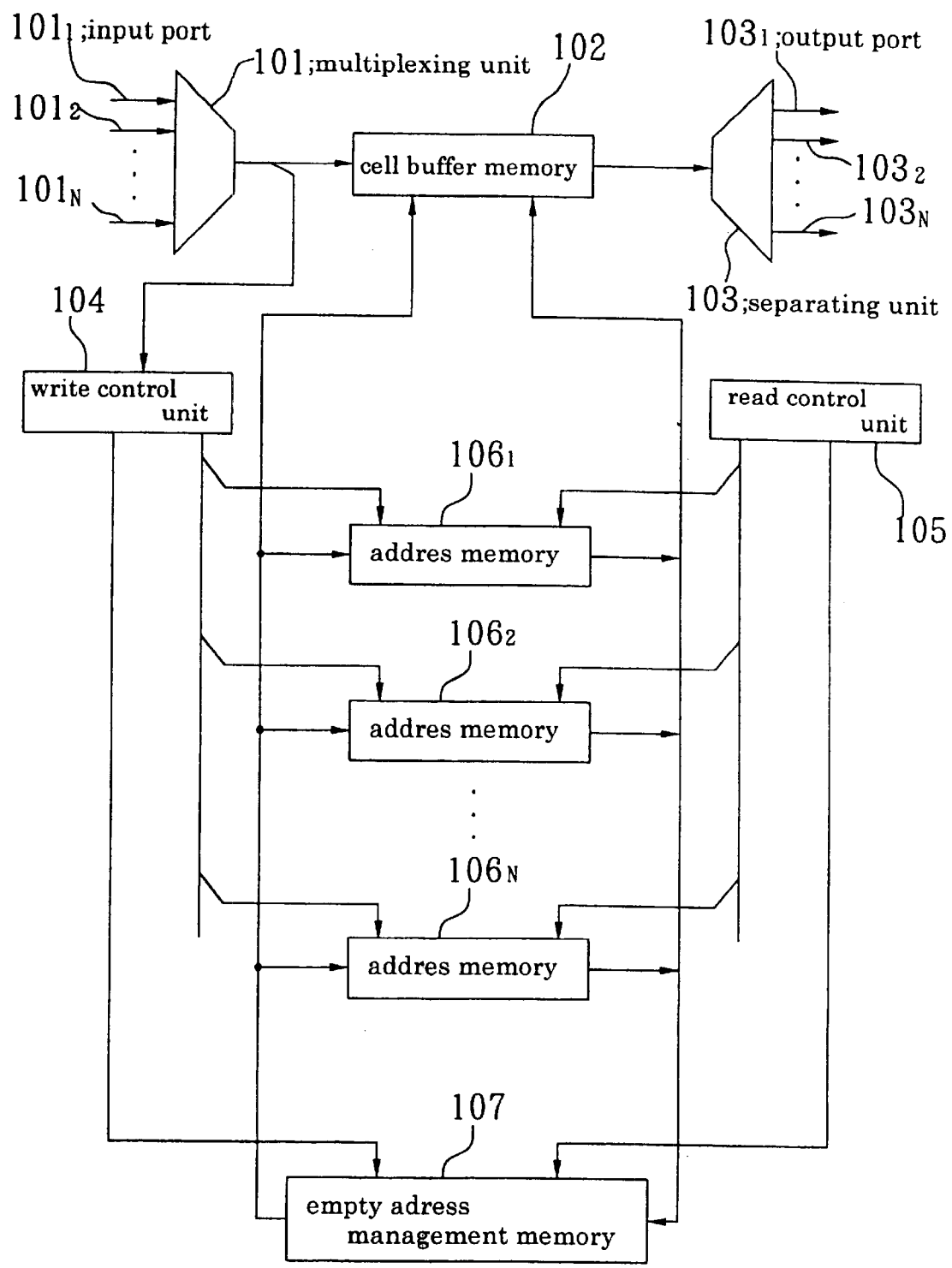
FIG. 44 is a structural diagram for showing the arrangement of the conventional ATM switch circuit.

FIG. 30 is a schematic block diagram for showing an arrangement of an ATM switch circuit according to a third embodiment of the present invention. FIG. 31 is a structural diagram for indicating a structure of a cell buffer memory employed in the third ATM switch circuit of FIG. 30. FIG. 32 is an explanatory diagram for explaining a chain structure of the third ATM switch circuit shown in FIG. 30. FIG. 33 is a structural diagram for representing a structure of an address storage memory employed in the third ATM switch circuit of FIG. 30. FIG. 34 is a flow chart for describing a process operation of an ATM cell storing operation by a control unit employed in the third ATM switch circuit of FIG. 30. FIG. 35 is an explanatory diagram for explaining a move of a pointer by a processing operation of the control unit employed in the third ATM switch circuit of FIG. 30. FIG. 36 is an explanatory diagram for explaining a move of a pointer by a processing operation of the control unit employed in the third ATM switch circuit of FIG. 30. FIG. 37 is an explanatory diagram for explaining a move of a pointer by a processing operation of the control unit employed in the third ATM switch circuit of FIG. 30. FIG. 38 is an explanatory diagram for explaining a move of a pointer by a processing operation of the control unit employed in the third ATM switch circuit of FIG. 30. FIG. 39 is a flow chart for explaining a cell output processing operation by the control unit employed in the third ATM switch circuit of FIG. 30. FIG. 40 is an explanatory diagram for describing a move of the pointer by a processing operation of the control unit employed in the third ATM switch circuit of FIG. 30. FIG. 41 is an explanatory diagram for describing a move of the pointer by a processing operation of the control unit employed in the third ATM switch circuit of FIG. 30. FIG. 42 is an explanatory diagram for describing a move of the pointer by a processing operation of the control unit employed in the third ATM switch circuit of FIG. 30. FIG. 43 is an explanatory diagram for describing a move of the pointer by a processing operation of the control unit employed in the third ATM switch circuit of FIG. 30.

Arrangement of Third ATM Switch Circuit

As indicated in FIG. 30, this third ATM (Asynchronous Transfer Mode) switch circuit is arranged by a multiplexing unit 1, a cell buffer memory 21, a separating unit 3, a write control unit 4, a read control unit 5, a control unit 22, a page storage memory 13, and an address storage memory 23. It should be understood that the same reference numerals shown in FIG. 1 and FIG. 15 will be employed as those for indicating the same, or similar circuit elements of FIG. 30, and therefore, detailed descriptions thereof are omitted.

The cell buffer memory 21 stores thereinto an ATM cell. As represented in FIG. 31, the cell buffer memory 21 is used to store cells "CE" into a storage area, and "L" pieces of storage areas are grouped to be handled as a logic page. That is to say, in the cell buffer memory 21, a page number "1" owns storage areas indicated by offset values of "0" to "L−1". Similarly, page numbers "2", - - - , "M" each own storage areas indicated by offset values of "0" to "L−1".

Then, each cell "CE" is specified based on both the above-described page number and the above-explained offset value.

As indicated in FIG. 32, page chains $BPC_1$, $BPC_2$, - - - , $BPC_N$ are formed based on the next page numbers "PG" stored in the page storage memory 13 in correspondence with the output ports $3_1$, $3_2$, - - - , $3_N$ in the cell buffer memory 21.

Similarly, free pages made of unused areas into which no cell is stored within the cell buffer memory 21 are sequentially chained to each other by way of the next page number PG of the page storage memory 13 so as to be formed as a logical chain structure. As a consequence, a free page chain BFPC is formed.

As indicated in FIG. 33, the address storage memory 23 is equipped with a chain presence/absence storage unit 23A, a write address storage unit 23B, and a read address storage unit 23C. Furthermore, this write address storage unit 23B is equipped with a page number storage unit 23D, and an offset value storage unit 23E. The read address storage unit 23C is equipped with a page number storage unit 23F and an offset value storage unit 23G.

Into the chain presence/absence storage unit 23A, presence/absence data of "$E_1$", "$E_2$", - - - , "$E_N$" and "EF" are stored. These presence/absence data of "$E_1$", "$E_2$", - - - , "$E_N$" show whether or not the page chains $BPC_1$, $BPC_2$, - - - , $BPC_N$ are present. These page chains $BPC_1$, $BPC_2$, - - - $BPC_N$ are provided in correspondence with the output ports $3_1$, $3_2$, - - - $3_N$. Similarly, into the chain presence/absence storage unit 23A, presence/absence data of "EF" is stored which indicates as to whether or not the free page chain BFPC is present.

A page number "$WAP_1$" of a write address "$WA_1$" of the page chain $BPC_1$ is stored into the page number storage unit 23D. When a page number of the write address $WA_1$ is equal to $WP_1$, an offset value $WAO_1$ of the page number $WAP_1$ is stored into the offset value storage unit 23E. The offset value "$WAO_1$" designates a storage area within a page designated by the page number "$WAP_1$".

Similarly, page numbers "$WAP_2$", - - - , "$WAP_N$" of write addresses "$WA_2$", - - - , "$WA_N$" of the page chains $BPC_2$, - - - , $BPC_N$ are stored into the page number storage unit 23D, whereas offset values "$WAO_2$", - - - , "$WAO_N$" of page numbers "$WAP_2$", - - - , "$WAP_N$" are stored into the offset value storage unit 23E. Also, a write address of the free page chain BFPC is stored as a page number "WAPA" into the page number storage unit 23D.

Similarly, page numbers "$RAP_1$", "$RAP_2$", - - - , "$RAP_N$" of read addresses "$RA_1$", "$RA_2$", - - - , "$RA_N$" of the page chains $BPC_1$, $BPC_2$, - - - , $BPC_N$ are stored into the page number storage unit 23F, whereas offset values "$RAO_1$", "$RAO_2$", - - - , "$RAO_N$" of page numbers "$RAP_1$", "$RAP_2$", - - - , "$RAP_N$" are stored into the offset value storage unit 23G. Also, a read address of the free page chain BFPC is stored as a page number "RAPF" into the page number storage unit 23F.

Writing Operation in Second ATM Switching Circuit

Upon receipt of a storage request issued from the write control unit 4, the control unit 22 executes a process operation shown in a flow chart of FIG. 34. It is now assumed that an ATM cell outputted from the multiplexing unit 1 is sent to the output $3_k$. The control unit 22 transmits a port signal "c3-1" and an access instruction signal "c4-1" to the address storage memory 23. The port signal c3-1 indicates a page chain $BPC_k$ corresponding to the output port $3_k$, and the access instruction signal c4-1 indicates reading operations with respect to the chain presence/absence storage unit 23A and the offset value storage unit 23E. Thereafter, upon receipt of presence/absence data "$E_k$" and an offset value "$WAO_k$" from the address storage memory 23, the control unit 22 judges as to whether or not the data $E_k$ is equal to a value of "1" and the offset value $WAO_k$ is equal to a value of "L−1" (step S61). That is to say, the process operation defined at the step S61 is to check as to whether or not an empty storage area is present in a page pointed out by a write address "$WA_k$" when the page chain $BPC_k$ is present.

In the case that the control unit 22 judges at this step S61 that the page chain $BPC_k$ is not present, or the offset value $WAO_k$ is equal to the value of "L−1", this control unit 22 judges as to whether or not the presence/absence data EF of the free page chain BFPC is equal to the value of "0" (step S62). If the control unit 22 judges at the step S62 that the free page chain BFPC is present, then this control unit 22 judges as to the presence/absence data $E_k$ of the page chain. $BPC_k$ is equal to "0" (step S63).

When it is so judged at the step S63 that the page chain $BPC_k$ is present, the control unit 22 executes:

a process operation of $PG(WAP_k) \leftarrow RAPF$ (step S64).

As indicated in FIG. 35, the process operation defined at this step S64 is carried out in such a manner that a page pointed by the page number RAPF of the free page chain BFPC may be pointed out by a next page number "PG" of a last page of the page chain "$BPC_k$". The above-described last page corresponds to such a page pointed by a write address "$WA_k$". To execute the process operation defined at the step S64, the control unit 22 transmits both a port signal "c3-2" and an access instruction signal "c4-2" to the address storage memory 23. The port signal c3-2 indicates the free page chain BFPC, and the access instruction signal c4-2 indicates the reading operation from the page number storage unit 23C. As a result, when the page number RAPF is received from the address storage memory 23, the control unit 22 sends both the port signal c3-1 and an access instruction signal "c4-3" to the address storage memory 23. The port signal c3-1 shows the page chain $BPC_k$, and the access instruction signal c4-3 represents a reading operation from the page number storage unit 23D. Thereafter, when the page number $WAP_k$ of the page chain $PBC_k$ is received from the address storage memory 23, the control unit 22 sets the page number $WAP_k$ as a page signal b5. Thereafter, the control unit 22 sends both this page signal b5 and another access instruction signal b6 indicative of a writing operation to the page storage memory 13.

Also, the control unit 22 transmits the page number RAPF as write data to the page storage memory 13. Accordingly, the page number RAPF is stored as the next page number PG into such a storage area corresponding to the page number $WAP_k$ of the page storage memory 13. As a result, such a page pointed by the page number RAPF of the free page chain BFPC may be pointed out by the next page number PG of the page pointed by the write address $WA_k$.

When the process operation defined at the step S64 is accomplished, the control unit 22 executes:

a process operation of:
$WAP_k \leftarrow RAPF$,
and $WAO_k \leftarrow 0$ (step S65).

The process operation defined at the step S65 is carried out in, such a manner that, as shown in FIG. 36, such a page pointed by the page number RAPF may be pointed out by the page number $WAP_k$ and also the offset value $WAO_k$ of the write address $WA_k$ is set to a value of "0".

To execute the process operation defined at the step S65, the control unit 22 transmits both the port signal c3-2 and the access instruction signal "c4-2" to the address storage memory 23. The port signal c3-2 indicates the free page chain BFPC, and the access instruction signal c4-2 indicates the reading operation from the page number storage unit 23F. As a consequence, upon receipt of the page number RAPF from the address storage memory 23, the control unit 22 sends both the port signal c3-1 indicative of the page chain $BPC_k$, and an access instruction "c4-4" to the address storage memory 23. This access instruction c4 indicates a writing operation with respect to the page number storage unit 23D. Also, the control unit 22 sends the page number RAPF as write data to the address storage memory 23. Accordingly, the page number RAPF is stored as the page number $WAP_k$.

Thereafter, the control unit 22 sends both the port signal c3-1 and an access instruction signal "c4-5" to the address storage memory 23. The port signal c3-1 shows the page chain $BPC_k$, and the access instruction signal c4-5 represents a writing operation with respect to the offset value storage unit 23E. Also, the control unit 22 transmits a value of "0" as write data to the address storage memory 23.

Accordingly, the value of "0" is stored as the offset value $WAO_k$ of the read address $WA_k$. As a result, such a page pointed by the page number RAPF may be pointed out by the page number $WAP_k$.

In such a case that the page chain $BPC_k$ is not present at the step S63, the control unit 22 executes:

such a process operation of;
$RAP_k \leftarrow RAPF$, $RAO_k \leftarrow 0$,
$WAP_k \leftarrow RAPF$, $WAO_k \leftarrow 0$,
$E_k \leftarrow 1$ (step S66).

The process operation defined at the step S66 is carried out in such a manner that an unused area pointed by the page number RAPF of the free page chain BFPC may be pointed out by both the page number $RAP_k$ of the read address $RA_k$ of the page chain $BPC_k$ and the page number $WAP_k$ of the write address $WA_k$. As a consequence, the control unit 22 newly forms a page chain "$BPC_k$" corresponding to the output port $3_k$. Then, the control unit 22 sets the presence/absence data "$E_k$" of the address storage memory 23 to "1".

To execute the process operation defined at the step S66, the control unit 22 transmits both the port signal c3-1 indicative of the page chain $BPC_k$, and also an access instruction signal "c4-6" to the address storage memory 23. This access instruction signal c4-6 indicates a writing operation with respect to the offset value storage units 23E and 23G. Also, the control unit 22 sends "0" as write data to the address storage memory 23. As a result the value of "0" is stored into this address storage memory 23 as an offset value $WAO_k$ and an offset value $RAO_k$.

Thereafter, the control unit 22 transmits both the port signal c3-2 indicative of the free page chain BFPC and the access instruction signal c4-2 to the address storage memory 23. This access instruction signal c4-2 represents a reading operation from the page number storage unit 23F. Upon receipt of the page number RAPF from the address storage memory 23, as a result, the control unit 22 transmits both the port signal c3-1 indicative of the page chain $BPC_k$ and an access instruction signal "c4-7" to the address storage memory 23. This access instruction signal c4-7 indicates a writing operation with respect to the page number storage units 23D and 23F. Also, the control unit 22 sends the page number RAPF as write data to the address storage memory 23. As a result, the read address RAPF is stored into this address storage memory 23 as a page number $RAP_k$ of the read address $RA_k$ and a page number $WAP_k$ of the write address $WA_k$.

Thereafter, the control unit 22 transmits both the port signal c3-1 indicative of the page chain $BPC_k$ and an access instruction signal "c4-8" to the address storage memory 23. This access instruction signal c4-8 represents a writing operation with respect to the chain presence/absence storage unit 23A. Also, the control unit 22 sends a value of "1" as write data to the address storage memory 23. As a consequence, the value of "1" is stored as the presence/absence data "$E_k$". Accordingly, an unused area pointed by the page number RAPF of the free page chain BFPC may be pointed out by the page number $RAP_k$ of the read address $RA_k$ of the page chain $BPC_k$ and the page number $WAP_k$ of the write address $WA_k$.

When the process operation defined at either the step S65 or the step S66 is accomplished, the control unit 22 judges as to whether or not the page number WAPF of the free page chain BFPC is identical to the page number RAPF (step S67). To execute the process operation defined at the step S67, the control unit 22 transmits both the port signal c3-2 indicative of the free page chain BFPC, and also an access instruction signal "c4-9" to the address storage memory 23. This access instruction signal c4-9 indicates a reading operation from the page number storage units 23D and 23F. As a consequence, upon receipt of the page numbers "WAPF" and "RAPF" of the free page chain BFPC from the address storage memory 23, the control unit 22 executes the above-described judgement.

In such a case that the process operation defined at the step S67 is accomplished, the control unit 22 executes:
a process operation of;
RAPF←PG(RAPF) (step S68).
As illustrated in FIG. 37, the process operation defined at the step S68 is carried out in this manner that such a page pointed by a next page number PG of the free page chain BFPC may be pointed out by the page number RAPF of the free page chain BFPC. As a consequence, the control unit 22 moves the page number RAPF to a new head page of the free page chain BFPC.

To perform the process operation defined at the step S68, the control unit 22 transmits both the port signal c3-2 indicative of the free page chain BFPC, and the access instruction signal c4-2 to the address storage memory 23. This access instruction signal c4-2 indicates a reading operation from the page number storage unit 23F. As a result, upon receipt of the page number RAPF from the address storage memory 23, the control unit 22 sets this page number RAPF as a page signal b5. Thereafter, the control unit 22 transmits both the page signal b5 and an access instruction signal b6 indicative of a reading operation to the page storage memory 13. As a consequence, when the next page number PG is received from the page storage memory 13, the control unit 22 transmits both the port signal c3-2 indicative of the free page chain BFPC and an access instruction signal "c4-10" representative of a writing operation with respect to the page number storage unit 23F to the address storage memory 23. Also, the control unit 22 sends the next page number PG as write data to the address storage memory 23. As a consequence, the next page number PG is stored as the page number RAPF in this address storage memory 23. As a result, such a page pointed by the next page number PG of the free page chain BFPC may be pointed out by the page number RAPF of the free page chain BFPC.

In the case that the page number WAPF of the free page chain BFPC is identical to the page number RAPF at the previous step S67, the control unit 22 sets the presence/absence data EF of the free page chain BFPC as a value of "0" (step S69). The execution of this process operation indicates such a fact that the free page chain BFPC is not present. Furthermore, in the case that the page chain $BPC_k$ is present, and also the offset value $WAO_k$ is different from the value "L−1" at the previous step S61, the control unit 22 adds 1 to the value of the offset value $WAO_k$ (step S70).

To execute the process operation defined at the step S70, the control unit 22 transmits both the port signal c3-1 and an access instruction signal "c4-11" to the address storage memory 23. As a result, when the offset value $WAO_k$ is received from the address storage memory 23, the control unit 22 performs a calculation of adding the value of "1" to the offset value $WAO_k$. Thereafter, the control unit 22 sends both the port signal c3-1 and thean access instruction signal "c4-5" to the address storage memory 23. The port signal c3-1 shows the page chain $BPC_k$, and the access instruction signal c4-5 represents a writing operation with respect to the offset value storage unit 23E. Also, the control unit 22 sends a value of "$WAO_k+1$" as write data to the address storage memory 23. As a consequence, this value of "$WAO_k+1$" is stored as the offset value "$WAO_k$".

When the process operation defined at the step S68, the step S69, or the step S70 is accomplished, the control unit 22 executes:
a process operation of cell($WA_k$)←input cell (step S71).
This process operation defined at the step S71 is carried out as follows: That is, as indicated in FIG. 38, the control unit 22 controls cell to be stored into an unused area pointed by the write address "$WA_k$".

To perform the process operation defined at the step S71, the control unit 22 transmits both the port signal c3-1 indicative of the page chain $BPC_k$, and an access instruction signal "c4-12" to the address storage memory 23. This access instruction signal c4-12 indicates a reading operation from the page number storage unit 23D and the offset value storage unit 23E. As a result, the write address $WA_k$ constructed of the page number $WAP_k$ and the offset value $WAO_k$ from the address storage memory 23 is received. The control unit 22 sets this write address $WA_k$ as an address signal c1. Thereafter, the control unit 22 transmits both an address signal c1 and an access instruction signal c2 indicative of a writing operation to the cell buffer memory 21. As a result, the cell is stored into an unused area pointed by this write address $WA_k$ in the cell buffer memory 21.

On the other hand, when the free page chain BPFC is not present at the previous step S62, the control unit 22 controls the cell buffer memory 21 to discard the input cell (step S72), and then accomplishes the process operation shown in FIG. 34.

Cell Output Control in Second ATM Switch Circuit

On the other hand, when the output port $3_k$ and an output instruction of a cell are received from the read control unit 5, the control unit 22 commences a process operation defined by a flow chart shown in FIG. 39. In other words, upon receipt of both the output port $3_k$ and the output instruction, the control unit 22 controls to output a cell (step S81). The process operation defined at this step S81 is carried out in such a manner that, as indicated in FIG. 40, since the page chain $BPC_k$ corresponds to the output port $3_k$, such a cell "CE" pointed out by the read pointer $RA_k$ of the page chain $BPC_k$ is outputted.

To execute a process operation defined at the step S81, the control unit 22 transmits both the port signal c3-1 and an access instruction signal "c4-13" to the address storage memory 23. This port signal c3 indicates the page chain $PC_k$, and the access instruction signal c4-13 indicates the reading operations from the page number storage unit 23F and the offset storage unit 23G. As a result, upon receipt of the read address "$RA_k$" from the address storage memory 23, the control unit 22 sets the read address "$RA_k$" as an address signal.

Cell Output Control in Third ATM Switch Circuit

On the other hand, when the output port $3_k$ and an output instruction of a cell are received from the read control unit 5, the control unit 22 commences a process operation defined by a flow chart shown in FIG. 39. In other words, upon receipt of both the output port $3_k$ and the output instruction, the control unit 22 controls to output an ATM (step S81). The process operation defined at this step S81 is carried out in such a manner that, as indicated in FIG. 40, since the page chain $BPC_k$ corresponds to the output port $3_k$, such a cell "CE" pointed out by the read address $RA_k$ of the page chain $BPC_k$ is outputted.

To execute a process operation defined at the step S81, the control unit 22 transmits both the port signal c3-1 and the access instruction signal "c4-13" to the address storage memory 23. This port signal c3-1 indicates the page chain $PC_k$, and the access instruction signal c4 indicates the reading operations from the page number storage unit 23F and the offset storage unit 23G. As a result, upon receipt of the read address "$RA_k$" from the address storage memory 23, the control unit 22 sets the read address "$RA_k$" as an address signal c1. This read address $RA_k$ is constructed of the page number $RAP_k$ and the offset value $RAO_k$. Thereafter, the control unit 22 transmits both this address signal c1 and also an access instruction signal c2 indicative of a writing operation to the cell buffer memory 21. As a consequence, an ATM is read out from a storage area in the cell buffer memory 21 and the read ATM cell is supplied to the separating unit 3. This storage area is specified by the page number $RAP_k$ and the offset value $RAO_k$.

When the process operation defined at the step S81 is accomplished, the control unit 22 checks as to whether or not the write address $WA_k$ of the page chain $BPC_k$ is different from the read address $RA_k$, and furthermore, the offset value $RAO_k$ is different from the value "L−1" (step S82).

To execute a process operation defined at the step S82, the control unit 22 sends both the port signal c3-1 representative of the page chain $BPC_k$, and an access instruction signal "c4-14" to the address storage memory 23. This access instruction signal c4-14 represents reading operations from the page number storage units 23E, 23G, and the offset value storage units 23E, 23G. Thereafter, both a write address $WA_k$ and a read address $RA_k$ are received from the address storage memory 23. The write address $WA_k$ is arranged by a page number "$WAP_k$" and an offset value "$WAO_k$", whereas the read address "$RA_k$" is arranged by a page number "$RAP_k$" and an offset value "$RAO_k$".

In the case that the control unit 23 judges at the step S82 that either the write address $WA_k$ is equal to the read address $RA_k$ or the offset value $RAO_k$ is equal to the value "L−1", the control unit 22 judges that the presence/absence data EF of the free page chain BFPC is equal to the value of "0" (step S83). To execute this judgement, the control unit 22 sends both the port signal c3-2 indicative of the free page chain BFPC and an access instruction signal c4-15 to the address storage memory 23. This access instruction signal c4-15 represents a reading operation from the chain presence/absence storage unit 23A. Thereafter, when the presence/absence data EF is received from the address storage memory 23, the control unit 22 performs the above-described judgement.

When the control unit 22 judges that the free page chain BFPC is present at this step S83, this control unit 22 executes:

a process operation of
PG(WAPF)←$RAP_k$ (step S84).

The process operation defined at the step S84 is carried out, as shown in FIG. 41. That is, a page pointed by the page number $RAP_k$ may be designated by the next page number PG. The next page number PG corresponds to such a page subsequent to the page designated by the page number WAPF of the free page chain BFPC.

To execute the process operation defined at the step S84, the control unit 22 transmits both the port signal c3-1 and the access instruction signal c4-2 to the address storage memory 23. The port signal c3-1 indicates the page chain $BPC_k$, and the access instruction signal c4-2 indicates the reading operation from the page number storage unit 23F. Thereafter, when the page number $RAP_k$ is received from the address storage memory 23, the control unit 22 sends both the port signal c3-2 and the access instruction signal c4-3 to the address storage memory 23. The port signal c3-2 shows the free page chain BFPC, and the access instruction signal c4-3 represents a reading operation from the page number storage unit 23D. Thereafter, when the page number WAPF is received from the address storage memory 23, the control unit 22 sets the page number WAPF as a page signal b5. Thereafter, the control unit 22 sends this page signal b5 and another access instruction signal b6 indicative of a writing operation to the page storage memory 13. Also, the control unit 22 transmits the page number $RAP_k$ as write data to the page storage memory 13. Accordingly, the value of "$RAP_k$" is stored as the next page number PG into such a storage area corresponding to the page number WAPF of the page storage memory 13. As a result, such a page pointed by the page number $RAP_k$ may be pointed out by the next page number PG.

When the process operation defined at the step S84 is accomplished, the control unit 22 executes:

a process operation of:
WAPF←$RAP_k$ (step S85)

The process operation defined at the step S85 is carried out, as illustrated in FIG. 42. That is, a page designated by the page number $RAP_k$ may be pointed by the page number WAPF.

To execute the process operation defined at the step S85, the control unit 22 transmits both the port signal c3-1 and the access instruction signal c4-2 to the address storage memory 23. The port signal c3-1 indicates the page chain $BPC_k$, and the access instruction signal c4-2 indicates the reading operation from the page number storage unit 23F. As a result, when the page number $RAP_k$ is received from the address storage memory 23, the control unit 22 sends both the port signal c3-2 and the access instruction signal c4-4 to the address storage memory 23. The port signal c3-2 shows the free page chain BFPC, and the access instruction signal c4-4 represents a writing operation with respect to the page number storage unit 23D. Also, the control unit 22 transmits the value of $RAP_k$ as write data to the address storage memory 23. Accordingly, the value of $RAP_k$ is stored as the page number WAPF. As a result, such a page pointed by the page number $RAP_k$ may be pointed out by the page number WAPF.

Conversely, when the free page chain BFPC is not present at the previous step S83, the control unit 23 executes:
a process operation of:
RAPF←RAP$_k$,
WAPF←RAP$_k$, and
EF←1 (step S86).

The process operation defined at the step S86 is carried out as follows: That is, a page designated by the page number RAP$_k$ of the page chain BPC$_k$ may be pointed by the page number WAPF, and also the page number RAPF of the free page chain BFPC. As a consequence, the control unit 22 newly produces a free page chain BFPC. Then, the control unit 22 sets the presence/absence data EF of the address storage memory 23 to "1".

To execute the process operation defined at the step S86, the control unit 22 transmits both the port signal c3-1 and the access instruction signal c4-2 to the address storage memory 23. The port signal c3-1 indicates the page chain BPC$_k$, and the access instruction signal c4-2 indicates the reading operation from the page number storage unit 233F. As a result, when the page number RAP$_k$ is received from the address storage memory 23, the control unit 22 sends both the port signal c3-2 and the access instruction signal c4-7 to the address storage memory 23. The port signal c3-2 shows the free page chain BFPC, and the access instruction signal c4-7 represents a writing operation with respect to the page number storage units 23D and 23F. Also, the control unit 22 transmits the value of RAP$_k$ as write data to the address storage memory 23. Accordingly, the value of RAP$_k$ is stored as the page number WAPF and the page number RAPF. Thereafter, the control unit 22 transmits both the port signal c3-2 indicative of the free page chain BFPC, and the access instruction signal c4-8 to the address storage memory 23. This access instruction signal c4-8 indicates the writing operation with respect to the chain presence/absence storage unit 23A. The control unit 22 transmits the value of "1" as write data to the address storage memory 23. As a result, the value of "1" is stored as the presence/absence data EF. As a result, a free page chain BFPC is newly formed.

When the process operation defined at either the step S85 or the step S86 is accomplished, the control unit 22 judges as to whether or not the write address WA$_k$ of the page chain BPC$_k$ is identical to the read address RA$_k$ (step S87).

When the control unit 22 judges that the write address WA$_k$ is different from the read address RA$_k$, the control unit 22 executes:
a process operation of;
RAP$_k$←PG(RAP$_k$), and
RAO$_k$←0 (step S88).

As illustrated in FIG. 43, the process operation defined at the step S88 is carried out in this manner that such a page pointed by a next page number PG of a head page of the page chain BPC$_k$ may be pointed out by the page number RAP$_k$ of the read address RA$_k$, and furthermore, the offset value RAO$_k$ is set to the value of "0".

To perform the process operation defined at the step S88, the control unit 22 transmits both the port signal c3-1 indicative of the page chain BPC$_k$, and the access instruction signal c4-2 to the address storage memory 23. This access instruction signal c4-2 indicates the reading operation from the page number storage unit 23F. As a result, upon receipt of the page number RAP$_k$ from the address storage memory 23, the control unit 22 sets this page number RAP$_k$ as a page signal b5. Thereafter, the control unit 22 transmits both the page signal b5 and the access instruction signal b6 indicative of the reading operation to the page storage memory 13. As a consequence, when the next page number PG is received from the page storage memory 13, the control unit 22 transmits both the port signal c3-1 indicative of the page chain PC$_k$ and the access instruction signal c4-10 representative of the writing operation with respect to the page number storage unit 23F to the address storage memory 23. Also, the control unit 22 sends the page number PG as write data to the address storage memory 23. As a consequence, the next page number PG is stored as the page number RAP$_k$ in this address storage memory 23.

Thereafter, the control unit 22 sends both the port signal c3-1 indicative of the page chain BPC$_k$, and an access instruction signal "c4-16" indicative of the writing operation with respect to the offset value storage unit 23G to the address storage memory 23. Also, the control unit 22 sends the value of "0" as write data. As a result, the value of "0" is stored as the offset value RAO$_k$ into the address storage memory 23. Then, the process operation defined at the step S88 is ended.

On the other hand, when the control unit 22 judges at the step S87 that the write address WA$_k$ is identical to the read address RA$_k$, this control unit 22 sets the presence/absence data E$_k$ of the page chain BPC$_k$ to a value of "0" (step S89).

Furthermore, in such a case that the write address WA$_k$ of the page chain BPC$_k$ is different from the read address RA$_k$ and also the offset value RAO$_k$ is different from the value "L−1" at the step S82, the control unit 22 adds a value of "1" of the offset value RAO$_k$ (step S90).

To perform the process operation defined at the step S90, the control unit 22 transmits the port signal c3-1 indicative of the page chain BPC$_k$ and an access instruction signal "c4-17" indicative of the reading operation from the offset value storage unit 23G to the address storage memory 23. As a consequence, upon receipt of the offset value RAO$_k$ from the address storage memory 23, the control unit 22 adds the value of "1" to this offset value RAO$_k$. Subsequently, the control unit 22 sends both the port signal c3-1 indicative of the page chain BPC$_k$ and the access instruction signal c4-16 indicative of the writing operation with respect to the offset value storage unit 23G to the address storage memory 23. Also, the control unit 22 sends another value of "RAO$_k$+1" as write data to the address storage memory 23. As a consequence, this value of "WAO$_k$+1" is stored as the offset value RAO$_k$, and then the process operation defined at the step S90 is ended.

Overall Operation in Third ATM Switching Circuit

Now, a description is made of an overall operation executed in the third ATM switching circuit of FIG. 30.

ATM cells which are entered into the input ports $1_1$, $1_2$, - - -, $1_N$ are multiplexed by the multiplexing unit 1, and then the multiplexed ATM cell is supplied to the cell buffer memory 21. When this multiplexed cell is outputted, the write control unit 4 checks a destination of this multiplexed cell. When the destination of this multiplexed ATM cell is the output port $3_k$, the write control unit 4 both the port signal indicative of this output port $3_k$ and also the storage request of this multiplexed ATM cell to the control unit 22.

When the control unit 22 receives the above-described storage request, if the control unit 22 judges at the steps S61 and S70 that the page chain BPC$_k$ corresponding to the output port $3_k$ is present and also the offset value WAO$_k$ of this write address WA$_k$ is different from the value L−1, then this control unit 22 adds the value of "1" to the present offset value WAO$_k$, and moves the storage area indicated by the write address WA$_k$ by 1, so that the write address WA$_k$ points out the unused area. Then, at the step S71, the control unit 22 controls the cell buffer memory 21 to store the ATM cell derived from the multiplexing unit 1 into the unused area pointed out by the write address $WA_k$.

Also, if the above-described storage request is received and at the step S61, either the page chain $BPC_k$ is not present or the offset value $WAO_k$ of the write address $WA_k$ is equal to the value of "L–1", the control unit 22 judges that the unused area is not present in the page pointed out by the write address $WA_k$. Thereafter, when the free page chain BFPC is not present at the step S62, the control unit 22 controls the cell buffer memory 21 to discard the ATM cell derived from the multiplexing unit 1 at the step S73, while this control unit 22 judges that there is no unused area for storing thereinto a new ATM cell.

When the free page chain BFPC is present at the step S62, and also the page chain $BPC_k$ is present at the step S63, the control unit 22 connects the head portion of the free page chain BFPC to the last portion of the page chain $BPC_k$ at the steps S64 and S65, so that an unused area for storing thereinto the cell is secured in the page chain $BPC_k$. Thereafter, the control unit 22 controls such an operation that the read address "$RA_k$" points out a last portion of the page chain $BPC_k$. Conversely, when the page chain $BPC_k$ is not present at the step S63, the control unit 22 newly produces a page chain $BPC_k$ so as to secure an unused area for storing thereinto the cell at the step S66.

When securing of the unused area is accomplished, if the page number WAPF of the free page chain BFPC is different from the page number RAPF at the step S67, then the control unit 22 judges that the free page chain BFPC is still present. Thus, the control unit 22 moves the page number RAPF to a new head page of the free page chain BFPC. Conversely, when the page number WAPF of the free page chain BFPC is identical to the page number RAPF at the step S67, the control unit 22 judges that the free page chain BFPC is not present at the step S69.

Thereafter, at the step S71, the control unit 22 controls the cell buffer memory 21 to store the ATM cell derived from the multiplexing unit 1 into the unused area pointed out by the write address $WA_k$.

On the other hand, when the ATM cell is outputted to the output port $3_k$, the read control unit 5 sends both the output port $3_k$ and the output instruction of the ATM cell to the control unit 22. As a result, the control unit 22 receives the read address $RA_k$ from the address storage memory 23 at the step S81. Thereafter, the control unit 22 controls the cell buffer memory 21 so as to output such an ATM cell of the storage area pointed by the read address $RA_k$ to the separating unit 3. As a consequence, the cell buffer memory 21 reads the ATM cell from the designated storage area, and then sends this read cell to the separating unit 3. The separating unit 3 transmits the received ATM cell to the output port $3_k$.

When the ATM cell is outputted from the cell buffer memory 21, if either the write address $WA_k$ of the page chain $BPC_k$ is different from the read address $RA_k$, and the offset value $RAO_k$ of the read address $RA_k$ is different from the value "L–1" at the steps S82 and S90, then the control unit 22 adds the value of "1" to the present offset value $RAO_k$, and moves the storage area pointed by the read address $RA_k$ by 1. As a consequence, the read address $RA_k$ points out the next buffer address.

When the write address $WA_k$ of the page chain $BPC_k$ is identical to the read address $RA_k$, or the offset value $RAO_k$ of the read address $RA_k$ is identical to the value "L–1" at the step S82, then the control unit 22 may judge that the ATM cell is not present in the page designated by the read address $RA_k$. Thereafter, when the free page chain BFPC is present at the step S83, the control unit 22 connects the page designated by the read address $RA_k$ to the last portion of the free page chain FPC designated by the read $RA_k$ at the steps S84 and S85, and then assembles this page into the free page chain BFPC. Also, at the step S83, when there is no free page chain BFPC, the control unit 22 newly produces a free page chain BFPC at the step S86.

In the case that the control unit 22 accomplishes assembling of the page pointed by the write address $WA_k$ into the free page chain BFPC, and also the write address $WA_k$ is different from the read address $RA_k$ at the step S87, the control unit 22 judges that the page chain $BPC_k$ is present, and then executes the process operation defined at the step S88. As a result, the read address $RA_k$ may point out the head page of the page chain $BPC_k$. Also, at the step S87, when the write address $WA_k$ is identical to the read address, the control unit 22 judges that the page chain $BPC_k$ is not present, and thereafter accomplishes the overall process operation.

As previously explained, in accordance with the above-described circuit arrangement of the ATM switch circuit according to this third embodiment, the empty address management memory 9 and the address storage memory 14 can be omitted, although these memories are required in the ATM switch circuit according to the second embodiment. As a consequence, the entire memory capacity can be reduced.

While the ATM switch circuit according to the first to third embodiments have been described in detail with reference to the drawings, the present invention is not limited thereto, but may be modified without departing from the technical scope and spirit of the present invention. For instance, the first to third ATM switch circuits employ the individual memories. Alternatively, only a single memory may be employed which may own various necessary memory functions.

As previously described in detail, the present invention can achieve the following advantages. That is, since both the buffer address used when the ATM cell is stored into the cell buffer memory, and the cells to be stored are managed by way of the chain structures, the memory functioning as the buffer address managing means can be commonly used, or shared by all of the output ports.

As a consequence, it is possible to avoid increasing of the total number of the above-described memories, which is caused when the total number of the above-explained output ports is increased. Furthermore, it is possible to avoid lowering of the memory use efficiencies.

It is thus apparent that the present invention is not limited to the above embodiments but may be changed and modified without departing from the scope and spirit of the invention.

Finally, the present application claims the priority of Japanese Patent Application No. Hei 10-038229 filed on Feb. 20, 1998.

What is claimed is:

1. An ATM (Asynchronous Transfer Mode) switch circuit comprising:

an ATM cell buffer memory for storing thereinto an ATM cell inputted to said ATM switch circuit; and ATM cell managing means for issuing both a storage request for said ATM cell and destination information indicative of one of a plurality of output ports corresponding to a destination of said ATM cell, and also for issuing both an output request and the destination information when said ATM cell is outputted to said one of said plurality of output ports, wherein said ATM cell is written into said ATM cell buffer memory based upon a buffer address defined by said storage request; said ATM cell is read out from said ATM cell buffer memory based on another buffer address defined by said output request to thereby be transmitted to said ATM cell managing means; and upon receipt of said ATM cell, said ATM cell managing means transmits said ATM cell to said one of said output ports in accordance with said destination information, said ATM switch circuit further comprising:
  empty address managing means for managing an empty address of said ATM cell buffer memory, and for outputting the empty address as a buffer address to said ATM cell buffer memory upon receipt of said storage request for said ATM cell issued from said ATM cell managing means, said empty address managing means outputting a plurality of buffer addresses corresponding to a plurality of ATM cells to be stored in said ATM cell buffer memory; and
  buffer address managing means for sequentially chaining said plurality of buffer addresses output by said empty address managing means to each other when said buffer address managing means receives the storage requests issued from said ATM cell managing means and the plurality of buffer addresses output from said empty address managing means, whereby buffer addresses of ATM cells directed to a same output port of said plurality of output ports are formed in a chain structure; and when the output request and the destination information issued from said ATM cell managing means are received, said buffer address managing means reads out the corresponding buffer address from said chain structure corresponding to said destination information to thereby transmit the corresponding buffer address to both said ATM cell buffer memory and said empty address managing means.

2. An ATM switch circuit according to claim 1 wherein:
said buffer address managing means includes:
  a buffer address storage unit for receiving one buffer address from said empty address managing means to thereby chain said received buffer address to a succeeding buffer address, whereby the buffer addresses directed to the said output port are formed in the chain structure;
  a pointer storage unit for storing thereinto both a write pointer and a read pointer with respect to the chain structure, said write pointer pointing out a latest buffer address located at a last portion of the chain structure of said buffer address storage unit, and said read pointer pointing out a buffer address located at a head portion of the chain structure; and
  a control unit for controlling said pointer storage unit to read a write pointer corresponding to said destination information and also for storing the buffer address derived from said empty address managing means into a storage area subsequent to storage areas on the output port pointed by said write pointer upon receipt of the storage request and the destination information issued from said cell managing means; and for reading a read pointer from said pointer storage unit upon receipt of the output request and the destination information issued from said cell managing means, whereby a buffer address indicative of said read pointer is transmitted to said cell buffer memory and said empty address managing means.

3. An ATM (Asynchronous Transfer Mode) switch circuit comprising:
  an ATM cell buffer memory for storing thereinto an ATM cell inputted to said ATM switch circuit; and
  ATM cell managing means for issuing both a storage request for an ATM cell and destination information indicative of one of a plurality of output ports corresponding to a destination of said ATM cell, and also for issuing both an output request and the destination information when said ATM cell is outputted to said one of said plurality of output ports,
  wherein said ATM cell is written into said ATM cell buffer memory based upon a buffer address defined by said storage request; said ATM cell is read out from said ATM cell buffer memory based on another buffer address defined by said output request to thereby be transmitted to said ATM cell managing means; and upon receipt of said ATM cell, said ATM cell managing means transmits said ATM cell to said one of said plurality of output ports in accordance with said destination information, said ATM switch circuit further comprising:
  empty address managing means for managing an empty address of said ATM cell buffer memory, and for outputting the empty address as a buffer address to said ATM cell buffer memory upon receipt of said storage request for said ATM cell issued from said ATM cell managing means, said empty address managing means outputting a plurality of buffer addresses corresponding to a plurality of ATM cells to be stored in said ATM cell buffer memory; and
  buffer address managing means for managing the plurality of buffer addresses output by said empty address managing means in such a manner that "L (where "L" is an arbitrary natural number)" storage areas capable of storing said plurality of buffer addresses are defined as one page, and a chain structure is formed by chaining a plurality of said pages to each other and is made in correspondence with each of said plurality of output ports; upon receipt of the storage request issued from said ATM cell managing means and also the plurality of buffer addresses output from said empty address managing means, the plurality of buffer addresses are sequentially stored into the storage area corresponding to the plurality of pages chained to each other; and also when the output request and the destination information issued from said ATM cell managing means are received, said buffer address managing means sequentially reads out the corresponding buffer address from the storage area corresponding to the plurality of pages chained to each other, to thereby transmit the corresponding buffer address to both said ATM cell buffer memory and said empty address managing means.

4. An ATM switch circuit according to claim 2 wherein:
said buffer address managing means includes:
  a buffer address storage unit for storing thereinto the buffer address derived from said empty address managing means, while said "L" pieces of storage areas for storing said buffer addresses are defined as one page, by chaining said pages to each other to form chain structures and also by employing the chain structures corresponding to the respective output ports;
  a pointer storage unit for storing thereinto both a write pointer and a read pointer with respect to each of said chain structures, said write pointer pointing out a latest buffer address contained in a page located at a last portion of the chain structure of said buffer address storage unit, and said read pointer pointing out a first buffer address contained in a page located at a head portion of said chain structure; and a control unit for controlling said pointer storage unit to read a write pointer corresponding to said destination information and also for storing the buffer address derived from said empty address managing means into a storage area subsequent to storage areas on the output port pointed by said write pointer upon receipt of the storage request and the destination information issued from said cell managing means; and for reading a read pointer from said pointer storage unit upon receipt of the output request and the destination information issued from said cell managing means, whereby a buffer address indicative of said read pointer is transmitted to said cell buffer memory and said empty address managing means.

5. An ATM switch circuit comprising:

multiplexing means for producing a storage request of an ATM cell inputted to said ATM switch circuit and destination information indicative of one of a plurality of output ports corresponding to a destination of said ATM cell;

separating means for producing an output request and destination information when said ATM cell is outputted to said one of said output ports;

a cell buffer memory for storing thereinto the ATM cell derived from said multiplexing means, wherein "L" (where "L" is an arbitrary natural number) storage areas capable of storing said ATM cells are defined as one page, by chaining pages corresponding to a plurality of said storage areas to each other so as to form a chain structure and also by employing the chain structure corresponding to the respective output ports, and also for reading the ATM cell to send the ATM cell to said separating means; and cell buffer memory control means for providing control for said ATM switch circuit such that the ATM cells derived from said multiplexing means are sequentially stored into the chain structure corresponding to said destination information, and when the storage request and the destination information produced from said multiplexing means are received, a particular storage area of said cell buffer memory is accessed; and also for providing control for said ATM switch circuit such that the ATM cells are sequentially read from the chain structure corresponding to said destination information to thereby transmit the ATM cells to said separating means, and when both the output request and the destination information produced from said separating means are received, the particular storage area of said cell buffer memory is accessed.

6. An ATM switch circuit according to claim 5 wherein:

said cell buffer memory control means includes:

an address storage unit for storing thereinto both a writing buffer address and a reading buffer address, said writing buffer address designating a latest ATM cell contained in a page located at a last portion of the chain structure of said cell buffer memory, and said reading buffer address designating a first ATM cell contained in another page located at a head portion of the chain structure; and a control unit for controlling said cell buffer memory in such a manner that when the storage request and the destination information are received from said multiplexing means, said control unit reads the writing buffer address corresponding to said destination information from said address storage unit so as to control said cell buffer memory based upon said read writing buffer address, whereas when the output request and the destination information are received from said separating means, said control unit reads the reading buffer address from said address storage unit so as to control said cell buffer memory based upon said read reading buffer address.

7. A method for controlling an ATM (Asynchronous Transfer Mode) switch circuit that includes: an ATM cell buffer memory for storing thereinto an ATM cell inputted to said ATM switch circuit; and ATM cell managing means for issuing both a storage request for said ATM cell and destination information indicative of one of a plurality of output ports corresponding to a destination of said ATM cell, and also for issuing both an output request and the destination information when said ATM cell is outputted to said one of said plurality of output ports, wherein said ATM cell is written into said ATM cell buffer memory based upon a buffer address defined by said storage request; said ATM cell is read out from said ATM cell buffer memory based on another buffer address defined by said output request to thereby be transmitted to said ATM cell managing means; and upon receipt of said ATM cell, said ATM cell managing means transmits said ATM cell to said one of said plurality of output ports in accordance with said destination information, said method comprising:

a first step for managing an empty address of said ATM cell buffer memory, and for outputting the empty address as a buffer address to said ATM cell buffer memory upon receipt of said storage request issued from said ATM cell managing means, wherein a plurality of buffer addresses are output corresponding to a plurality of storage areas to store a plurality of ATM cells in said ATM cell buffer memory;

a second step for sequentially chaining said plurality of buffer addresses to each other when receiving the storage requests issued from said ATM cell managing means and the empty address as the buffer address output in said first step, whereby buffer addresses of ATM cells directed to the same output port of said plurality of output ports are formed in a chain structure; and a third step for reading out the corresponding buffer address from said chain structure corresponding to said received destination thereof when the output request and the destination information issued from said ATM cell managing means are received, by which the corresponding buffer address is transmitted to said ATM cell buffer memory, wherein said buffer address read at the third step is managed at the first step.

8. A method for controlling an ATM (Asynchronous Transfer Mode) switch circuit that includes: an ATM cell buffer memory for storing thereinto an ATM cell; and ATM cell managing means for issuing both a storage request for said ATM cell and destination information indicative of one of a plurality of output ports corresponding to a destination of said ATM cell, and also for issuing both an output request and the destination information when said ATM cell is outputted to said one of said plurality of output ports, wherein said ATM cell is written into said ATM cell buffer memory based upon a buffer address defined by said storage request; said ATM cell is read out from said ATM cell buffer memory based on another buffer address defined by said output request to thereby be transmitted to said ATM cell managing means; and upon receipt of said ATM cell, said ATM cell managing means transmits said ATM cell to said one of said output ports in accordance with said destination information, said method comprising:
- a first step for managing an empty address of said ATM cell buffer memory, and for outputting the empty address as a buffer address to said ATM cell buffer memory upon receipt of said storage request issued from said ATM cell managing means, wherein a plurality of buffer addresses are output corresponding to a plurality of storage areas to store a plurality of ATM cells in said ATM cell buffer memory;
- a second step for managing the plurality of buffer addresses output in said first step in such a manner that "L (where "L" is an arbitrary natural number)" storage areas capable of storing said plurality of buffer addresses are defined as one page, a chain structure is formed by chaining a plurality of pages to each other and is made in correspondence with each of said plurality of output ports; upon receipt of the storage request issued from said cell managing means and also the buffer addresses output in said first step, said plurality of buffer addresses are sequentially stored into the storage area corresponding to the plurality of pages chained to each other; and
- a third step for managing the buffer addresses in such a way that when the output request and the destination information issued from said ATM cell managing means are received, said buffer address managing means sequentially reads out the corresponding buffer address from the storage area corresponding to the plurality of pages chained to each other, to thereby transmit the corresponding buffer address to both said ATM cell buffer memory and said empty address managing means; wherein
  said buffer address read at the third step is managed at the first step.

9. A method for controlling an ATM (Asynchronous Transfer Mode) switch circuit, comprising:
- a first step for producing a storage request of an ATM cell input to said ATM switch circuit and destination information indicative of one of a plurality of output ports corresponding to the destination of said ATM cell;
- a second step for producing an output request and destination information when said ATM cell is outputted to said one of said output ports;
- a third step for storing the ATM cell processed at said first step, wherein "L" (where "L" is an arbitrary natural number) storage areas capable of storing said ATM cells are defined as one page, by chaining pages corresponding to a plurality of said storage areas to each other so as to form a chain structure and also by employing the chain structure corresponding to the respective output ports; and
- a fourth step for providing control for said ATM switch circuit such that the ATM cells processed at said first step are sequentially stored into the chain structure corresponding to said destination information, when the storage request and the destination information issued from said first step are received; wherein
  when both the output request and the destination information issued from said second step are received, the ATM cells are sequentially read from the chain structure corresponding to said destination information to execute the process operation defined at said second step with respect to said ATM cells read from the chain structure.

\* \* \* \* \*